United States Patent
Thiruvenkatanathan

(10) Patent No.: US 11,643,923 B2
(45) Date of Patent: May 9, 2023

(54) DISTRIBUTED ACOUSTIC SENSING AUTOCALIBRATION

(71) Applicant: BP Exploration Operating Company Limited, Middlesex (GB)

(72) Inventor: Pradyumna Thiruvenkatanathan, Richmond (GB)

(73) Assignee: BP EXPLORATION OPERATING COMPANY LIMITED, Middlesex (GB)

( * ) Notice: Subject to any disclaimer, the term of this patent is extended or adjusted under 35 U.S.C. 154(b) by 0 days.

(21) Appl. No.: 16/710,237

(22) Filed: Dec. 11, 2019

(65) Prior Publication Data

US 2020/0190971 A1 Jun. 18, 2020

(30) Foreign Application Priority Data

Dec. 13, 2018 (GB) ........................... 1820331
Mar. 21, 2019 (WO) ................. PCT/EP2019/057149

(51) Int. Cl.
*E21B 47/107* (2012.01)
*G01V 1/28* (2006.01)
(Continued)

(52) U.S. Cl.
CPC ............ *E21B 47/107* (2020.05); *G01V 1/226* (2013.01); *G01V 1/288* (2013.01); *G01V 13/00* (2013.01);
(Continued)

(58) Field of Classification Search
None
See application file for complete search history.

(56) References Cited

U.S. PATENT DOCUMENTS 3,563,311 A  2/1971  Stein
3,753,257 A  8/1973  Arnold
(Continued)

FOREIGN PATENT DOCUMENTS

CA  2953938 A1  1/2016
CA  2866274 A1  3/2016
(Continued)

OTHER PUBLICATIONS

PCT/EP2019/057149 International Search Report and Written Opinion dated Feb. 14, 2020 (21 p.).
(Continued)

*Primary Examiner* — Isam A Alsomiri
*Assistant Examiner* — Jonathan D Armstrong
(74) *Attorney, Agent, or Firm* — Conley Rose, P.C.

(57) ABSTRACT

A method of detecting an event by: obtaining a first sample data set; determining a frequency domain feature(s) of the first sample data set over a first time period; determining a first threshold for the a frequency domain feature(s) using the first sample data set; determining that the frequency domain feature(s) matches the first threshold; determining the presence of an event during the first time period based on determining that the frequency domain feature(s) matches the first threshold; obtaining a second sample data set; determining a frequency domain feature(s) of the second sample data set over a second time period; determining a second threshold for the frequency domain feature(s) using the second sample data set; determining that the frequency domain feature(s) matches the second threshold; and determining the presence of the event during the second time period based on determining that the frequency domain feature(s) matches the second threshold.

30 Claims, 10 Drawing Sheets

(51) Int. Cl.
*G01V 1/22* (2006.01)
*G01V 13/00* (2006.01)
(52) U.S. Cl.
CPC .. *G01V 2210/43* (2013.01); *G01V 2210/6161* (2013.01)

(56) References Cited

U.S. PATENT DOCUMENTS

| | | | |
|---|---|---|---|
| 3,841,144 A | 10/1974 | Baldwin | |
| 3,854,323 A * | 12/1974 | Hearn | E21B 47/101 73/61.75 |
| 4,668,093 A | 5/1987 | Cahill | |
| 5,042,297 A | 8/1991 | Lessi | |
| 5,113,941 A | 5/1992 | Donovan | |
| 5,257,530 A | 11/1993 | Beattie et al. | |
| 5,812,493 A | 9/1998 | Robein et al. | |
| 5,825,017 A * | 10/1998 | Pryor | F02F 1/24 250/208.1 |
| 5,971,095 A | 10/1999 | Ozbek | |
| 6,075,611 A * | 6/2000 | Dussan V. | G01F 1/7086 356/432 |
| 6,151,556 A | 11/2000 | Allen | |
| 6,201,765 B1 | 3/2001 | Ireson | |
| 6,450,037 B1 | 9/2002 | McGuinn et al. | |
| 6,501,067 B2 | 12/2002 | Jones et al. | |
| 6,516,275 B2 | 2/2003 | Lazaratos | |
| 6,550,342 B2 | 4/2003 | Croteau et al. | |
| 6,555,807 B2 | 4/2003 | Clayton et al. | |
| 6,587,798 B2 | 7/2003 | Kersey et al. | |
| 6,601,458 B1 | 8/2003 | Gysling et al. | |
| 6,601,671 B1 | 8/2003 | Zhao et al. | |
| 6,651,007 B2 | 11/2003 | Ozbek | |
| 6,672,131 B1 | 1/2004 | Aldal et al. | |
| 6,738,715 B2 | 5/2004 | Shatilo et al. | |
| 6,751,559 B2 | 6/2004 | Fookes et al. | |
| 6,782,150 B2 | 8/2004 | Davis et al. | |
| 6,813,403 B2 | 11/2004 | Tennyson | |
| 6,829,538 B2 | 12/2004 | de Kok | |
| 6,837,098 B2 | 1/2005 | Gysling et al. | |
| 6,904,368 B2 | 6/2005 | Reshef et al. | |
| 6,933,491 B2 | 8/2005 | Maida, Jr. | |
| 6,995,352 B2 | 2/2006 | Hay et al. | |
| 7,028,543 B2 | 4/2006 | Hardage et al. | |
| 7,030,971 B1 | 4/2006 | Payton | |
| 7,072,044 B2 | 7/2006 | Kringlebotn et al. | |
| 7,088,639 B2 | 8/2006 | Walls et al. | |
| 7,130,496 B2 | 10/2006 | Rogers | |
| 7,219,762 B2 | 5/2007 | James et al. | |
| 7,355,923 B2 | 4/2008 | Reshef et al. | |
| 7,357,021 B2 | 4/2008 | Blacklaw | |
| 7,395,864 B2 | 7/2008 | Ramachandran et al. | |
| 7,398,697 B2 | 7/2008 | Allen et al. | |
| 7,404,456 B2 | 7/2008 | Weaver et al. | |
| 7,503,217 B2 | 3/2009 | Johansen | |
| 7,644,759 B2 | 1/2010 | Davidson | |
| 7,652,245 B2 | 1/2010 | Crickmore et al. | |
| 7,659,828 B2 | 2/2010 | Wehrs et al. | |
| 7,660,200 B2 | 2/2010 | Tang | |
| 7,872,736 B2 | 1/2011 | Rogers et al. | |
| 7,890,280 B2 | 2/2011 | Fomme | |
| 7,896,069 B2 | 3/2011 | Dria et al. | |
| 7,940,389 B2 | 5/2011 | Rogers et al. | |
| 7,946,341 B2 | 5/2011 | Hartog et al. | |
| 8,020,616 B2 | 9/2011 | Greenaway | |
| 8,023,829 B2 | 9/2011 | Nash et al. | |
| 8,131,121 B2 | 3/2012 | Huffman | |
| 8,200,049 B2 | 6/2012 | Kaplan et al. | |
| 8,245,780 B2 | 8/2012 | Fidan et al. | |
| 8,248,589 B2 | 8/2012 | DeFreitas et al. | |
| 8,264,676 B2 | 9/2012 | Kanellopoulos et al. | |
| 8,408,064 B2 | 4/2013 | Hartog et al. | |
| 8,520,197 B2 | 8/2013 | Handerek | |
| 8,534,114 B2 | 9/2013 | Ellson | |
| 8,564,786 B2 | 10/2013 | Crickmore et al. | |
| 8,576,386 B2 | 11/2013 | Jones et al. | |
| 8,605,542 B2 | 12/2013 | Coates et al. | |
| 8,614,795 B2 | 12/2013 | Duncan et al. | |
| 8,634,681 B2 | 1/2014 | Rogers | |
| 8,661,907 B2 | 3/2014 | Davis et al. | |
| 8,755,643 B2 | 6/2014 | Nash et al. | |
| 8,797,824 B2 | 8/2014 | Crickmore et al. | |
| 8,902,704 B2 | 12/2014 | Zamow et al. | |
| 8,923,663 B2 | 12/2014 | Hill et al. | |
| 8,941,821 B2 | 1/2015 | Coupe et al. | |
| 8,950,482 B2 | 2/2015 | Hill et al. | |
| 8,973,444 B2 | 3/2015 | Hill et al. | |
| 8,996,298 B2 | 3/2015 | Yamada | |
| 8,997,585 B2 | 4/2015 | Hayward | |
| 9,002,149 B2 | 4/2015 | Rogers | |
| 9,052,230 B2 | 6/2015 | Kutlik et al. | |
| 9,075,155 B2 | 7/2015 | Luscombe et al. | |
| 9,109,944 B2 | 8/2015 | Den Boer et al. | |
| 9,110,018 B2 | 8/2015 | Handerek | |
| 9,140,582 B2 | 9/2015 | Farhadiroushan et al. | |
| 9,140,815 B2 | 9/2015 | Lopez et al. | |
| 9,146,151 B2 | 9/2015 | Kupershmidt | |
| 9,228,889 B2 | 1/2016 | McCann | |
| 9,243,949 B2 | 1/2016 | Crickmore et al. | |
| 9,250,112 B2 | 2/2016 | Godfrey | |
| 9,250,120 B2 | 2/2016 | Smith et al. | |
| 9,255,836 B2 | 2/2016 | Taverner et al. | |
| 9,304,017 B2 | 4/2016 | Handerek | |
| 9,341,731 B2 | 5/2016 | Biswas | |
| 9,347,313 B2 | 5/2016 | Wills et al. | |
| 9,354,338 B1 | 5/2016 | Psaila | |
| 9,377,551 B2 | 6/2016 | Hartog et al. | |
| 9,377,559 B2 | 6/2016 | Cooper | |
| 9,388,685 B2 | 7/2016 | Ravi et al. | |
| 9,416,644 B2 | 8/2016 | McEwen-King et al. | |
| 9,423,523 B2 | 8/2016 | McEwen-King | |
| 9,429,466 B2 | 8/2016 | Barfoot et al. | |
| 9,430,507 B2 | 8/2016 | Stowe et al. | |
| 9,435,668 B2 | 9/2016 | Lewis et al. | |
| 9,435,902 B2 * | 9/2016 | Hill | G01V 1/186 |
| 9,453,821 B2 | 9/2016 | Minto et al. | |
| 9,459,329 B2 | 10/2016 | McEwen-King et al. | |
| 9,465,126 B2 | 10/2016 | Lewis et al. | |
| 9,478,937 B1 | 10/2016 | Kupershmidt et al. | |
| 9,507,030 B2 | 11/2016 | Godfrey | |
| 9,512,711 B2 | 12/2016 | Sobolewski et al. | |
| 9,523,790 B1 | 12/2016 | Valishin | |
| 9,541,425 B2 | 1/2017 | Farhadiroushan et al. | |
| 9,557,195 B2 | 1/2017 | Barfoot et al. | |
| 9,561,812 B2 | 2/2017 | Godfrey | |
| 9,575,196 B2 | 2/2017 | Ji et al. | |
| 9,594,002 B2 | 3/2017 | Godfrey et al. | |
| 9,599,489 B2 | 3/2017 | Nash et al. | |
| 9,605,537 B2 | 3/2017 | Hull et al. | |
| 9,606,250 B2 | 3/2017 | Hull et al. | |
| 9,625,348 B2 | 4/2017 | Hill et al. | |
| 9,631,972 B2 | 4/2017 | Hill et al. | |
| 9,651,474 B2 | 5/2017 | Farhadiroushan et al. | |
| 9,651,709 B2 | 5/2017 | Jaaskelainen | |
| 9,677,956 B2 | 6/2017 | Hill et al. | |
| 9,702,244 B2 | 7/2017 | Willis et al. | |
| 9,719,846 B2 | 8/2017 | Ellmauthaler et al. | |
| 9,733,120 B2 | 8/2017 | Stokely et al. | |
| 9,739,645 B2 | 8/2017 | Hill et al. | |
| 9,746,393 B2 | 8/2017 | Godfrey | |
| 9,759,824 B2 | 9/2017 | Lumens et al. | |
| 9,766,371 B2 | 9/2017 | Barfoot et al. | |
| 9,778,097 B2 | 10/2017 | McEwen-King | |
| 9,784,642 B2 | 10/2017 | Strong et al. | |
| 9,788,469 B2 | 10/2017 | Gimblet et al. | |
| 9,797,239 B2 | 10/2017 | Godfrey | |
| 9,810,809 B2 | 11/2017 | Farhadiroushan et al. | |
| 9,816,853 B2 | 11/2017 | Crickmore et al. | |
| 9,823,114 B2 | 11/2017 | Farhadiroushan et al. | |
| 9,829,368 B2 | 11/2017 | Kutlik et al. | |
| 9,850,749 B2 | 12/2017 | Finfer et al. | |
| 9,869,795 B2 | 1/2018 | Jaaskelainen | |
| 9,880,047 B2 | 1/2018 | Martin et al. | |
| 9,896,929 B2 | 2/2018 | Farhadiroushan et al. | |
| 9,909,903 B2 | 3/2018 | Lewis et al. | |

(56) References Cited

U.S. PATENT DOCUMENTS

| | | |
|---|---|---|
| 9,945,215 B2 | 4/2018 | Godfrey |
| 9,945,979 B2 | 4/2018 | Stokely et al. |
| 9,983,293 B2 | 5/2018 | Farhadiroushan et al. |
| 9,989,388 B2 | 6/2018 | Farhadiroushan et al. |
| 10,018,036 B2 | 7/2018 | Ellmauthaler et al. |
| 10,031,044 B2 | 7/2018 | Kumar et al. |
| 10,067,030 B2 | 9/2018 | Hartog et al. |
| 10,101,182 B2 | 10/2018 | Barfoot |
| 10,120,104 B2 | 11/2018 | Roy et al. |
| 10,139,268 B2 | 11/2018 | Nunes et al. |
| 10,145,821 B2 | 12/2018 | Farhadiroushan et al. |
| 10,151,626 B2 | 12/2018 | Godfrey et al. |
| 10,175,374 B2 | 1/2019 | Dusterhoft et al. |
| 10,180,515 B2 | 1/2019 | Ellmauthaler et al. |
| 10,197,693 B2 | 2/2019 | Kalyanraman et al. |
| 10,198,946 B2 | 2/2019 | Crickmore et al. |
| 10,215,017 B2 | 2/2019 | Hull et al. |
| 10,221,681 B2 | 3/2019 | McEwen-King et al. |
| 10,234,345 B2 | 3/2019 | Hull et al. |
| 10,247,584 B2 | 4/2019 | Crickmore et al. |
| 10,260,937 B2 | 4/2019 | Dankers et al. |
| 10,267,141 B2 | 4/2019 | Nunes et al. |
| 10,274,381 B2 | 4/2019 | Kulkarni et al. |
| 10,275,402 B2 | 4/2019 | Guerriero et al. |
| 10,281,341 B2 | 5/2019 | Hull et al. |
| 10,310,113 B2 | 6/2019 | Sun et al. |
| 10,317,262 B2 | 6/2019 | Kippersund et al. |
| 10,379,239 B2 | 8/2019 | Udengaard |
| 10,393,921 B2 | 8/2019 | Cuny et al. |
| 10,401,519 B2 | 9/2019 | Willis et al. |
| 10,416,328 B2 | 9/2019 | Walters et al. |
| 10,422,365 B2 | 9/2019 | Hull et al. |
| 10,422,901 B2 | 9/2019 | Walters et al. |
| 10,429,530 B2 | 10/2019 | Rickett et al. |
| 10,444,388 B2 | 10/2019 | Dusterhoft et al. |
| 10,444,391 B2 | 10/2019 | Ellmauthaler et al. |
| 10,444,393 B2 | 10/2019 | Cheng et al. |
| 10,458,224 B2 | 10/2019 | Dickenson et al. |
| 10,481,579 B1 | 11/2019 | Putman et al. |
| 10,520,625 B2 | 12/2019 | Walters et al. |
| 10,578,757 B2 | 3/2020 | Dong et al. |
| 10,890,730 B2 | 1/2021 | Petersen |
| 10,975,687 B2 | 4/2021 | Langnes et al. |
| 11,053,791 B2 | 7/2021 | Langnes |
| 11,098,576 B2 | 8/2021 | Cerrahoglu et al. |
| 11,162,353 B2 | 11/2021 | Thiruvenkatanathan |
| 11,199,084 B2 | 12/2021 | Langnes et al. |
| 11,199,085 B2 | 12/2021 | Langnes et al. |
| 11,215,049 B2 | 1/2022 | Langnes et al. |
| 11,333,636 B2 | 5/2022 | Langnes et al. |
| 2001/0037883 A1 | 11/2001 | Veneruso et al. |
| 2002/0125009 A1 | 9/2002 | Wetzel et al. |
| 2002/0139929 A1* | 10/2002 | Mullins .................. E21B 47/102 |
| | | 250/255 |
| 2002/0195246 A1 | 12/2002 | Davidson |
| 2003/0010126 A1 | 1/2003 | Romanet et al. |
| 2003/0014199 A1* | 1/2003 | Toomey .................. G01H 9/002 |
| | | 702/56 |
| 2003/0029241 A1 | 2/2003 | Mandal |
| 2004/0059505 A1 | 3/2004 | Gallagher |
| 2004/0252748 A1 | 12/2004 | Gleitman |
| 2005/0100172 A1 | 5/2005 | Schliep et al. |
| 2005/0246111 A1 | 11/2005 | Gysling et al. |
| 2006/0165239 A1 | 7/2006 | Langner et al. |
| 2006/0165344 A1 | 7/2006 | Mendez et al. |
| 2007/0047867 A1 | 3/2007 | Goldner |
| 2007/0163780 A1 | 7/2007 | Onodera et al. |
| 2007/0199696 A1* | 8/2007 | Walford .............. E21B 43/2406 |
| | | 166/250.01 |
| 2007/0215345 A1 | 9/2007 | Lafferty et al. |
| 2007/0234789 A1 | 10/2007 | Glasbergen et al. |
| 2007/0247631 A1* | 10/2007 | Paulson ................ G01M 3/047 |
| | | 356/483 |
| 2007/0253561 A1 | 11/2007 | Williams et al. |
| 2008/0065362 A1 | 3/2008 | Lee et al. |
| 2008/0137475 A1* | 6/2008 | Maisons ................ G01V 1/008 |
| | | 367/25 |
| 2008/0154510 A1 | 6/2008 | Scott |
| 2008/0232748 A1 | 9/2008 | Nash |
| 2008/0314142 A1 | 12/2008 | Davies |
| 2009/0010104 A1 | 1/2009 | Leaney |
| 2009/0055098 A1 | 2/2009 | Mese et al. |
| 2009/0132183 A1 | 5/2009 | Hartog et al. |
| 2009/0202192 A1 | 8/2009 | Taverner et al. |
| 2009/0213692 A1 | 8/2009 | Martinez et al. |
| 2010/0163223 A1 | 7/2010 | Brown |
| 2010/0243241 A1* | 9/2010 | Hampton ................ G01V 8/02 |
| | | 166/250.01 |
| 2010/0258304 A1 | 10/2010 | Hegeman |
| 2010/0268489 A1 | 10/2010 | Lie et al. |
| 2011/0011577 A1 | 1/2011 | Dusterhoft et al. |
| 2011/0030467 A1 | 2/2011 | Bakulin |
| 2011/0042071 A1* | 2/2011 | Hsu ...................... E21B 47/102 |
| | | 166/250.01 |
| 2011/0085415 A1* | 4/2011 | Morton .................... G01V 1/26 |
| | | 367/25 |
| 2011/0094741 A1 | 4/2011 | Vigneaux et al. |
| 2011/0110191 A1* | 5/2011 | Williams-Stroud ... G01V 1/288 |
| | | 367/73 |
| 2011/0139538 A1 | 6/2011 | Hill et al. |
| 2011/0149688 A1 | 6/2011 | Hill et al. |
| 2011/0188346 A1 | 8/2011 | Hull |
| 2011/0255077 A1 | 10/2011 | Rogers |
| 2011/0301882 A1 | 12/2011 | Andersen |
| 2011/0315369 A1 | 12/2011 | Holderman et al. |
| 2012/0020184 A1 | 1/2012 | Wilson et al. |
| 2012/0043079 A1 | 2/2012 | Wassouf et al. |
| 2012/0057432 A1* | 3/2012 | Hill ........................ E21B 43/26 |
| | | 367/81 |
| 2012/0092960 A1 | 4/2012 | Gaston et al. |
| 2012/0096922 A1 | 4/2012 | Ellson |
| 2012/0111560 A1* | 5/2012 | Hill ........................ E21B 47/16 |
| | | 166/250.1 |
| 2012/0137781 A1* | 6/2012 | Hill ........................ F17D 5/06 |
| | | 73/655 |
| 2012/0152024 A1 | 6/2012 | Johansen |
| 2012/0155218 A1* | 6/2012 | Beasley ................ G01V 1/364 |
| | | 367/46 |
| 2012/0201096 A1 | 8/2012 | Valero et al. |
| 2012/0257475 A1* | 10/2012 | Luscombe ............... G01V 1/48 |
| | | 367/25 |
| 2012/0290213 A1* | 11/2012 | Huo ...................... G01V 1/005 |
| | | 702/16 |
| 2012/0298421 A1 | 11/2012 | Coates |
| 2013/0139600 A1 | 6/2013 | McEwen-King et al. |
| 2013/0151203 A1 | 6/2013 | McEwen-King et al. |
| 2013/0166227 A1 | 6/2013 | Hermann et al. |
| 2013/0167628 A1* | 7/2013 | Hull ........................ G01V 1/001 |
| | | 73/152.58 |
| 2013/0170519 A1 | 7/2013 | Alliot |
| 2013/0298665 A1 | 11/2013 | Minchau |
| 2013/0299165 A1 | 11/2013 | Crow |
| 2013/0319121 A1 | 12/2013 | Hill et al. |
| 2014/0025319 A1 | 1/2014 | Farhadiroushan et al. |
| 2014/0036627 A1 | 2/2014 | Hull et al. |
| 2014/0036628 A1 | 2/2014 | Hill et al. |
| 2014/0044222 A1* | 2/2014 | Kim ........................ H04L 7/042 |
| | | 375/343 |
| 2014/0069173 A1 | 3/2014 | Roy et al. |
| 2014/0086009 A1 | 3/2014 | Yoneshima |
| 2014/0110124 A1 | 4/2014 | Goldner et al. |
| 2014/0150523 A1* | 6/2014 | Stokely ................ E21B 47/135 |
| | | 73/1.82 |
| 2014/0150548 A1 | 6/2014 | Childers et al. |
| 2014/0204368 A1 | 7/2014 | Lewis et al. |
| 2014/0216151 A1 | 8/2014 | Godfrey et al. |
| 2014/0334253 A1 | 11/2014 | Lumens et al. |
| 2014/0362668 A1 | 12/2014 | McEwen-King |
| 2015/0000415 A1 | 1/2015 | Kelley |
| 2015/0085610 A1 | 3/2015 | Raum et al. |
| 2015/0144333 A1 | 5/2015 | Lee et al. |
| 2015/0146759 A1 | 5/2015 | Johnston |

(56) References Cited

U.S. PATENT DOCUMENTS

| | | |
|---|---|---|
| 2015/0234526 A1* | 8/2015 | Chalubert .......... G06F 3/04166 345/177 |
| 2015/0235544 A1 | 8/2015 | Hernandez et al. |
| 2015/0308191 A1 | 10/2015 | Zhan et al. |
| 2015/0308909 A1 | 10/2015 | Carneal et al. |
| 2016/0123798 A1* | 5/2016 | Godfrey ............. G01D 5/35361 73/643 |
| 2016/0138386 A1 | 5/2016 | Stokely et al. |
| 2016/0146962 A1 | 5/2016 | Hayward |
| 2016/0201453 A1 | 7/2016 | Kaiser et al. |
| 2016/0223389 A1 | 8/2016 | Farhadiroushan et al. |
| 2016/0259079 A1* | 9/2016 | Wilson ...................... E21B 7/06 |
| 2016/0265345 A1 | 9/2016 | In T Panhuis et al. |
| 2016/0281494 A1 | 9/2016 | Shirdel et al. |
| 2016/0312552 A1 | 10/2016 | Early et al. |
| 2016/0312604 A1 | 10/2016 | Hull et al. |
| 2016/0320232 A1 | 11/2016 | Nunes et al. |
| 2016/0327419 A1 | 11/2016 | Hellevang et al. |
| 2016/0342569 A1* | 11/2016 | Al Marzouqi ........ G06F 17/148 |
| 2016/0356665 A1 | 12/2016 | Felemban et al. |
| 2016/0369590 A1 | 12/2016 | Tonkin et al. |
| 2016/0369607 A1 | 12/2016 | Roy et al. |
| 2017/0010385 A1 | 1/2017 | Englich et al. |
| 2017/0016312 A1 | 1/2017 | Clarke et al. |
| 2017/0039826 A1 | 2/2017 | Cojocaur |
| 2017/0045410 A1 | 2/2017 | Crickmore et al. |
| 2017/0052049 A1 | 2/2017 | Crickmore et al. |
| 2017/0052050 A1 | 2/2017 | Crickmore et al. |
| 2017/0074998 A1 | 3/2017 | McColpin et al. |
| 2017/0074999 A1 | 3/2017 | Walters et al. |
| 2017/0075001 A1 | 3/2017 | McColpin et al. |
| 2017/0075002 A1 | 3/2017 | Ranjan et al. |
| 2017/0075003 A1 | 3/2017 | Dusterhoft et al. |
| 2017/0075004 A1 | 3/2017 | McColpin et al. |
| 2017/0075005 A1 | 3/2017 | Ranjan et al. |
| 2017/0082766 A1 | 3/2017 | Milne et al. |
| 2017/0090054 A1 | 3/2017 | Willis et al. |
| 2017/0119255 A1 | 5/2017 | Mahajan et al. |
| 2017/0123089 A1 | 5/2017 | Walters et al. |
| 2017/0153154 A1 | 6/2017 | Hull et al. |
| 2017/0205253 A1 | 7/2017 | Handerek |
| 2017/0234999 A1 | 8/2017 | Dykstra et al. |
| 2017/0241830 A1 | 8/2017 | Jaaskelainen |
| 2017/0241831 A1 | 8/2017 | Jaaskelainen |
| 2017/0275986 A1 | 9/2017 | Nunes et al. |
| 2017/0292862 A1 | 10/2017 | Godfrey |
| 2017/0315261 A1 | 11/2017 | Bartling et al. |
| 2017/0342814 A1 | 11/2017 | Krueger et al. |
| 2017/0343389 A1 | 11/2017 | Parker et al. |
| 2017/0350234 A1 | 12/2017 | Xia et al. |
| 2017/0363756 A1 | 12/2017 | El Allouche et al. |
| 2017/0371057 A1 | 12/2017 | Mateeva et al. |
| 2018/0010443 A1 | 1/2018 | Lu et al. |
| 2018/0024260 A1 | 1/2018 | Hornman et al. |
| 2018/0031413 A1 | 2/2018 | Stokely et al. |
| 2018/0045543 A1 | 2/2018 | Farhadiroushan et al. |
| 2018/0045768 A1 | 2/2018 | Godfrey et al. |
| 2018/0058196 A1 | 3/2018 | Jaaskelainen et al. |
| 2018/0066490 A1 | 3/2018 | Kjos |
| 2018/0087372 A1 | 3/2018 | Stokely et al. |
| 2018/0094952 A1 | 4/2018 | Handerek |
| 2018/0112519 A1 | 4/2018 | Duan et al. |
| 2018/0112520 A1 | 4/2018 | Duan |
| 2018/0112523 A1 | 4/2018 | Yang et al. |
| 2018/0136354 A1 | 5/2018 | Haldorsen |
| 2018/0172860 A1 | 6/2018 | Wilson et al. |
| 2018/0180658 A1 | 6/2018 | Godfrey |
| 2018/0203144 A1 | 7/2018 | Karrenbach et al. |
| 2018/0222498 A1 | 8/2018 | Kelley |
| 2018/0224572 A1 | 8/2018 | Farhadiroushan et al. |
| 2018/0230797 A1 | 8/2018 | Seshadri et al. |
| 2018/0231658 A1 | 8/2018 | Jalilian et al. |
| 2018/0238167 A1 | 8/2018 | Ravi et al. |
| 2018/0252097 A1 | 9/2018 | Skinner et al. |
| 2018/0259662 A1 | 9/2018 | Srinivasan |
| 2018/0266854 A1 | 9/2018 | Moore et al. |
| 2018/0267201 A1 | 9/2018 | Lewis |
| 2018/0284752 A1* | 10/2018 | Cella .................. G05B 23/0297 |
| 2018/0292569 A1 | 10/2018 | LeBlanc et al. |
| 2018/0320827 A1 | 11/2018 | Hull et al. |
| 2018/0340801 A1 | 11/2018 | Kelley et al. |
| 2018/0342156 A1 | 11/2018 | Martin et al. |
| 2018/0354534 A1 | 12/2018 | Cole |
| 2018/0356210 A1 | 12/2018 | Moore et al. |
| 2019/0003499 A1 | 1/2019 | Logan et al. |
| 2019/0003903 A1 | 1/2019 | Godfrey |
| 2019/0025094 A1 | 1/2019 | Lewis et al. |
| 2019/0026634 A1 | 1/2019 | Homeyer et al. |
| 2019/0033898 A1 | 1/2019 | Shah et al. |
| 2019/0064030 A1 | 2/2019 | Sundermann |
| 2019/0072379 A1* | 3/2019 | Jalilian .................. G01B 11/18 |
| 2019/0113641 A1 | 4/2019 | Fang et al. |
| 2019/0120044 A1* | 4/2019 | Langnes ............... E21B 47/123 |
| 2019/0137045 A1 | 5/2019 | Jalilian et al. |
| 2019/0169985 A1 | 6/2019 | Dickenson et al. |
| 2019/0186958 A1 | 6/2019 | Godfrey |
| 2019/0197846 A1 | 6/2019 | Englund |
| 2019/0225250 A1 | 7/2019 | Esprey et al. |
| 2019/0257169 A1 | 8/2019 | Grimsbo et al. |
| 2019/0257699 A1 | 8/2019 | Handerek et al. |
| 2019/0277135 A1 | 9/2019 | Zha |
| 2019/0323863 A1 | 10/2019 | Shatalin et al. |
| 2019/0324444 A1* | 10/2019 | Cella .................. G05B 19/4184 |
| 2019/0331819 A1 | 10/2019 | Wu et al. |
| 2019/0338621 A1 | 11/2019 | Jin et al. |
| 2019/0339688 A1 | 11/2019 | Cella et al. |
| 2019/0345803 A1 | 11/2019 | Madasu et al. |
| 2019/0353814 A1 | 11/2019 | Cha et al. |
| 2019/0375213 A1 | 12/2019 | Theopold et al. |
| 2019/0390546 A1 | 12/2019 | Langnes et al. |
| 2020/0018149 A1 | 1/2020 | Luo et al. |
| 2020/0024942 A1 | 1/2020 | Lolla et al. |
| 2020/0032639 A1* | 1/2020 | Langnes ................. E21B 49/00 |
| 2020/0032645 A1 | 1/2020 | LeBlanc et al. |
| 2020/0048999 A1* | 2/2020 | Langnes ............ G01N 29/4427 |
| 2020/0056907 A1 | 2/2020 | Godfrey |
| 2020/0057220 A1 | 2/2020 | Hull et al. |
| 2020/0070862 A1 | 3/2020 | Bilodeau et al. |
| 2020/0072993 A1 | 3/2020 | Wilson et al. |
| 2020/0081145 A1 | 3/2020 | Padhi et al. |
| 2020/0088022 A1 | 3/2020 | Shen et al. |
| 2020/0102821 A1 | 4/2020 | Willis et al. |
| 2020/0124489 A1 | 4/2020 | Godfrey |
| 2020/0131900 A1 | 4/2020 | Leblanc et al. |
| 2020/0158594 A1 | 5/2020 | Dankers et al. |
| 2020/0172130 A1 | 6/2020 | Esprey |
| 2020/0173273 A1 | 6/2020 | Thiruvenkatanathan |
| 2020/0173818 A1 | 6/2020 | Handerek et al. |
| 2020/0174149 A1 | 6/2020 | Thiruvenkatanathan |
| 2020/0182047 A1 | 6/2020 | Langnes et al. |
| 2020/0184556 A1 | 6/2020 | Cella |
| 2020/0200000 A1 | 6/2020 | Langnes et al. |
| 2020/0200943 A1 | 6/2020 | Adeyemi et al. |
| 2020/0233107 A1 | 7/2020 | Constantinou et al. |
| 2020/0256834 A1 | 8/2020 | Langnes et al. |
| 2020/0291772 A1 | 9/2020 | Thiruvenkatanathan et al. |
| 2020/0309982 A1 | 10/2020 | Jin et al. |
| 2021/0047916 A1 | 2/2021 | Thiruvenkatanathan et al. |
| 2021/0073314 A1 | 3/2021 | Ray et al. |
| 2021/0087923 A1 | 3/2021 | Thiruvenkatanathan |
| 2021/0087925 A1 | 3/2021 | Heidari et al. |
| 2021/0115767 A1 | 4/2021 | Tajallipour et al. |
| 2021/0115785 A1 | 4/2021 | Cerrahoglu et al. |
| 2021/0115786 A1 | 4/2021 | Cerrahoglu et al. |
| 2021/0148199 A1 | 5/2021 | Thiruvenkatanathan |
| 2021/0189874 A1 | 6/2021 | Jaaskelainen et al. |
| 2021/0231830 A1 | 7/2021 | Nitsche et al. |
| 2021/0397994 A1 | 12/2021 | Cerrahoglu et al. |

FOREIGN PATENT DOCUMENTS

| | | | |
|---|---|---|---|
| CA | 2760662 C | * 4/2017 | ............. E21B 47/16 |
| CN | 101769442 A | 7/2010 | |
| CN | 102226390 A | 10/2011 | |

(56) References Cited

FOREIGN PATENT DOCUMENTS

| | | |
|---|---|---|
| CN | 203561437 U | 4/2014 |
| CN | 105135219 A | 12/2015 |
| CN | 105676267 A | 6/2016 |
| CN | 205746047 U | 11/2016 |
| CN | 108918405 A | 11/2018 |
| CN | 109000157 A | 12/2018 |
| CN | 110231409 A | 9/2019 |
| CN | 209858753 U | 12/2019 |
| EP | 2418466 A2 | 2/2012 |
| EP | 3006908 A1 | 4/2016 |
| EP | 3032441 A2 | 6/2016 |
| EP | 3073051 A1 | 9/2016 |
| EP | 3440314 A2 | 2/2019 |
| EP | 3314308 B1 | 4/2019 |
| GB | 1299843 A | 12/1972 |
| GB | 2354782 A | 4/2001 |
| GB | 2359834 A | 9/2001 |
| GB | 2522061 A | 7/2015 |
| GB | 2555550 A | 5/2018 |
| GB | 2555637 A | 5/2018 |
| GB | 18203315 * | 12/2018 ............ G01V 1/226 |
| JP | 5518424 B2 | 6/2014 |
| RU | 2007101037 A | 7/2008 |
| WO | 9721116 A1 | 6/1997 |
| WO | 2004031738 A1 | 4/2004 |
| WO | 2007024763 A2 | 3/2007 |
| WO | 2008147953 A1 | 12/2008 |
| WO | 2009048340 A2 | 4/2009 |
| WO | 2009086279 A2 | 7/2009 |
| WO | 2009109747 A1 | 9/2009 |
| WO | 2010099484 A2 | 9/2010 |
| WO | 2012011831 A1 | 1/2012 |
| WO | 2013114135 A2 | 8/2013 |
| WO | 2015011394 A1 | 1/2015 |
| WO | 2015025216 A2 | 2/2015 |
| WO | 2015060981 A1 | 4/2015 |
| WO | 2015170113 A1 | 11/2015 |
| WO | 2015170116 A1 | 11/2015 |
| WO | 2016010550 A1 | 1/2016 |
| WO | 2016020654 A1 | 2/2016 |
| WO | 2016108914 A1 | 7/2016 |
| WO | 2016115030 A1 | 7/2016 |
| WO | 2016207341 A1 | 12/2016 |
| WO | 2017009606 A1 | 1/2017 |
| WO | 2017044923 A1 | 3/2017 |
| WO | 2017064472 A1 | 4/2017 |
| WO | 2017078536 A1 | 5/2017 |
| WO | 2017109467 A1 | 6/2017 |
| WO | 2017156339 A1 | 9/2017 |
| WO | 2017/174746 A1 | 10/2017 |
| WO | WO-2017174750 A2 * | 10/2017 ............... G01H 3/04 |
| WO | 2017203271 A1 | 11/2017 |
| WO | WO-2017174750 A3 * | 11/2017 ............ G01H 9/004 |
| WO | 2017214729 A1 | 12/2017 |
| WO | 2018044309 A1 | 3/2018 |
| WO | 2018057029 A1 | 3/2018 |
| WO | 2018088994 A1 | 5/2018 |
| WO | 2018136050 A1 | 7/2018 |
| WO | 2018154275 A1 | 8/2018 |
| WO | 2018/178279 A1 | 10/2018 |
| WO | 2018195661 A1 | 11/2018 |
| WO | 2019005050 A1 | 1/2019 |
| WO | 2019027466 A1 | 2/2019 |
| WO | WO-2019038401 A * | 2/2019 ........... E21B 47/123 |
| WO | 2019072899 A2 | 4/2019 |
| WO | 2019094140 A1 | 5/2019 |
| WO | 2019094474 A1 | 5/2019 |
| WO | 2019136556 A1 | 7/2019 |
| WO | 2019139564 A1 | 7/2019 |
| WO | 2020109426 A2 | 6/2020 |
| WO | 2020109427 A2 | 6/2020 |
| WO | 2020119957 A1 | 6/2020 |
| WO | 2020182312 A1 | 9/2020 |
| WO | 2020260928 A1 | 12/2020 |
| WO | 2021034300 A1 | 2/2021 |
| WO | 2021037586 A1 | 3/2021 |
| WO | 2021052604 A1 | 3/2021 |
| WO | 2021052605 A1 | 3/2021 |
| WO | 2021052607 A1 | 3/2021 |
| WO | 2021073740 A1 | 4/2021 |
| WO | 2021073741 A1 | 4/2021 |
| WO | 2021073763 A1 | 4/2021 |
| WO | 2021073776 A1 | 4/2021 |
| WO | 2021093974 A1 | 5/2021 |
| WO | 2021093976 A1 | 5/2021 |
| WO | 2021148141 A1 | 7/2021 |
| WO | 2021151504 A1 | 8/2021 |
| WO | 2021151521 A1 | 8/2021 |
| WO | 2021249643 A1 | 12/2021 |
| WO | 2021254632 A1 | 12/2021 |
| WO | 2021254633 A1 | 12/2021 |
| WO | 2021254799 A1 | 12/2021 |

OTHER PUBLICATIONS

Advisory Action dated Aug. 25, 2020, U.S. Appl. No. 16/698,335, filed Nov. 11, 2019.
International Search Report and Written Opinion dated Jan. 27, 2020, PCT Application No. PCT/EP2019/056425.
International Search Report and Written Opinion dated Feb. 28, 2020, PCT Application No. PCT/IB2019/055355.
International Search Report and Written Opinion dated Jun. 16, 2020, PCT Application No. PCT/EP2019/075385.
International Search Report and Written Opinion dated Jun. 16, 2020, PCT Application No. PCT/EP2019/075378.
International Search Report and Written Opinion dated Jun. 17, 2020, PCT Application No. PCT/US2019/046759.
International Search Report and Written Opinion dated May 12, 2020, PCT Application No. PCT/EP2019/072891.
International Search Report and Written Opinion dated Jun. 16, 2020, PCT Application No. PCT/EP2019/075387.
International Search Report and Written Opinion dated Jun. 16, 2020, PCT Application No. PCT/EP2019/075382.
Partial International Search Report Search Report dated Sep. 10, 2020, PCT Application No. PCT/EP2019/085454.
International Search Report and Written Opinion dated Jul. 9, 2020, PCT Application No. PCT/EP2019/078197.
International Search Report and Written Opinion dated May 29, 2020, PCT Application No. PCT/EP2019/082809.
Office Action dated Mar. 12, 2020, U.S. Appl. No. 16/698,407, filed Nov. 27, 2019.
Final Office Action dated Jun. 30, 2020, U.S. Appl. No. 16/698,407, filed Nov. 27, 2019.
Examination Report dated Jul. 15, 2020, GCC Application No. GC 2019-38726.
International Search Report and Written Opinion dated Jul. 24, 2020, PCT Application No. PCT/EP2019/081542.
International Search Report and Written Opinion dated Jul. 24, 2020, PCT Application No. PCT/EP2019/081545.
Abdelgaward, Ahemd, "Distributed Sand Monitoring Framework Using Wireless Sensor Networks," School of Engineering Technology, Central Michigan University, Mount Pleasant, MI 48859, US, Oct. 2013, vol. 1 Is. 1, pp. 1-10.
Abukhamsin, Ahmed Yasin, et al., "In Flow Profiling and Production Optimization in Smart Wells Using Di stri but ed Acoustic and Temperature Measurements," Jun. 1, 2017 (Jun. 1, 2017), XP055604495, Retrieved from the Internet: URL: https://pangea.stanford.edu/ERE/pdf/pereports/PhD/Abukhamsin2016.pdf [retrieved on Jul. 11, 2019] paragraphs [0001], [0002], [0004].
Bakku, Sudhish K., et al., "Vertical Seismic Profiling Using Distributed Acoustic Sensing in a Hydrofrac Treatment Well," SEG Technical Program Expanded Abstracts Denver 2014 ISSN (print): 1052-3812, ISSN (online): 1949-4645, https://doi.org/10.1190/segam2014-1559.1.
Broesch, James "Digital Signal Processing: Instant Access," Chapter 7, www.newnespress.com.
Brown, Gerald K., "External Acoustic Sensors and Instruments for the Detection of Sand in Oil and Gas Wells," Offshore Technology Conference, May 5-8, 1997, Houston, Texas, US, OTC-8478-MS, https://doi.org/10.4043/8478-MS.

(56) References Cited

OTHER PUBLICATIONS

Brown, Gerald K., et al., "Solids and Sand Monitoring—An Overview," Corrosion, Mar. 26-31, 2000, Orlando, Florida, US, NACE International, NACE-00091.

Cannon, Robert Thayer, et al., "Distributed Acoustic Sensing: State of the Art," SPE Digital Energy Conference, Mar. 5-7, 2013, The Woodlands, Texas, US, SPE-163688-MS, https://doi.org/10.2118/163688-MS.

Chen, Jianyou, et al., "Distributed acoustic sensing coupling noise removal based on sparse optimization," Society of Exploration Geophysicists and American Association of Petroleum Geologists, vol. 7, Issue 2, May 2019, pp. 1M-T563, ISSN (print): 2324-8858, ISSN (online): 2324-8866, https://doi.org/10.1190/INT-2018-0080.1.

Chhantyal, Khim et al., "Upstream Ultrasonic Level Based Soft Sensing of Volumetric Flow of Non-Newtonian Fluids in Open Venturi Channels," IEEE Sensors Journal, vol. 18, No. 12, Jun. 15, 2018.

ClampOn DSP-06 Particle Monitor, Aug. 2009.

ClampOn SandQ® Monitor, Aug. 2014.

Conway, Chris, et al., "An introduction to fiber optic Intelligent Distributed Acoustic Sensing (iDAS) technology for power industry applications," 9th International Conference on Insulated Power Cables, Jicable15—Versailles Jun. 21-25, 2015, A3.4.

Correa, Julia, et al., "3D vertical seismic profile acquired with distributed acoustic sensing on tubing installation: A case study from the CO2CRC Otway Project," Interpretation—a Journal of Subsurface Characterization, 7(1), ISSN 2324-8858, Feb. 1, 2019, DOI 10.1190/INT-2018-0086.1, https://escholarship.org/uc/item/2br8g398.

Finfer, D.C., et al., "Borehole Flow Monitoring using a Non-intrusive Passive Distributed Acoustic Sensing (DAS)," Society of Petroleum Engineers, SPE-170844-MS, SPE Annual Technical Conference and Exhibition held in Amsterdam, The Netherlands, Oct. 27-29, 2014.

Gardner, Neil, et al., "Distributed Fiber-Optic Technologies Drive New Intervention Applications," SPE JPT-7975, vol. 67 | Issue: 1, Jan. 1, 2015.

Hill, David, Permanent real-time full wellbore flow monitoring using distributed fiber-optic sensing, OptaSense, 2015.

Hofman, Joachim, et al., "Analysis of the acoustic response in water and sand of different fiber optic sensing cables," SPIE Sensing Technology + Applications, 2015, Baltimore, Maryland, U.S., Proceedings vol. 9491, Sensors for Extreme Harsh Environments II; 94910E (2015) https://doi.org/10.1117/12.2178282.

Hull, John William, et al., "Well-Integrity Monitoring and Analysis Using Distributed Fiber-Optic Acoustic Sensors," ADC/SPE Drilling Conference and Exhibition, Feb. 2-4, 2010, New Orleans, Louisiana, US, SPE-128304-MS, https://doi.org/10.2118/128304-MS.

Isensys, "Sand Alert—Fixed and Portable Sand Monitoring," Isensys LLP, Sep. 2016, www.isensys.co.uk.

Johannessen, Kjetil, et al., "Distributed Acoustic Sensing—A New Way of Listening to Your Well/Reservoir," SPE Intelligent Energy International, Mar. 27-29, 2012, Utrecht, NL, SPE-149602-MS, https://doi.org/10.2118/149602-MS.

Li, Meng, et al., "Current and Future Applications of Distributed Acoustic Sensing as a New Reservoir Geophysics Tool," The Open Petroleum Engineering Journal, 2015, 8, (Suppl 1: M3) 272-281.

Ma, King, et al. "Deep Learning on Temporal-Spectral Data for Anomaly Detection," Department of Electrical and Computer Engineering, University of Calgary, Proc. of SPIE vol. 10190, 2017.

Martin, Shawn, "Can Oil Well Monitoring Systems Withstand Stimulation Treatments," Feb. 26, 2015, https://insights.globalspec.com/article/601/can-oil-well-monitoring-systems-withstand-stimulation-treatments [retrieved on Aug. 18, 2020].

Martinez, Roberto Jr., "Diagnosis of Fracture Flow Conditions With Acoustic Sensing," SPE Hydraulic Fracturing Technology Conference, Feb. 4-6, The Woodlands, Texas, US, Publication Date 2014.

Miller, Douglas E., et al., "Vertical Seismic Profiling Using a Fiber-optic Cable as a Distributed Acoustic Sensor," 74th EAGE Conference Exhibition incorporating SPE EUROPEC 2012, Copenhagen, Denmark, Jun. 4-7, 2012.

Mohd Daud, Farik, et al., "Successful Application of Ultrasound Technology to Detect Sand Producing Intervals in the Wellbore," International Petroleum Technology Conference, Nov. 15-17, 2011, Bangkok, Thailand, IPTC-14737-MS, https://doi.org/10.2523/IPTC-14737-MS.

Molenaar, Menno M., et al., "First Downhole Application of Distributed Acoustic Sensing for Hydraulic-Fracturing Monitoring and Diagnostics," SPE Drilling Completion, vol. 27, Is. 1, Mar. 2012, SPE-140561-PA, https://doi.org/10.2118/140561-PA.

Mullens, Stephen, et al., "Fiber-Optic Distributed Vibration Sensing Provides Technique for Detecting Sand Production," Offshore Technology Conference, May 3-6, 2010, Houston, Texas, US, OTC-20429-MS, https://doi.org/10.4043/20429-MS.

Naldrett, G., et al., "Production Monitoring Using Next-Generation Distributed Sensing Systems," Petrophysics, vol. 59, No. 4 (Aug. 2018); pp. 496-510; 16 Figures. DOI: 10.30632/PJV59V4-2018a5.

Paleja, Rakesh, et al., "Velocity Tracking for Flow Monitoring and Production Profiling Using Distributed Acoustic Sensing," SPE Annual Technical Conference and Exhibition, Sep. 28-30, 2015, Houston, Texas, US, SPE-174823-MS, https://doi.org/10.2118/174823-MS.

Roxar sand monitor, https://www.emerson.com/en-us/automation/roxar.

Roxar, "Sand Monitor, Non-intrusive acoustic sensor," Draft 1-120209, Sundheim-Madison Feb. 2009.

Schuliz, Whitney H., "Time-Lapse Multicomponent Geophone and DAS VSP Processing and Analysis," Colorado School of Mines, Geo-Physics Department, 2019.

Silixa, "Fracture Monitoring," https://silixa.com/solutions/oil-and-gas-downhole/frac-services/fracture-monitoring/.

Silixa, "Well Integrity," https://silixa.com/solutions/oil-and-gas-downhole/permanent-reservoir-and-well-surveillance/well-integrity/.

Silkina, Tatiana, "Application of Distributed Acoustic Sensing to Flow Regime Classification," Natural Gas Technology, Norwegian University of Science and Technology, Jun. 2014.

Stokely, Christopher L., "Acoustics-Based Flow Monitoring During Hydraulic Fracturing," SPE-179151-MS, Society of Petroleum Engineers, SPE Hydraulic Fracturing Technology Conference, Feb. 9-11, 2016, The Woodlands, Texas, USA, https://doi.org/10.2118/179151-MS.

Susilo, Yoliandri, et al., "Significant Increase in Sand Control Reliability of Open Hole Gravel Pack Completions in ACG Field—Azerbaijan," SPE European Formation Damage Conference Exhibition, Jun. 5-7, 2013, Noordwijk, NL, SPE-165206-MS, https://doi.org/10.2118/165206-MS.

Tiffin, David L., et al., "Drawdown Guidelines for Sand Control Completions", SPE International, SPE 84495, Oct. 5, 2003 (Oct. 5, 2003), pp. 1-10, XP002361435.

Van der Horst, Juun, et al., "Fibre Optic Sensing For Improved Wellbore Production Surveillance," International Petroleum Technology Conference, Jan. 19-22, 2014, Doha, Qatar, IPTC-17528-MS, https://doi.org/10.2523/IPTC-17528-MS.

Wang, Fang, et al., "Pipeline Leak Detection by Using Time-Domain Statistical Features," IEEE Sensors Journal, vol. 17, No. 19, Oct. 2017.

Wang, Kai, et al., "Vibration Sensor Approaches for the Monitoring of Sand Production in Bohai Bay," Hindawi Publishing Corporation, Shock and Vibration, vol. 2015, Article ID 591780, http://dx.doi.org/10.1155/2015/591780.

World first installation of a fiber optic acoustic sensor for reservoir monitoring, Oil and Gas Product News, Oct. 30, 2009.

WorldOil.com, "Adelous unveils distributed acoustic sensor solution for upstream oil gas," May 28, 2015. https://www.worldoil.com/news/2015/5/28/adelos-unveils-distributed-acoustic-sensor-solution-for-upstream-oil-gas.

Xiao, J., et al., "Dynamic Water Injection Profiling in Intelligent Wells Using Distributed Acoustic Sensor with Multimode Optical

(56) References Cited

OTHER PUBLICATIONS

Fibers," SPE Annual Technical Conference and Exhibition, Sep. 28-30, 2015, Houston, Texas, US, SPE-174865-MS, https://doi.org/10.2118/174865-MS.

Xiao, J.J., et al., "Intelligent Distributed Acoustic Sensing for In-well Monitoring," SPE Saudi Arabia Section Technical Symposium and Exhibition, Apr. 21-24, 2014, Al-Khobar, SA, SPE-172197-MS, https://doi.org/10.2118/172197-MS.

Folkestad, Trond, et al., "Acoustic measurements detect sand in North Sea flow lines," Oil and Gas Journal; (USA), Journal vol. 88:35; Journal ID: ISSN 0030-1388.

Molenaar, Mathieu, et al., "Downhole tests show benefits of distributed acoustic sensing," Oil and Gas Journal 109(1):82-85, Jan. 2011.

Williams, J., "Distributed acoustic sensing for pipeline monitoring," Pipeline and Gas Journal Jul. 2012, vol. 239 No. 7.

Partial International Search Report Search Report dated Oct. 20, 2020, PCT Application No. PCT/EP2020/051814.

Partial International Search Report Search Report dated Oct. 16, 2020, PCT Application No. PCT/EP2020/051817.

International Search Report and Written Opinion dated Oct. 5, 2017, PCT Application No. PCT/EP2017/058300.

International Preliminary Report on Patentability dated Oct. 18, 2018, PCT Application No. PCT/EP2017/058300.

Intention to Grant dated Dec. 12, 2019, EP Application No. 17715935.7.

Decision to Grant dated May 8, 2020, EP Application No. 17715935.7.

Office Action dated Dec. 29, 2019, U.S. Appl. No. 16/563,544, filed Sep. 16, 2019.

Notice of Allowance dated Apr. 22, 2020, U.S. Appl. No. 16/563,544, filed Sep. 16, 2019.

European Search Report dated Aug. 10, 2020, EP Application No. 20170700.7.

International Search Report and Written Opinion dated Sep. 22, 2017, PCT Application No. PCT/EP2017/058292.

International Preliminary Report on Patentability dated Oct. 18, 2018, PCT Application No. PCT/EP2017/058292.

Office Action dated Dec. 4, 2019, U.S. Appl. No. 16/563,689, filed Sep. 6, 2019.

Notice of Allowance dated May 20, 2020, U.S. Appl. No. 16/563,689, filed Sep. 6, 2019.

Corrected Notice of Allowability dated Jun. 19, 2020, U.S. Appl. No. 16/563,689, filed Sep. 6, 2019.

European Search Report dated Apr. 22, 2020, for European Application No. 20154638.9.

International Search Report and Written Opinion dated Jun. 29, 2018, PCT Application No. PCT/EP2018/058174.

International Preliminary Report on Patentability dated Oct. 10, 2019, PCT Application No. PCT/EP2018/058174.

Office Action dated Jan. 24, 2020, U.S. Appl. No. 16/566,711, filed Sep. 10, 2019.

Final Office Action dated Aug. 4, 2020, U.S. Appl. No. 16/566,711, filed Sep. 10, 2019.

Advisory Action dated Oct. 16, 2020, U.S. Appl. No. 16/566,711, filed Sep. 10, 2019.

European Article 94(3) Examination Report dated Jan. 15, 2020, for European Application No. 18714513.1.

European Article 94(3) Examination Report dated Jul. 29, 2020, for European Application No. 18714513.1.

European Search Report dated Dec. 4, 2019, for European Application No. 19198488.9.

European Article 94(3) Examination Report dated Feb. 3, 2020, for European Application No. 19198488.9.

Intention to Grant dated Aug. 10, 2020, for European Application No. 19198488.9.

Eurasian Office Action dated Sep. 3, 2020, for Eurasian Application No. 201992243/31.

International Search Report and Written Opinion dated Nov. 28, 2018, PCT Application No. PCT/EP2018/072811.

International Preliminary Report on Patentability dated Mar. 5, 2020, PCT Application No. PCT/EP2018/072811.

International Search Report and Written Opinion dated Jun. 4, 2019, PCT Application No. PCT/EP2018/077568.

International Preliminary Report on Patentability date Apr. 23, 2020, PCT Application No. PCT/EP2018/077568.

International Search Report and Written Opinion dated Jul. 9, 2020, PCT Application No. PCT/EP2018/082985.

International Search Report and Written Opinion dated Jul. 9, 2020, PCT Application No. PCT/EP2019/082808.

Office Action dated Feb. 24, 2020, U.S. Appl. No. 16/698,335, filed Nov. 11, 2019.

Final Office Action dated Jun. 24, 2020, U.S. Appl. No. 16/698,335, filed Nov. 11, 2019.

Restriction Requirement dated Dec. 15, 2020, U.S. Appl. No. 16/291,929, filed Oct. 5, 2018.

Notice of Allowance dated Dec. 11, 2020, U.S. Appl. No. 16/566,711, filed Sep. 10, 2019.

Office Action dated Dec. 3, 2020, U.S. Appl. No. 16/698,335, filed Nov. 11, 2019.

International Search Report and Written Opinion dated Nov. 6, 2020, PCT Application No. PCT/EP2020/072811.

International Search Report and Written Opinion dated Jul. 9, 2020, PCT Application No. PCT/EP2019/078195.

Office Action dated Jan. 7, 2021, U.S. Appl. No. 17/071,031, filed Oct. 15, 2020.

Office Action dated Jan. 14, 2021, U.S. Appl. No. 17/071,021, filed Oct. 20, 2020.

Office Action dated Dec. 30, 2020, U.S. Appl. No. 17/091,940, filed Nov. 6, 2020.

International Search Report and Written Opinion dated Feb. 3, 2021, PCT Application No. PCT/EP2020/066171.

International Search Report and Written Opinion dated Dec. 11, 2020, PCT Application No. PCT/EP2020/051814.

International Search Report and Written Opinion dated Dec. 20, 2020, PCT Application No. PCT/EP2020/051817.

International Search Report and Written Opinion dated Dec. 9, 2020, PCT Application No. PCT/EP2020/067043.

International Preliminary Report on Patentability dated Jan. 6, 2022, PCT Application No. PCT/IB2019/055355.

EP Rule 161(1) and 162 EPC Communication dated Feb. 4, 2022, EP Application No. 19765548.3.

Office Action dated Jan. 12, 2022, U.S. Appl. No. 17/025,874, filed Sep. 18, 2020.

International Search Report Search Report dated Nov. 6, 2020, PCT Application No. PCT/EP2019/085454.

Final Office Action dated Dec. 7, 2021, U.S. Appl. No. 17/071,021, filed Oct. 20, 2020.

International Preliminary Report on Patentability dated Jun. 10, 2021, PCT Application No. PCT/EP2019/082809.

Office Action dated Nov. 15, 2021, U.S. Appl. No. 16/698,407, filed Nov. 27, 2019.

Examination Report dated Dec. 6, 2020, GCC Application No. GC 2019-38726.

Examination Report/Notice of Allowance dated Jun. 9, 2021, GCC Application No. GC 2019-38726.

EP Rule 161(1) and 162 EPC Communication dated Jul. 6, 2021, EP Application No. 21194305.5.

European Extended Search Report dated Nov. 23, 2021, EP Application No. 21194305.5.

Office Action dated Sep. 21, 2021, U.S. Appl. No. 17/330,117, filed May 12, 2021.

Final Office Action dated Jan. 7, 2022, U.S. Appl. No. 17/330,117, filed May 12, 2021.

GCC Examination Report dated Oct. 13, 2021, GCC Application No. 2020/40676.

International Search Report and Written Opinion dated Oct. 14, 2020, PCT Application No. PCT/EP2020/052445.

International Search Report and Written Opinion dated Sep. 14, 2021, PCT Application No. PCT/EP2021/065081.

Office Action dated Dec. 29, 2021, U.S. Appl. No. 17/351,217.

(56) References Cited

OTHER PUBLICATIONS

Elichev, et al., "Understanding Well Events with Machine Learning," Society of Petroleum Engineers, SPE-196861-MS, pp. 1-12, 2019.
Hildebrandt Marcel et al, "A Recommender System for Complex Real-World Applications with Nonlinear Dependencies and Knowledge Graph Context", May 25, 2019 (May 25, 2019), Advances in Databases and Information Systems; [Lecture Notes in Computer Science; Lect.Notes Computer], Springer International Publishing, Cham, pp. 179-193, ISBN: 9783319104034.
One Petro Search Results, Jul. 22, 2021, 10 pp. (Year: 2021).
Saeed, et al., "Event Detection for Managed-Pressure Drilling: A New Paradigm," Society of Petroleum Engineers, SPE 158491, pp. 1-12, 2012.
CA Examination Report dated Feb. 16, 2022, CA Application No. 3,020,007.
Office Action dated Mar. 30, 2021, U.S. Appl. No. 16/291,929, filed Oct. 5, 2018.
Notice of Allowance dated Apr. 21, 2021, U.S. Appl. No. 16/563,689, filed Sep. 6, 2019.
Office Action dated Apr. 29, 2021, U.S. Appl. No. 16/639,774, filed Feb. 18, 2020.
Final Office Action dated Jun. 15, 2021, U.S. Appl. No. 16/698,335, filed Nov. 11, 2019.
Notice of Allowance dated Apr. 22, 2021, U.S. Appl. No. 17/071,031, filed Oct. 15, 2020.
Final Office Action dated May 11, 2021, U.S. Appl. No. 17/071,021, filed Oct. 20, 2020.
Advisory Action dated Jul. 28, 2021, U.S. Appl. No. 17/071,021, filed Oct. 20, 2020.
Office Action dated Mar. 22, 2021, U.S. Appl. No. 16/698,407, filed Nov. 27, 2019.
Final Office Action dated Jun. 29, 2021, U.S. Appl. No. 16/698,407, filed Nov. 27, 2019.
Final Office Action dated Apr. 7, 2021, U.S. Appl. No. 17/091,940, filed Nov. 6, 2020.
Notice of Allowance dated Jun. 29, 2021, U.S. Appl. No. 17/091,940, filed Nov. 6, 2020.
International Search Report and Written Opinion dated Mar. 15, 2021, PCT Application No. PCT/EP2020/067045.
International Search Report and Written Opinion dated Mar. 12, 2021, PCT Application No. PCT/EP2020/067044.
De la Cruz Salas, Luis M., "Computational Methods for Oil Recovery", Instituto de Geofisica Universidad Nacional Autonoma de Mexico, Jan. 2011, Slides 1-97 (Year: 2011).
Lashgari, Hamid R., et al., "A Four-Phase Chemical/Gas Model in an Implicit-Pressure/ Explicit-Concentration Reservoir Simulator," SPE J. 21 (2016): 1086-1105 (Year: 2016).
Thiruvenkatanathan Prad: "Seeing the LYTT: Real time flow profiling in hydrocarbon wells", Jun. 11, 2020 (Jun. 11, 2020). pp. 1-3, XP055776735, Retrieved from the Internet: URL:https://www.lytt.com/blog/the-new-tool-that-is-lytting-up-inflow-profiling [retrieved— on Feb. 16, 2021], p. 1 p. 2.
Office Action dated Jan. 7, 2022, U.S. Appl. No. 16/091,519, filed Oct. 4, 2018.
Office Action dated Dec. 12, 2020, EG Application No. PCT1590/2018.
Office Action dated Apr. 22, 2020, EA Application No. 201892228.
Office Action dated Nov. 23, 2020, EA Application No. 201892228.
Office Action dated Jun. 28, 2021, EA Application No. 201892228.
EP Rule 161(1) and 162 EPC Communication dated Jul. 12, 2018, EP Application No. 17715935.7.
European Office Action dated Feb. 22, 2022, EP Application No. 20170700.7.
Notice of Allowance dated Aug. 6, 2021, U.S. Appl. No. 16/291,929, filed Oct. 5, 2018.
Office Action dated Aug. 1, 2021, EG Application No. 1588/2018.
Office Action dated Mar. 23, 2020, EA Application No. 201892227.
Office Action dated Nov. 16, 2020, EA Application No. 201892227.
Office Action dated Jun. 17, 2021, EA Application No. 201892227.

EP Rule 161(1) and 162 EPC Communication dated Nov. 29, 2018, EP Application No. 17715932.4.
Intention to Grant dated Sep. 26, 2019, EP Application No. 17715932.4.
Decision to Grant dated Feb. 2, 2020, EP Application No. 17715932.4.
Notice of Allowance dated Aug. 23, 2021, U.S. Appl. No. 16/563,689, filed Sep. 6, 2019.
European Article 94(3) dated Jun. 8, 2020, EP Application No. 20154638.9.
Intention to Grant dated Feb. 25, 2021, EP Application No. 20154638.9.
Decision to Grant dated Jul. 15, 2021, EP Application No. 20154638.9.
Intention to Grant dated Feb. 23, 2021, for European Application No. 18714513.1.
Decision to Grant dated Jun. 24, 2021, for European Application No. 18714513.1.
Intention to Grant dated Feb. 3, 2021, for European Application No. 19198488.9.
Intention to Grant dated Nov. 23, 2021, for European Application No. 19198488.9.
Eurasian Notice of Allowance dated Apr. 29, 2021, for Eurasian Application No. 201992243/31.
TT Invitation to Amend dated Nov. 5, 2021, for Eurasian Application No. 201992243/31.
Notice of Allowance dated Aug. 10, 2021, U.S. Appl. No. 16/639,774, filed Feb. 18, 2020.
Eurasian Office Action dated Nov. 20, 2020, EA Application No. 2020090520.
Eurasian Office Action dated May 27, 2021, EA Application No. 2020090528.
EP Rule 161(1) and 162 EPC Communication dated Apr. 7, 2020, Ep Application No. 18765814.1.
Intention to Grant dated Mar. 16, 2021, Ep Application No. 18765814.1.
Decision to Grant dated Sep. 9, 2021, Ep Application No. 18765814.1.
International Preliminary Report on Patentability dated Jun. 24, 2021, PCT Application No. PCT/EP2019/057149.
GCC Examination Report dated Jan. 30, 2021, GCC Application No. 2019/38809.
EP Rule 161(1) and 162 EPC Communication dated Jul. 20, 2021, EP Application No. 19714346.4.
Office Action dated Aug. 25, 2021, U.S. Appl. No. 16/755,211, filed Apr. 10, 2020.
Notice of Allowance dated Jan. 21, 2022, U.S. Appl. No. 16/755,211, filed Apr. 10, 2020.
Eurasian Office Action dated Jan. 27, 2021, EA Application No. 202000867.
Eurasian Office Action dated Sep. 3, 2021, EA Application No. 202000867.
Eurasian Office Action dated Jan. 25, 2022, EA Application No. 202090867.
EP Rule 161(1) and 162 EPC Communication dated May 19, 2020, EP Application No. 18788701.3.
International Preliminary Report on Patentability dated Jun. 10, 2020, PCT Application No. PCT/EP2019/082808.
GCC Examination Report dated Nov. 17, 2020, GCC Application No. 2019/38718.
GCC Examination Report dated Jan. 6, 2021, GCC Application No. 2019/38718.
European Article 94(3) Examination Report dated Nov. 11, 2021, EP Application No. 19809084.7.
International Preliminary Report on Patentability dated Sep. 23, 2021, PCT Application No. PCT/EP2019/056425.
Office Action dated Nov. 5, 2021, U.S. Appl. No. 16/817,559, filed Mar. 12, 2021.
GCC Examination Report dated Jul. 26, 2021, GCC Application No. 2020/39381.
EP Rule 161(1) and 162 EPC Communication dated Oct. 21, 2021, EP Application No. 19712714.5.

(56) References Cited

OTHER PUBLICATIONS

Notification on Intention to Grant dated Mar. 5, 2022, EA Application No. 201892228.
Notice of Acceptance dated Mar. 24, 2022, AU Application No. 2017246520, filed on Oct. 3, 2018.
Decision to Grant dated Apr. 7, 2022, for European Application No. 19198488.9.
Notice of Acceptance dated Dec. 15, 2021, EA Application No. 2020090528.
International Preliminary Report on Patentability dated Mar. 31, 2022, PCT Application No. PCT/EP2019/075385.
International Preliminary Report on Patentability dated Mar. 31, 2022, PCT Application No. PCT/EP2019/075378.
International Preliminary Report on Patentability dated March 3, 3022, PCT Application No. PCT/US2019/046759.
International Preliminary Report on Patentability dated Mar. 10, 2022, PCT Application No. PCT/EP2020/072811.
International Preliminary Report on Patentability dated Apr. 28, 2022), PCT Application No. PCT/EP2019/078195.
International Preliminary Report on Patentability dated Mar. 31, 2022, PCT Application No. PCT/EP2019/075387.
International Preliminary Report on Patentability dated Mar. 31, 2022, PCT Application No. PCT/EP2019/075382.
International Preliminary Report on Patentability dated Apr. 28, 2022, PCT Application No. PCT/EP2019/085454.
GCC Examination Report dated Dec. 1, 2021, for GCC Application No. GC2020-40675.
International Preliminary Report on Patentability dated Apr. 28, 2022, PCT Application No. PCT/EP2019/078197.
Advisory Action dated Mar. 2, 2022, U.S. Appl. No. 17/071,021, filed Oct. 20, 2020.
Notice of Allowance dated Apr. 4, 2022, U.S. Appl. No. 17/071,021, filed Oct. 20, 2020.
Office Action dated Mar. 15, 2022, EA Application No. 202191441.
Examination Report dated Oct. 17, 2021, GC Application No. 2020-40879.
International Preliminary Report on Patentability dated Apr. 28, 2022, PCT Application No. PCT/EP2020/051817.
Ansari, Rafay et al., "Advanced Petrophysical Surveillance Improves the Understanding of Well Behavior in Unconventional Reservoirs," Society of Petroleum Engineers (SPE-170878-MS), The Netherlands, Oct. 27-29, 2014.
Final Office Action dated Apr. 4, 2022, U.S. Appl. No. 16/698,407, filed Nov. 27, 2019.
Notification on Intention to Grant dated Mar. 5, 2022, EA Application No. 201892227.
Office Action dated May 24, 2022, for U.S. Appl. No. 16/091,519 (7 p.).
Australian Examination Report dated Feb. 16, 2022, for Australian Application No. 2017246521 (4 p.).
Brazilian Preliminary Office Action dated May 10, 2022, for Brazilian Application No. BR112018070577-2 (6 p.).
Brazilian Preliminary Office Action dated May 10, 2022, for Brazilian Application No. BR112018070565-9 (6 p.).
Saudi Arabian Examination Report dated Feb. 28, 2022, for Saudi Arabian Application No. 518400183 (10 p.).
GCC Examination Report dated Dec. 16, 2020, for GCC Application No. 2018-36193 (6 p.).
European Examination Report dated May 17, 2022, for European Application No. 19809084.7 (6 p.).
European Rule 161/162 Communication dated May 24, 2022, for European Application No. 19794102.4 (3 p.).
PCT/EP2019/081542 International Preliminary Report on Patentability dated May 27, 2022 (9 p.).
PCT/EP2019/081545 International Preliminary Report on Patentability dated May 27, 2022 (9 p.).
Notice of Allowance dated Jun. 3, 2022, for U.S. Appl. No. 17/330,117 (7 p.).
European Rule 161/162 Communication dated May 24, 2022, for European Application No. 20702434.0.
Final Office Action dated Jun. 2, 2022, for U.S. Application No. Jun. 2, 2022 (19 p.).

* cited by examiner

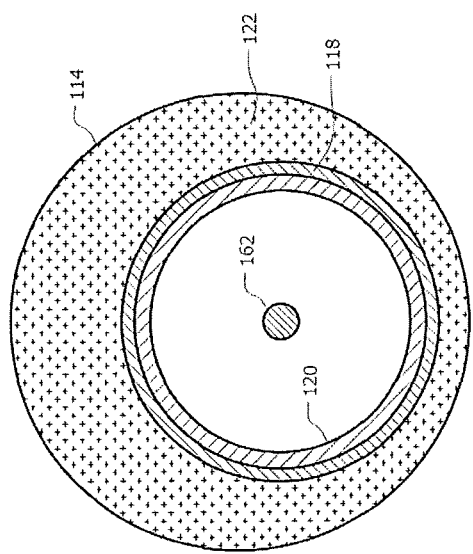
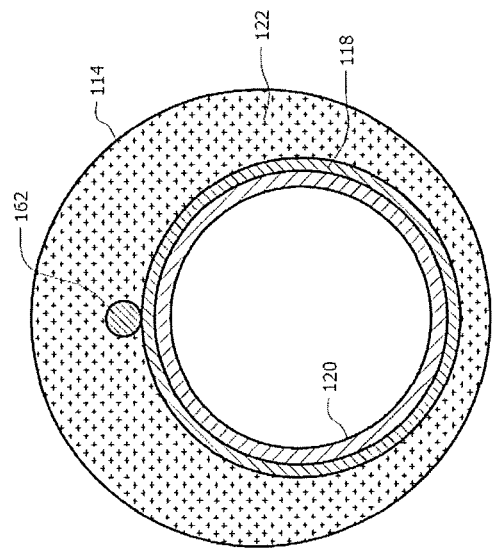

DISTRIBUTED ACOUSTIC SENSING AUTOCALIBRATION

CROSS-REFERENCE TO RELATED APPLICATIONS

This application claims the benefit of and priority to International Application No. PCT/EP2019/057149 filed Mar. 21, 2019 with the European Receiving office, and British Application No. GB 1820331.5 filed Dec. 13, 2018, as a foreign priority claim, where such applications are hereby incorporated herein by reference in their entirety for all purposes.

STATEMENT REGARDING FEDERALLY SPONSORED RESEARCH OR DEVELOPMENT

Not applicable.

BACKGROUND

Various events can occur that can be monitored. For example, the movement of vehicles, the operation of equipment, and the flow of fluids can all be monitored using various types of sensors. In the context of a hydrocarbon production well, various fluids such as hydrocarbons, water, gas, and the like can be produced from the formation into the wellbore. The production of the fluid can result in the movement of the fluids in various downhole regions, including with the subterranean formation, from the formation into the wellbore, and within the wellbore itself. For example, some subterranean formations can release solids, generally referred to as "sand," that can be produced along with the fluids into the wellbore.

Efforts have been made to detect and monitor the movement of various fluids including those with particles in them within the wellbore. For example, efforts to detect sand have been made using acoustic point sensors placed at the surface of the well and clamped onto the production pipe. Produced sand particles passing through the production pipe, along with the produced fluids (e.g., oil, gas or water), contact the walls of the pipe, especially at the bends and elbows of the production pipe. Such contact creates stress waves that are captured as sound signals by the acoustic sensors mounted on the pipe wall. However, these detection methods only capture the presence of the sand at or near the surface equipment and are qualitative at best (e.g., indicating the presence of sand only).

SUMMARY

In an embodiment, a method of detecting an event using different data sets comprises: obtaining a first sample data set, wherein the first sample data set is a sample of an acoustic signal, wherein the first sample data set is representative of the acoustic signal across a frequency spectrum, and wherein the first sample data set is obtained using at least one sampling system having a first physical configuration; determining at least one frequency domain feature of the first sample data set over a first time period; determining a first threshold for the at least one frequency domain feature using the first sample data set; determining that the at least one frequency domain feature matches the first threshold; determining the presence of an event during the first time period based on determining that the at least one frequency domain feature matches the first threshold; obtaining a second sample data set, wherein the second sample data set is a sample of an acoustic signal, wherein the second sample data set is representative of the acoustic signal across the frequency spectrum, and wherein the second sample data set is obtained using the at least one sampling system having a second physical configuration, wherein the first physical configuration is different than the second physical configuration; determining at least one frequency domain feature of the second sample data set over a second time period; determining a second threshold for the at least one frequency domain feature using the second sample data set; determining that the at least one frequency domain feature matches the second threshold; and determining the presence of the event during the second time period based on determining that the at least one frequency domain feature matches the second threshold.

In an embodiment, a method of separating background noise from an event, the method comprises: obtaining a sample data set, wherein the sample data set is a sample of an acoustic signal, and wherein the sample data set is representative of the acoustic signal across a frequency spectrum; determining at least one frequency domain feature of the sample data set over a first time period; determining a median absolute deviation of the at least one frequency domain feature over the first time period; determining a variability threshold for the at least one frequency domain feature based on the median absolute deviation; determining the at least one frequency domain feature of the sample data set over a second time period; comparing the at least one frequency domain feature in the second time period with the variability threshold; determining that the at least one frequency domain feature exceeds the variability threshold; comparing the at least one frequency domain feature to an event threshold when the at least one frequency domain feature exceeds the variability threshold; and determining the presence of an event associated with the event threshold based on determining that the at least one frequency domain feature matches the event threshold.

In an embodiment, a method of detecting an event comprises: obtaining a sample data set, wherein the sample data set is a sample of an acoustic signal, and wherein the sample data set is representative of the acoustic signal across a frequency spectrum; determining at least one frequency domain feature of the sample data set over a first time period; determining a median absolute deviation of the at least one frequency domain feature over the first time period; determining an event threshold value for the at least one frequency domain feature based on the median absolute deviation; determining the at least one frequency domain feature of the sample data set over a second time period; comparing the at least one frequency domain feature in the second time period with the event threshold; determining that the at least one frequency domain feature matches the event threshold; and determining the presence of an event based on determining that the at least one frequency domain feature matches the event threshold.

In an embodiment, a system of determining a sand migration path comprises: a processor; a memory; and a receiver unit in signal communication with the processor and the memory, wherein the receiver unit is configured to receive a first signal from a sensor, wherein a processing application is stored in the memory, and wherein the processing application, when executed on the processor, configures the processor to: obtain a sample data set from the first signal, wherein the sample data set is a sample of an acoustic signal, and wherein the sample data set is representative of the acoustic signal across a frequency spectrum; determine at least one frequency domain feature of the sample data set over a first time period; determine a median absolute deviation of the at least one frequency domain feature over the first time period; determine a variability threshold for the at least one frequency domain feature based on the median absolute deviation; determine the at least one frequency domain feature of the sample data set over a second time period; compare the at least one frequency domain feature in the second time period with the variability threshold; determine that the at least one frequency domain feature exceeds the variability threshold; compare the at least one frequency domain feature to an event threshold; and determine the presence of an event associated with the event threshold based on determining that the at least one frequency domain feature matches the event threshold.

In an embodiment, a method of detecting an event comprises: obtaining a sample data set, wherein the sample data set is a sample of an acoustic signal, and wherein the sample data set is representative of the acoustic signal across a frequency spectrum; determining a plurality of values of at least one frequency domain feature of the sample data set across a sample period within a first time period; determining a median value of the plurality of values of the at least one frequency domain feature across the first time period; determining a variability threshold for the at least one frequency domain feature based on the median value; determining the at least one frequency domain feature of the sample data set over a second time period; comparing the at least one frequency domain feature in the second time period with the variability threshold; determining that the at least one frequency domain feature matches the threshold; and determining the presence of an anomaly from a background signal based on determining that the at least one frequency domain feature matches the variability threshold.

In an embodiment, a method of detecting an event comprises: obtaining a sample data set, wherein the sample data set is a sample of an acoustic signal, and wherein the sample data set is representative of the acoustic signal across a frequency spectrum; determining a plurality of values of at least one frequency domain feature of the sample data set across a sample period within a first time period; determining a value of a variability in the plurality of values of the at least one frequency domain feature across the first time period; normalizing correcting the plurality of values of the at least one frequency domain feature based on the value of the variability to obtain a corrected plurality of values of the at least one frequency domain feature; and determining a presence of an event using the corrected plurality of values.

In an embodiment, a method of detecting an event comprises: obtaining a sample data set, wherein the sample data set is a sample of an acoustic signal, and wherein the sample data set is representative of the acoustic signal across a frequency spectrum; determining a value of a variability in the sample data set the first time period; correcting the sample data set based on the value of the variability to obtain a corrected sample data set; determining a plurality of values of at least one frequency domain feature of the corrected sample data set across a sample period within a first time period; and determining a presence of an event using the plurality of values of the at least one frequency domain feature.

These and other features will be more clearly understood from the following detailed description taken in conjunction with the accompanying drawings and claims.

Embodiments described herein comprise a combination of features and advantages intended to address various shortcomings associated with certain prior devices, systems, and methods. The foregoing has outlined rather broadly the features and technical advantages of the invention in order that the detailed description of the invention that follows may be better understood. The various characteristics described above, as well as other features, will be readily apparent to those skilled in the art upon reading the following detailed description, and by referring to the accompanying drawings. It should be appreciated by those skilled in the art that the conception and the specific embodiments disclosed may be readily utilized as a basis for modifying or designing other structures for carrying out the same purposes of the invention. It should also be realized by those skilled in the art that such equivalent constructions do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which:

FIGS. 3A and 3B are a schematic, cross-sectional views of embodiments of a well with a wellbore tubular having an optical fiber associated therewith.

DETAILED DESCRIPTION

Figure 1:
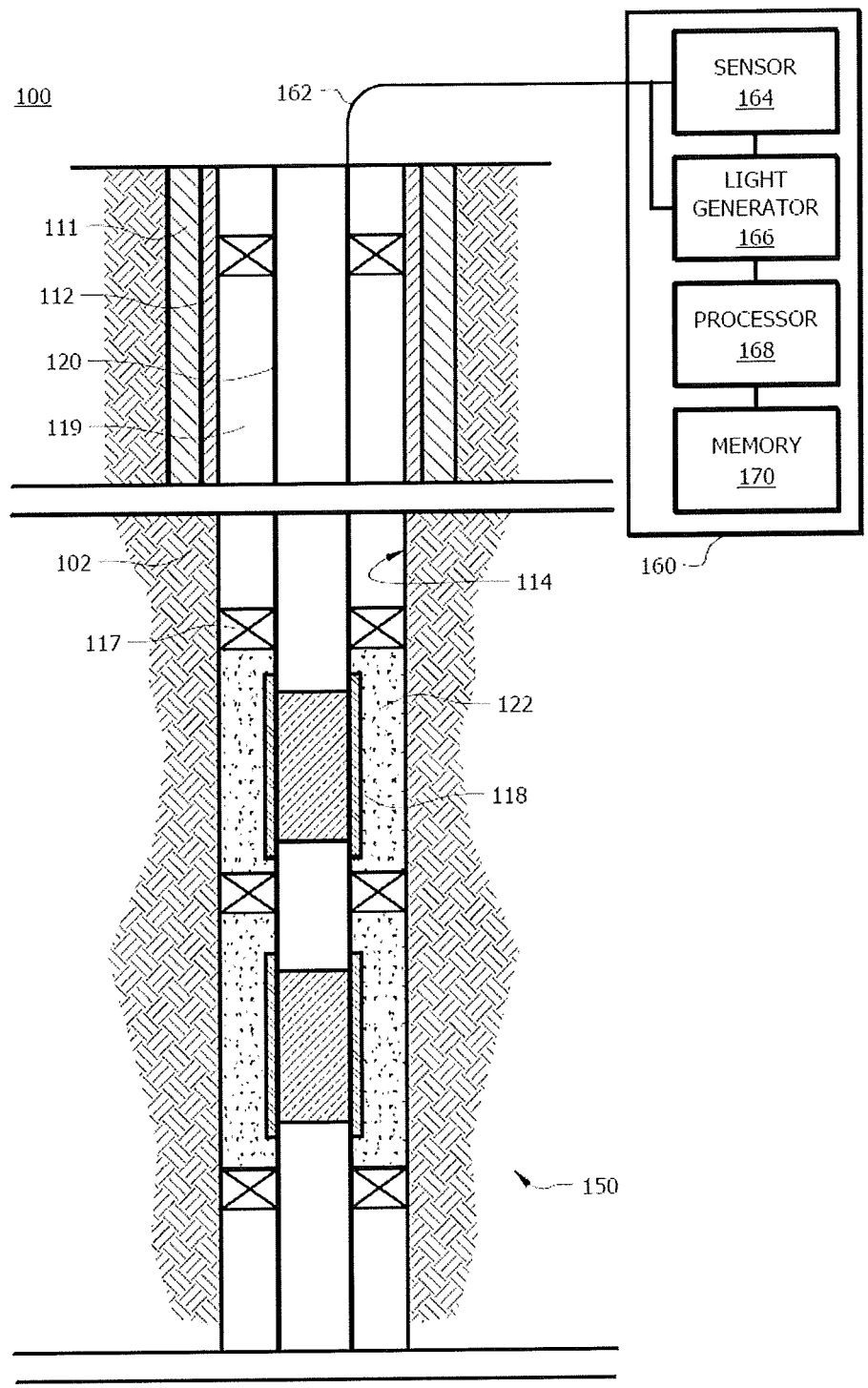
FIG. 1 is a schematic, cross-sectional illustration of a downhole wellbore environment according to an embodiment.

Unless otherwise specified, any use of any form of the terms "connect," "engage," "couple," "attach," or any other term describing an interaction between elements is not meant to limit the interaction to direct interaction between the elements and may also include indirect interaction between the elements described. In the following discussion and in the claims, the terms "including" and "comprising" are used in an open-ended fashion, and thus should be interpreted to mean "including, but not limited to". Reference to up or down will be made for purposes of description with "up," "upper," "upward," "upstream," or "above" meaning toward the surface of the wellbore and with "down," "lower," "downward," "downstream," or "below" meaning toward the terminal end of the well, regardless of the wellbore orientation. Reference to inner or outer will be made for purposes of description with "in," "inner," or "inward" meaning towards the central longitudinal axis of the wellbore and/or wellbore tubular, and "out," "outer," or "outward" meaning towards the wellbore wall. As used herein, the term "longitudinal" or "longitudinally" refers to an axis substantially aligned with the central axis of the wellbore tubular, and "radial" or "radially" refer to a direction perpendicular to the longitudinal axis. The various characteristics mentioned above, as well as other features and characteristics described in more detail below, will be readily apparent to those skilled in the art with the aid of this disclosure upon reading the following detailed description of the embodiments, and by referring to the accompanying drawings.

Disclosed herein is a real time signal processing architecture and auto-calibration/recalibration thereof that allows for the identification of various events that can be identified using acoustic signal data. The systems and methods can comprise data acquisition of acoustic signals, pre-processing, extraction of one or more frequency domain features, comparison of the extracted frequency domain feature(s) with event signatures or thresholds, and event identification, which are detailed hereinbelow.

Acoustic signals can be obtained from various locations or systems and used to identify and monitor various events. For example, acoustic sensors can be used to monitor events across an area or line. For example, a series of point source sensors (e.g., microphones) can be connected in a line or distributed through an area being monitored. When a fiber is used as in the DAS system, the fiber can pass along a line or path. For example, the fiber can pass through a pipeline, along a rail, a fence, or the like. In some aspects, the fiber is not limited to passing in a straight line and can pass in a non-linear manner throughout an area. For example, a single fiber can pass from one piece of equipment to the next when equipment is being monitored. Thus, as described herein, an acoustic sensor system can be used to obtain an acoustic sample from throughout an area or along a sensor path, which may not be a linear path in all aspects.

When the acoustic sensor or sensors are distributed throughout an area, a given acoustic sample can be obtained from more than one sensor. For example, when the distributed acoustic sensor comprises a plurality of point type acoustic sensors distributed over an area, an acoustic sample can be obtained from one particular point source sensor or across a plurality of the sensors. For example, an acoustic sample can be combined across various sensors, which can include in some aspects accounting for time of flight of sound between the individual sensors. The use of a plurality of sensors may provide an acoustic sample that allows for area effects to be taken into account in the spectral feature extraction process. For example, temporal and spatial effects can be taken into account when multiple acoustic samples for a given event are measured across an area or path.

Thus, acoustic signals in industries such as the transport industry (rail, traffic), security (perimeter security, pipeline monitoring), facilities monitoring (monitoring equipment such as electric submersible pumps, wind turbines, compressors), building monitoring, and the like can benefit from the use of the systems disclosed herein. For example, a rail line can be monitored to detect acoustic signals along the length of a rail, using for example, a fiber connected to the rail (either directly such as by attaching the fiber to the rail itself, or indirectly such as by arranging the fiber below the rail), along with a DAS unit. The length of the fiber along the rail can be considered a path of the fiber as it passes from the receiver/generator (e.g., the DAS unit) along the rail. Various acoustic signatures such as rail movements, maintenance vehicle movement, traffic movement, pedestrian traffic, train location and speed detection, rail damage or break detection, location of wheel damage, identification of landslide or avalanche locations, railway security applications, and the like can be detected based on acoustic signals originating along the length of the rail and/or fiber. These signals can be processed to extract one or more spectral features, and spectral signatures of such events can be determined or developed. Once obtained, the spectral signatures can be used to process acoustic signals at various lengths along the path of the fiber and determine the presence of the various events using the spectral features and spectral signatures.

Similar applications to those for railway detection can also be used for roadway detection. These can include monitoring of traffic flow, vehicle location and speed detection, detection of stopped vehicle locations, incident detection, and personnel detection using fibers associated with roadways. In some embodiments, the fibers can be coupled to the roadways, and/or disposed under or within paving surfaces.

Similarly, security systems can use distributed acoustic sensors (e.g., a fiber, individual acoustic sensors, etc.) to detect acoustic signals across a path or an area. Various security related events such as voices, footsteps, breaking glass, etc. can be detected by using the acoustic signals from the acoustic sensors and processing them to extract spectral features and compare those spectral features to spectral signals for various security related events. This can allow for various forms of perimeter intrusion detection.

In some embodiments, pipelines can be monitored using DAS systems having fibers associated with the pipelines. The pipelines can be monitored for leaks or structural degradation. Additional events such as ground movement (e.g., rock slides, etc.), maintenance around buried pipelines, and the like can also be monitored. Pipeline security can also be monitored using the DAS systems. For example, detection and alarming for illegal hot taps, vandalism, or other threats can also be implemented using the monitoring systems described herein.

The systems can also be used in utility systems to monitor various events. For example, power cable fault detection for onshore and offshore applications can be monitored. Other areas include mining and geothermal monitoring and carbon capture and storage monitoring. Other suitable areas can also rely on DAS monitoring over time and geographic areas.

Similarly, the acoustic monitoring techniques can be used with point source, which can be individual or connected along a path. For example, a facility having industrial equipment can be monitored using the acoustic monitoring techniques described herein. For example, a facility having any rotating equipment such as pumps, turbines, compressors, or other equipment can have an acoustic sensor monitoring the piece of equipment. Spectral signatures of various events can be determined for each type of equipment and used to monitor and identify the state of the equipment. For example, a pump can be monitored to determine if the pump is active or inactive, if fluid is flowing through the pump, if a bearing is bad, and the like all through the use of an acoustic sample and the spectral characteristic matching as described herein. When multiple pieces of equipment are present, a single acoustic sensor such as a fiber can be coupled to each piece of equipment. This configuration may allow a single interrogation unit to monitor multiple pieces of equipment using the spectral analysis by resolving a length along the fiber for each piece of equipment. Thus, a distributed acoustic monitoring system may not require multiple processors correlating to individual pieces of equipment.

Similarly, pipelines can be monitored in a manner similar to the way the wellbores are monitored as disclosed herein.

In this embodiment, the fiber may detect various events such as leaks, flow over a blockage or corrosion, and the like. This may allow for remote monitoring along the length of a pipeline.

Other types of industries can also benefit from the use of acoustic sensors to obtain acoustic samples that can be analysed and matched to events using spectral feature extraction. Any industry that experiences events that create acoustic signals can be monitored using the systems as described herein.

When obtaining acoustic signals, as described herein, there can be variability in the signal obtained. Variability can also result from a change in the physical system utilized to obtain the signal (e.g., reconnection of a fiber optic cable utilized to obtain the signal). The presence of such variability can result in the need to change the calibration and/or system parameters to account for the variability. To account for variability, raw data (e.g., signals from a sensor) can be corrected before being compared to a pre-selected frequency domain threshold(s) and/or a frequency domain threshold(s) can be corrected to account for variability in the raw signals obtained. Both options can be performed using raw values (e.g., raw data or frequency domain feature(s)) or corrected values (e.g., normalized or otherwise corrected data or frequency domain feature(s)). Systems and methods for data acquisition, preprocessing, frequency domain extraction, comparison with signatures/thresholds, and event identification will be described hereinbelow. Auto-calibration/re-calibration for use during frequency domain extraction and/or comparison with event signatures or thresholds will be provided thereafter.

The autocalibration procedure generally relates to the autocalibration of thresholds for processing acoustic data. An embodiment of a method for detecting an event can begin with an acoustic sensor such as a DAS system (e.g., as described in more detail below) obtaining, detecting, and/or receiving an acoustic signal, for example, from an optical fiber placed in a location of interest. The raw optical data from the acoustic sensor can be received and generated by the sensor coupled to the optical fiber to produce the acoustic signal. The data generated by the sensor can be stored in a memory for further processing.

The raw data can then be optionally pre-processed using a number of optional steps. For example, a spatial sample point filter can be applied to allow a specific location along the length of the fiber to be isolated for further analysis. The pre-processing step may also include removal of spurious back reflection type noises at specific lengths along the fiber through spatial median filtering or spatial averaging techniques. The filtered data can be transformed from the time domain into the frequency domain using a transform such as a Fourier transform (e.g., a Short time Fourier Transform or through Discrete Fourier transformation). By transforming the data after applying the spatial filter, the amount of data processed in the transform can be reduced. A noise normalization routine can be performed on the data to improve the signal quality.

After the acoustic signal is pre-processed, the sample data set can be used in an optional spectral conformance check process or routine. The spectral conformance check can compare the frequency domain features to thresholds or levels to verify if the signal, or the portion of the signal being analyzed, represents an event of interest as opposed to a background signal representing noise. When the signal contains one or more frequency domain features and/or combinations of frequency domain features, the signal can be further processed to determine an identity of the event.

The event identity can be determined by comparing a plurality of frequency domain features and/or combinations thereof with one or more event signatures. The event signatures can comprise ranges, formula, thresholds, or other mathematical expressions describing values or the plurality of frequency domain features and/or combinations thereof for different types of events. For example, flow within a conduit can have a first set of values or formulas defining the fluid flow, motion along a path can have a different set of values or formulas defining a motion event, and different wellbore events can have still other sets of values or formulas defining different wellbore events. The at least one frequency domain feature can comprise any of the frequency domain features described herein in more detail. For example, in some embodiments, the at least one frequency domain feature includes one or more of a spectral roll-off, a spectral skewness, an RMS band energy, a total RMS energy, sub-band energy, sub-band energy ratios, a spectral flatness, a spectral slope, a spectral kurtosis, a spectral flux, or a spectral autocorrelation function.

In some embodiments, autocalibration can comprise a recalibration of the event thresholds or formulas, and the recalibration can be performed in response to a variety of recalibration triggers, which can occur automatically or manually. In some embodiments, a recalibration can be performed in response to physical change in the DAS sensor system and/or the system being monitored. For example, in response to repositioning the fiber optic cable(s), changing the amount of light injected into the fiber optic cable, performing maintenance on the system, on a routine basis, and the like, a recalibration or auto-calibration may be performed. In such embodiments, a method of detecting an event using different data sets can include obtaining a first sample data set, where the first sample data set is representative of the acoustic signal across a frequency spectrum. The first sample data set can be obtained using at least one sampling system having a first physical configuration. For example, the first sample data set can be obtained using a DAS system having the fiber optic cable physically connected to the light source in a first configuration. At least one frequency domain feature (e.g., as described hereinabove) of the first sample data set over a first time period can then be determined. A first threshold value for the at least one frequency domain feature can be determined using the first sample data set. A comparison can be made between the first threshold value and the at least one frequency domain feature of the event signature. When it is determined that the at least one frequency domain feature matches the first threshold, it can be determined that the presence of the event corresponding to the event signature has occurred during the first time period.

A second sample data set (e.g., as described hereinabove) can be obtained, where the second sample data set can be a sample of an acoustic signal representative of the acoustic signal across the frequency spectrum. The second sample data set can be obtained using the at least one sampling system having a second physical configuration that is different than the first physical configuration. For example, the system (e.g., the optical fiber) could be physically moved or repositioned, and/or the optical fiber could be disconnected from and reconnected to the light source. Any physical changes that result in a change in the raw measurements obtained from the acoustic sensor could trigger a recalibration. At least one frequency domain feature of the second sample data set can be determined over a second time period, and a second threshold value for the at least one frequency domain feature can be determined using the second sample data set. A comparison can be made between the second threshold value and the at least one frequency domain feature of the event signature. When it is determined that the at least one frequency domain feature matches the second threshold, it can be determined (e.g., as described hereinabove) that the presence of the event corresponding to the event signature has occurred during the second time period.

In some embodiments, the recalibration can be based on a variability of the measured acoustic data. This can result from a change in the system that is not manually performed or of which the operator may not be aware. The changes can manifest as a change in the measurements from the system. This can result in a detection of an anomaly or as a change in the overall measurements from the system. The changes can occur in measurements separated spatially along the fiber and/or in time between subsequent measurements. For example, a median value of the at least one frequency domain feature of the second sample data set over a first portion of the second sample data set can be determined. The second threshold can then be determined using the median value. In some embodiments, the second threshold value can be normalized using the median value to obtain a normalized second threshold value. One or more of the at least one frequency domain feature obtained from the second sample data set can be normalized using the median value. When the values are normalized, the comparison and determination that the at least one frequency domain feature matches the second threshold can be carried out by comparing the normalized frequency domain feature(s) with the normalized second threshold. Alternatively, the determination of the second threshold can include determining a median absolute deviation of the at least one frequency domain feature of the second sample data set over at least a first portion of the second time period, and determining the second threshold for the at least one frequency domain feature based on the median absolute deviation.

In order to correct for variability in the measured data, one or more corrections can be made during the signal processes procedure. Corrections can be made to the data, for example in raw or standardized (e.g., normalized, etc.) form, and/or corrections can be made to the threshold against which the data is being compared. In some embodiments, the threshold(s) forming the event signatures can be recalibrated based on the variability in the data. For example, one or more frequency domain feature threshold that are used to define the event signatures can be recalibrated as part of the signal processing procedure. While this can occur based on a physical change in the system, the threshold(s) can also be recalibrated based on a change in the variability in the acoustic data, which can occur in some instances as a result of a change to the environment in which the sensor is placed.

In some embodiments, the frequency domain threshold can be recalibrated. The recalibration can occur in response to a physical change in the sensor configuration and/or in response to a change in the data. In some embodiments, the recalibration can be carried out periodically to allow for changes in the data to be taken into account automatically. In some embodiments, the difference between subsequent measurements of the acoustic signal across the location of interest can be calculated and used to identify when a recalibration should be performed. As used herein, subsequent measurements can refer to consecutive measurements or a later measurement that may be two or more measurements later in time. For example, the difference between subsequent measurements (e.g., between subsequent frequency domain feature calculations) can be determined across the location interval of interest. A determination of a standard deviation can be made across the entire location interval using the individual measurements, and when the difference values (or an average difference value) exceeds a threshold (e.g., 2 standard deviations, etc.), a recalibration can be triggered. Such a difference would indicate that there has been a large scale change in the characteristics of the signal, thereby indicating that a recalibration should be carried out.

The recalibration can be carried out as part of the signal processing routines described herein. Once a sample data set is obtained and at least one frequency domain feature is obtained from the sample data set, the recalibration process can include determining a median absolute deviation of the at least one frequency domain feature over the first time period. An event threshold value for the at least one frequency domain feature can then be determined based on the median absolute deviation. The at least one frequency domain feature of the sample data set can be determined over a second time period, and the at least one frequency domain feature in the second time period can be compared with the event threshold. When the comparison indicates that the at least one frequency domain feature matches the event threshold or signature, a determination of the presence of an event corresponding to the event threshold or signature can be made based on determining that the at least one frequency domain feature matches the event threshold. The at least one frequency domain feature can comprise any of the frequency domain features noted hereinabove. For example, in embodiments, the at least one frequency domain feature includes one or more of a spectral roll-off, a spectral skewness, an RMS band energy, a total RMS energy, a spectral flatness, a spectral slope, a spectral kurtosis, a spectral flux, or a spectral autocorrelation function. In specific embodiments, the at least one frequency domain feature comprises a spectral centroid and/or a spectral spread.

When the recalibration is based on the median absolute deviation, determining the median absolute deviation of the at least one frequency domain feature over the first time period can include selecting a location range from the sample data set and computing median values of the at least one frequency domain feature from the sample data set over the location range within the first time period. The median absolute deviation can then be determined from the median values for the first time period. The threshold value for the at least one frequency domain feature can then be determined by applying a calibration factor to the median absolute deviation. The calibration factor can be applied to the median absolute deviation to determine the threshold value.

The calibration factor can be selected based on a number of factors, and the calibration factor can represent a relative level of the threshold relative to the median absolute deviation of the detected values. In some embodiments, the calibration factor can be selected based on a predetermined sensitivity of the at least one frequency domain feature (e.g., a variability resulting from various events, etc.), the type of acoustic sensor, the manner in which the fiber optic cable is installed within the environment, or the like. For example, for frequency domain features that are less sensitive to various events, the calibration factor can be lower than for those frequency domain features having a high sensitivity to the events. Similarly, the calibration factor for an environment producing a higher level of acoustic signals can be lower than the calibration factor for an environment that is generating less acoustic signals since the variability in the acoustic readings for a louder environment can be expected to be higher. It is also expected that when the acoustic sensor system is placed in a less sensitive location, the calibration factor can be lower in order to identify events of interest where the signal strength may not be as high as with higher sensitivity locations.

In some embodiments, the median absolute deviation of the at least one frequency domain feature over the first time period can be determined by determining a plurality of values of the at least one frequency domain feature of the sample data set over the first time period, and determining a median value of the plurality of values. The median absolute deviation can then be determined based on the median value, a deviation from the median value for each value of the plurality of values, and a correction factor.

In some embodiments, determining the threshold value for the at least one frequency domain feature can include determining a plurality of initial threshold values using the median absolute deviation and a calibration factor defined for the at least one frequency domain feature, and determining the threshold using the median of the plurality of the initial threshold values.

Having described various autocalibration and recalibration processes generally, specific examples, including use with data obtained from a wellbore will be described. While described with respect to a wellbore, other uses such as surface flow line detection, motion detection, and the like can also be used with the autocalibration processes described herein. In some embodiments, a real time signal processing architecture and auto-calibration/recalibration thereof can allow for the identification of various downhole events including gas influx detection, downhole leak detection, well-barrier integrity monitoring, fluid inflow, and the identification of in-well sand ingress zones in real time or near real time. The systems and methods can comprise data acquisition of acoustic signals, pre-processing, extraction of one or more frequency domain features, comparison of the extracted frequency domain feature(s) with event signatures or thresholds, and event identification, which are detailed hereinbelow.

When obtaining acoustic signals, as described hereinbelow, there can be variability in the signal obtained. Variability can also result from a change in the physical system utilized to obtain the signal (e.g., reconnection of a fiber optic cable utilized to obtain the signal). The presence of such variability can result in the need to change the calibration and/or system parameters to account for the variability. To account for variability, raw data (e.g., signals from a sensor) can be corrected before being compared to a pre-selected frequency domain threshold(s) and/or a frequency domain threshold(s) can be corrected to account for variability in the raw signals obtained. Both options can be performed using raw values (e.g., raw data or frequency domain feature(s)) or corrected values (e.g., normalized or otherwise corrected data or frequency domain feature(s)). Systems and methods for data acquisition, preprocessing, frequency domain extraction, comparison with signatures/thresholds, and event identification will be described hereinbelow. Auto-calibration/recalibration for use during frequency domain extraction and/or comparison with event signatures or thresholds will be provided thereafter.

In some embodiments, the system allows for a quantitative measurement of various fluid flows such as a relative concentration of in-well sand ingress. As used herein, the term "real time" refers to a time that takes into account various communication and latency delays within a system, and can include actions taken within about ten seconds, within about thirty seconds, within about a minute, within about five minutes, or within about ten minutes of the action occurring. Various sensors (e.g., distributed fiber optic acoustic sensors, etc.) can be used to obtain an acoustic sampling at various points along the wellbore. The acoustic sample can then be processed using signal processing architecture with various feature extraction techniques (e.g., spectral feature extraction techniques) to obtain a measure of one or more frequency domain features that enable selectively extracting the acoustic signals of interest from background noise and consequently aiding in improving the accuracy of the identification of the movement of fluids and/or solids (e.g., sand ingress locations, gas influx locations, constricted fluid flow locations, etc.) in real time. As used herein, various frequency domain features can be obtained from the acoustic signal, and in some contexts the frequency domain features can also be referred to as spectral features or spectral descriptors.

The acoustic signal can be obtained in a manner that allows for a signal to be obtained along the entire wellbore or a portion of interest. While surface clamp-on acoustic detectors can provide an indication that certain events and/or fluid flows are occurring, they do not provide information about the depth in the production zone contributing to events such as sanding. Further, the methodology adopted for processing the clamp-on detector data for identifying the events from other acoustic "background" noise have only yielded qualitative and often inconsistent results. A number of other technical limitations currently hinder direct application of the technology for real time in-well acoustic detection. Fiber optic distributed acoustic sensors (DAS) capture acoustic signals resulting from downhole events such as gas influx, fluid flow past restrictions, sand ingress, and the like as well as other background acoustics as well. This mandates the need for a robust signal processing procedure that distinguishes sand ingress signals from other noise sources to avoid false positives in the results. This in turn results in a need for a clearer understanding of the acoustic fingerprint of in-well event of interest in order to be able to segregate a noise resulting from an event of interest from other ambient acoustic background noise. As used herein, the resulting acoustic fingerprint of a particular event can also be referred to as a spectral signature, as described in more detail herein.

Further, reducing deferrals resulting from one or more events and facilitating effective remediation relies upon near-real time decision support to inform the operator of the events. There is currently no technology/signal processing for DAS that successfully distinguishes and extracts event locations, let alone in near real time.

The ability to identify various events in the wellbore may allow for various actions (e.g., remediation procedures) to be taken in response to the events. For example, a well can be shut in, production can be increased or decreased, and/or remedial measures can be taken in the wellbore, as appropriate based on the identified event(s). An effective response, when needed, benefits not just from a binary yes/no output of an identification of in-well events but also from a measure of relative amount of fluids and/or solids (e.g., concentrations of sand, amount of gas inflow, amount of fluid flow past a restriction, etc.) from each of the identified zones so that zones contributing the greatest fluid and/or solid amounts can be acted upon first to improve or optimize production. For example, when a leak is detected past a restriction, a relative flow rate of the leak may allow for an identification of the timing in working to plug the leak (e.g., small leaks may not need to be fixed, larger leaks may need to be fixed with a high priority, etc.).

As described herein, spectral descriptors can be used with DAS acoustic data processing in real time to provide various downhole surveillance applications. More specifically, the data processing techniques can be applied for various for downhole fluid profiling such as fluid inflow/outflow detection, fluid phase segregation, well integrity monitoring, in well leak detection (e.g., downhole casing and tubing leak detection, leaking fluid phase identification, 4 etc.), annular fluid flow diagnosis; overburden monitoring, fluid flow detection behind a casing, fluid induced hydraulic fracture detection in the overburden, and the like. Application of the signal processing technique with DAS for downhole surveillance provides a number of benefits including improving reservoir recovery by monitoring efficient drainage of reserves through downhole fluid surveillance (well integrity and production inflow monitoring), improving well operating envelopes through identification of drawdown levels (e.g., gas, sand, water, etc.), facilitating targeted remedial action for efficient sand management and well integrity, reducing operational risk through the clear identification of anomalies and/or failures in well barrier elements.

In some embodiments, use of the systems and methods described herein may provide knowledge of the zones contributing to fluid inflow and/or sanding and their relative concentrations, thereby potentially allowing for improved remediation actions based on the processing results. The methods and systems disclosed herein can also provide information on the variability of the amount of fluid and/or sand being produced by the different sand influx zones as a function of different production rates, different production chokes, and downhole pressure conditions, thereby enabling choke control (e.g., automated choke control) for controlling sand production.

As disclosed herein, embodiments of the data processing techniques use a sequence of real time digital signal processing steps to isolate and extract the acoustic signal resulting from sand ingress from background noise, and allow real time detection of downhole sand ingress zones using distributed fiber optic acoustic sensor data as the input data feed.

Referring now to FIG. 1, an example of a wellbore operating environment 100 is shown. As will be described in more detail below, embodiments of completion assemblies comprising distributed acoustic sensor (DAS) system in accordance with the principles described herein can be positioned in environment 100.

As shown in FIG. 1, exemplary environment 100 includes a wellbore 114 traversing a subterranean formation 102, casing 112 lining at least a portion of wellbore 114, and a tubular 120 extending through wellbore 114 and casing 112. A plurality of spaced screen elements or assemblies 118 are provided along tubular 120. In addition, a plurality of spaced zonal isolation device 117 and gravel packs 122 are provided between tubular 120 and the sidewall of wellbore 114. In some embodiments the operating environment 100 includes a workover and/or drilling rig positioned at the surface and extending over the wellbore 114.

In general, the wellbore 114 can be drilled into the subterranean formation 102 using any suitable drilling technique. The wellbore 114 can extend substantially vertically from the earth's surface over a vertical wellbore portion, deviate from vertical relative to the earth's surface over a deviated wellbore portion, and/or transition to a horizontal wellbore portion. In general, all or portions of a wellbore may be vertical, deviated at any suitable angle, horizontal, and/or curved. In addition, the wellbore 114 can be a new wellbore, an existing wellbore, a straight wellbore, an extended reach wellbore, a sidetracked wellbore, a multi-lateral wellbore, and other types of wellbores for drilling and completing one or more production zones. As illustrated, the wellbore 114 includes a substantially vertical producing section 150, which is an open hole completion (i.e., casing 112 does not extend through producing section 150). Although section 150 is illustrated as a vertical and open hole portion of wellbore 114 in FIG. 1, embodiments disclosed herein can be employed in sections of wellbores having any orientation, and in open or cased sections of wellbores. The casing 112 extends into the wellbore 114 from the surface and is cemented within the wellbore 114 with cement 111.

Tubular 120 can be lowered into wellbore 114 for performing an operation such as drilling, completion, workover, treatment, and/or production processes. In the embodiment shown in FIG. 1, the tubular 120 is a completion assembly string including a distributed acoustic sensor (DAS) sensor coupled thereto. However, in general, embodiments of the tubular 120 can function as a different type of structure in a wellbore including, without limitation, as a drill string, casing, liner, jointed tubing, and/or coiled tubing. Further, the tubular 120 may operate in any portion of the wellbore 114 (e.g., vertical, deviated, horizontal, and/or curved section of wellbore 114). Embodiments of DAS systems described herein can be coupled to the exterior of the tubular 120, or in some embodiments, disposed within an interior of the tubular 120, as shown in FIGS. 3A and 3B. When the DAS is coupled to the exterior of the tubular 120, the DAS can be positioned within a control line, control channel, or recess in the tubular 120. In some embodiments, a sand control system can include an outer shroud to contain the tubular 120 and protect the system during installation. A control line or channel can be formed in the shroud and the DAS system can be placed in the control line or channel.

The tubular 120 extends from the surface to the producing zones and generally provides a conduit for fluids to travel from the formation 102 to the surface. A completion assembly including the tubular 120 can include a variety of other equipment or downhole tools to facilitate the production of the formation fluids from the production zones. For example, zonal isolation devices 117 are used to isolate the various zones within the wellbore 114. In this embodiment, each zonal isolation device 117 can be a packer (e.g., production packer, gravel pack packer, frac-pac packer, etc.). The zonal isolation devices 117 can be positioned between the screen assemblies 118, for example, to isolate different gravel pack zones or intervals along the wellbore 114 from each other. In general, the space between each pair of adjacent zonal isolation devices 117 defines a production interval.

The screen assemblies 118 provide sand control capability. In particular, the sand control screen elements 118, or other filter media associated with wellbore tubular 120, can be designed to allow fluids to flow therethrough but restrict and/or prevent particulate matter of sufficient size from flowing therethrough. The screen assemblies 118 can be of the type known as "wire-wrapped", which are made up of a wire closely wrapped helically about a wellbore tubular, with a spacing between the wire wraps being chosen to allow fluid flow through the filter media while keeping particulates that are greater than a selected size from passing between the wire wraps. Other types of filter media can also be provided along the tubular 120 and can include any type of structures commonly used in gravel pack well completions, which permit the flow of fluids through the filter or screen while restricting and/or blocking the flow of particulates (e.g. other commercially-available screens, slotted or perforated liners or pipes; sintered-metal screens; sintered-sized, mesh screens; screened pipes; prepacked screens and/or liners; or combinations thereof). A protective outer shroud having a plurality of perforations therethrough may be positioned around the exterior of any such filter medium.

The gravel packs 122 are formed in the annulus 119 between the screen elements 118 (or tubular 120) and the sidewall of the wellbore 114 in an open hole completion. In general, the gravel packs 122 comprise relatively coarse granular material placed in the annulus to form a rough screen against the ingress of sand into the wellbore while also supporting the wellbore wall. The gravel pack 122 is optional and may not be present in all completions.

The fluid flowing into the tubular 120 may comprise more than one fluid component that can flow in one or more flow regimes at different points along the wellbore. Typical components include natural gas, oil, water, steam, and/or carbon dioxide. The relative proportions of these components can vary over time based on conditions within the formation 102 and the wellbore 114. Likewise, the composition of the fluid flowing into the tubular 120 sections throughout the length of the entire production string can vary significantly from section to section at any given time.

Fluid produced into the wellbore 114 as well as fluid flowing along the length of the wellbore can create acoustic sounds that can be detected using an acoustic or vibrational sensor such as a DAS system. Similarly, various solid particles present in the formation can be produced along with a fluid (e.g., oil, water, natural gas, etc.). Such solid particles are referred to herein as "sand," and can include any solids originating within the subterranean formation regardless of size or composition. As the sand enters the wellbore 114, it may create acoustic sounds that can be detected using an acoustic sensor such as a DAS system. Each type of event such as the different fluid flows and fluid flow locations can produce an acoustic signature with unique frequency domain features. Within each type of generated signal, there can be variability in the acoustic signal, including within the spectral or frequency domain features. This variability can be used to modify or correct the event signature thresholds and/or the variability can be used as a basis for correcting the detected signals for purposes of comparison with established thresholds or signatures.

In FIG. 1, the DAS comprises an optical fiber 162 based acoustic sensing system that uses the optical backscatter component of light injected into the optical fiber for detecting acoustic perturbations (e.g., dynamic strain) along the length of the fiber 162. The light can be generated by a light generator or source 166 such as a laser, which can generate light pulses. The optical fiber 162 acts as the sensor element with no additional transducers in the optical path, and measurements can be taken along the length of the entire optical fiber 162. The measurements can then be detected by an optical receiver such as sensor 164 and selectively filtered to obtain measurements from a given depth point or range, thereby providing for a distributed measurement that has selective data for a plurality of zones along the optical fiber 162 at any given time. In this manner, the optical fiber 162 effectively functions as a distributed array of microphones spread over the entire length of the optical fiber 162, which typically spans at least the production zone 150 of the wellbore 114, to detect downhole acoustics.

The light reflected back up the optical fiber 162 as a result of the backscatter can travel back to the source, where the signal can be collected by a sensor 164 and processed (e.g., using a processor 168). In general, the time the light takes to return to the collection point is proportional to the distance traveled along the optical fiber 162. The resulting backscattered light arising along the length of the optical fiber 162 can be used to characterize the environment around the optical fiber 162. The use of a controlled light source 166 (e.g., having a controlled spectral width and frequency) may allow the backscatter to be collected and any disturbances along the length of the optical fiber 162 to be analyzed. In general, any acoustic or dynamic strain disturbances along the length of the optical fiber 162 can result in a change in the properties of the backscattered light, allowing for a distributed measurement of both the acoustic magnitude, frequency and in some cases of the relative phase of the disturbance.

An acquisition device 160 can be coupled to one end of the optical fiber 162. A physical connection can be formed between the acquisition device 160 and the optical fiber 162 such that the light source 166 can generate and insert the light into the fiber. As discussed herein, the light source 166 can generate the light (e.g., one or more light pulses), and the sensor 164 can collect and analyze the backscattered light returning up the optical fiber 162. In some contexts, the acquisition device 160 including the light source 166 and the sensor 164 can be referred to as an interrogator. The physical connection between the light source 166 and the optical fiber 162 can affect the signal strength and reflections such that each time the optical fiber 162 is connected, the detected signal from the same event can be different. For example, a variability in the detected signal can change between a first connection of the optical fiber to the light source and a second connection of the optical fiber to the light source. This variability can be accounted for using the processing techniques described herein.

In addition to the light source 166 and the sensor 164, the acquisition device 160 generally comprises a processor 168 in signal communication with the sensor 164 to perform various analysis steps described in more detail herein. While shown as being within the acquisition device 160, the processor can also be located outside of the acquisition device 160 including being located remotely from the acquisition device 160. The sensor 164 can be used to obtain data at various rates and may obtain data at a sufficient rate to detect the acoustic signals of interest with sufficient bandwidth. In some embodiment, depth resolution ranges of between about 1 meter and about 10 meters can be achieved, though longer or shorter intervals are possible. While the system 100 described herein can be used with a DAS system to acquire an acoustic signal for a location or depth range in the wellbore 114, in general, any suitable acoustic signal acquisition system can be used with the processing steps disclosed herein. For example, various microphones or other sensors can be used to provide an acoustic signal at a given location based on the acoustic signal processing described herein. The benefit of the use of the DAS system is that an acoustic signal can be obtained across a plurality of locations and/or across a continuous length of the wellbore 114 rather than at discrete locations.

Specific spectral signatures can be determined for each event by considering one or more frequency domain features. The resulting spectral signatures can then be used along with processed acoustic signal data to determine if an event is occurring at a depth range of interest. The spectral signatures can be determined by considering the different types of movement and flow occurring within a wellbore and characterizing the frequency domain features for each type of movement.

Figure 2:
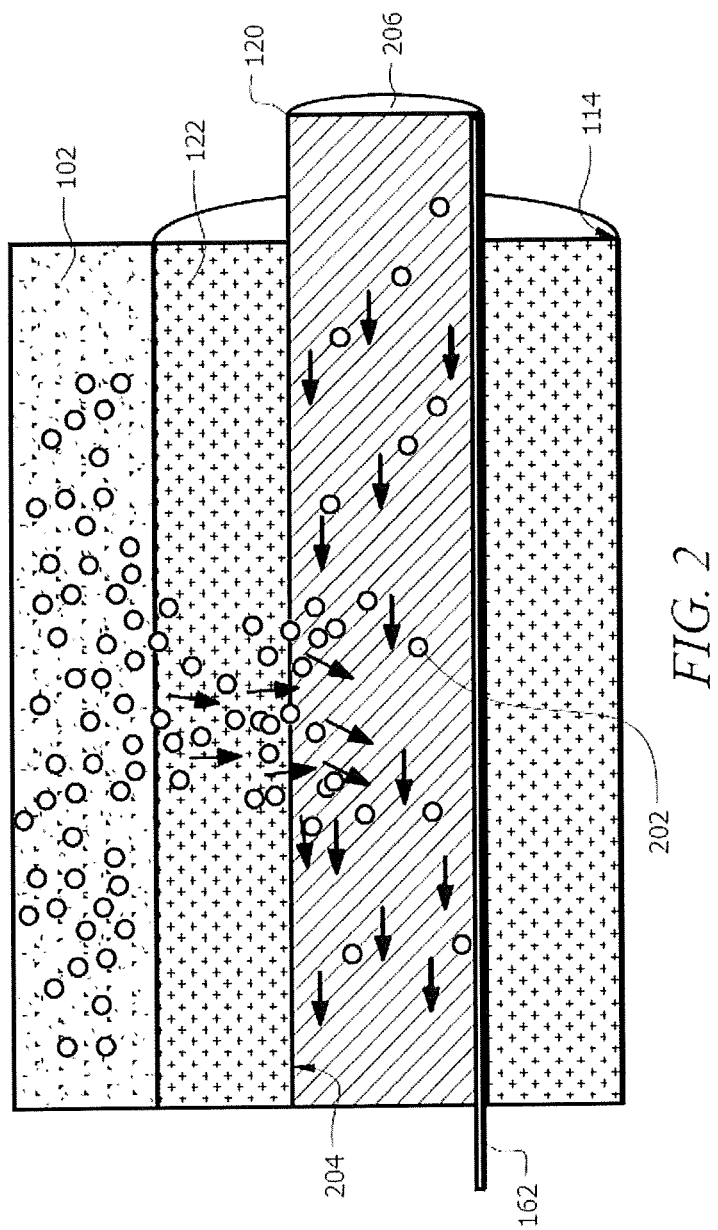
FIG. 2 is a schematic view of an embodiment of a wellbore tubular with sand ingress according to an embodiment.

As an example, sand ingress can be considered first. As schematically illustrated in FIG. 2 and shown in the cross-sectional illustrations in FIGS. 3A and 3B, sand 202 can flow from the formation 102 into the wellbore 114 and then into the tubular 120. As the sand 202 flows into the tubular 120, it can collide against the inner surface 204 of the tubular 120, and with the fiber itself in cases where the fiber is displaced within the tubular, in a random fashion. Without being limited by this or any particular theory, the intensity of the collisions depends on the effective mass and the rate of change in the velocity of the impinging sand particles. This can depend on a number of factors including, without limitation, the direction of travel of the sand 202 in the wellbore 114 and/or tubular 120. The resulting random impacts can produce a random, broadband acoustic signal that can be captured on the optical fiber 162 coupled (e.g., strapped) to the tubular 120. The random excitation response tends to have a broadband acoustic signal with excitation frequencies extending up to the high frequency bands, for example, up to and beyond about 5 kHz depending on the size of the sand particles. In general, larger particle sizes may produce higher frequencies. The intensity of the acoustic signal may be proportional to the concentration of sand 202 generating the excitations such that an increased broad band power intensity can be expected at increasing sand 202 concentrations. In some embodiments, the resulting broadband acoustic signals that can be identified can include frequencies in the range of about 5 Hz to about 10 kHz, frequencies in the range of about 5 Hz to about 5 kHz or about 50 Hz to about 5 kHz, or frequencies in the range of about 500 Hz to about 5 kHz. Any frequency ranges between the lower frequencies values (e.g., 5 Hz, 50 Hz, 500 Hz, etc.) and the upper frequency values (e.g., 10 kHz, 7 kHz, 5 kHz, etc.) can be used to define the frequency range for a broadband acoustic signal.

The sand 202 entering the wellbore 114 can be carried within a carrier fluid 206, and the carrier fluid 206 can also generate high intensity acoustic background noise when entering the wellbore 114 due to the turbulence associated with the fluid flowing into the tubular 120. This background noise generated by the turbulent fluid flow is generally expected to be predominantly in a lower frequency region. For example, the fluid inflow acoustic signals can be between about 0 Hz and about 500 Hz, or alternatively between about 0 Hz and about 200 Hz. An increased power intensity can be expected at low frequencies resulting from increased turbulence in the carrier fluid flow. The background noises can be detected as superimposed signals on the broadband acoustic signals produced by the sand 202 when the sand ingress occurs.

A number of acoustic signal sources can also be considered along with the types of acoustic signals these sources generate. In general, a variety of signal sources can be considered including fluid flow with or without sand through the formation 102, fluid flow with or without sand 202 through a gravel pack 122, fluid flow with or without sand within or through the tubular 120 and/or sand screen 118, fluid flow with sand 202 within or through the tubular 120 and/or sand screen 118, fluid flow without sand 202 into the tubular 120 and/or sand screen 118, gas/liquid inflow, hydraulic fracturing, fluid leaks past restrictions (e.g., gas leaks, liquid leaks, etc.) mechanical instrumentation and geophysical acoustic noises and potential point reflection noise within the fiber caused by cracks in the fiber optic cable/conduit under investigation.

For the flow of fluid 206, with the potential for sand 202 to be carried with the flowing fluid 206, in the formation 102, the likelihood that any resulting acoustic signal would be captured by the optical fiber 162 is considered low. Further, the resulting acoustic signal would likely be dominated by low frequencies resulting from turbulent fluid flow. Similarly, the fluid flowing within the gravel pack 122 would likely flow with a low flow speed and therefore limit the generation and intensity of any acoustic signals created by the sand 202. Thus, the acoustic response would be expected to occur in the lower frequency range.

For the flow of fluid 206 with or without sand 202 through a gravel pack 122, the likelihood that any resulting acoustic signal would be captured by the acoustic sensor is also considered low. Further, the resulting acoustic signal would likely be dominated by low frequencies resulting from turbulent fluid flow.

For the flow of fluid 206 with or without sand 202 within or through the tubular 120, the likelihood of capturing an acoustic signal is considered high due to the proximity of the source of the acoustic signals to the optical fiber 162 coupled to the tubular 120. This type of flow can occur as the fluid 206 containing sand 202 flows within the tubular 120. Such flow would result in any sand flowing generally parallel to the inner surface 204 of the tubular 120, which would limit the generation of high frequency sounds as well as the intensity of any high frequency sounds that are generated. It is expected that the acoustic signals generated from the flow of the fluid 206 through the tubular 120 and/or sand screen 118 may be dominated by low frequency acoustic signals resulting from turbulent fluid flow.

Figure 4:
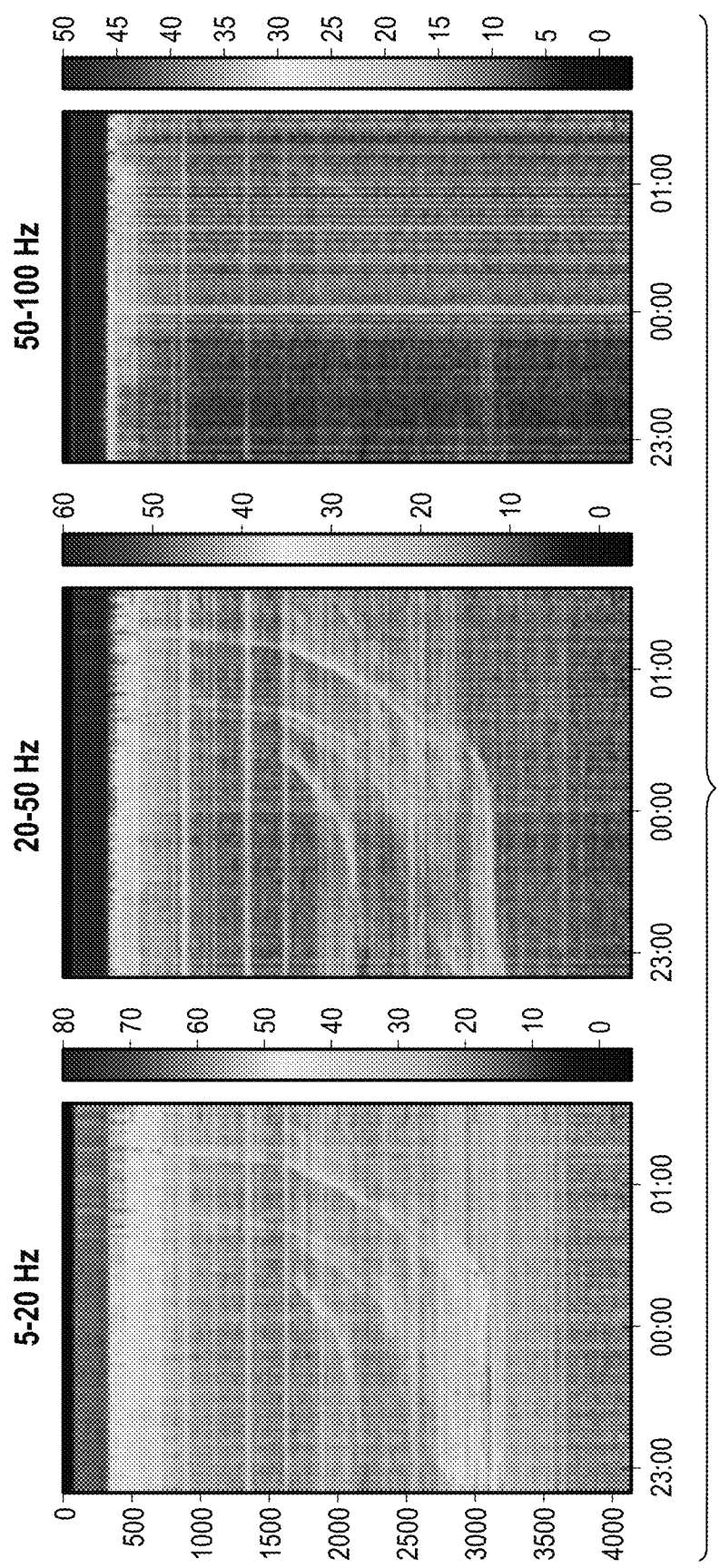
FIG. 4 is an exemplary frequency filtered acoustic intensity graph versus time over three frequency bands.

In an embodiment, the acoustic signal due to fluid 206 containing sand 202 within the tubular can be expected to have a rise in acoustic intensity from about 0 Hz to about 50 Hz, with a roll-off in power between about 20 Hz to about 50 Hz. An example of a signal of a fluid 206 containing sand 202 is shown in FIG. 4, which illustrates frequency filtered acoustic intensity in depth versus time graphs for three frequency bins. As illustrated, three frequency bins represent 5 Hz to 20 Hz, 20 Hz to 50 Hz, and 50 Hz to 100 Hz. The acoustic intensity can be seen in the first bin and second bin, with a nearly undetectable acoustic intensity in the frequency range between 50 Hz and 100 Hz. This demonstrates the acoustic roll-off for the flow of fluid containing sand within a wellbore tubular.

Returning to FIGS. 2-3, for the flow of fluid 206 without any sand 202 into the tubular 120 and/or sand screen 118, the proximity to the optical fiber 162 can result in a high likelihood that any acoustic signals generated would be detected by the acoustic sensor. As discussed herein, the flow of fluid 206 alone without any sand 202 is expected to produce an acoustic signal dominated by low frequency signals due to the acoustic signals being produced by turbulent fluid flow.

For the flow of fluid 206 with sand 202 into the tubular 120 and/or sand screen 118, the proximity to the optical fiber 162 can result in a high likelihood that any acoustic signals generated would be detected by the optical fiber 162. As further discussed herein, the flow of fluid 206 with the sand 202 would likely result in an acoustic signal having broadband characteristics with excitation frequencies extending up to the high frequency bands, for example, up to and beyond about 5 kHz.

Figure 5:
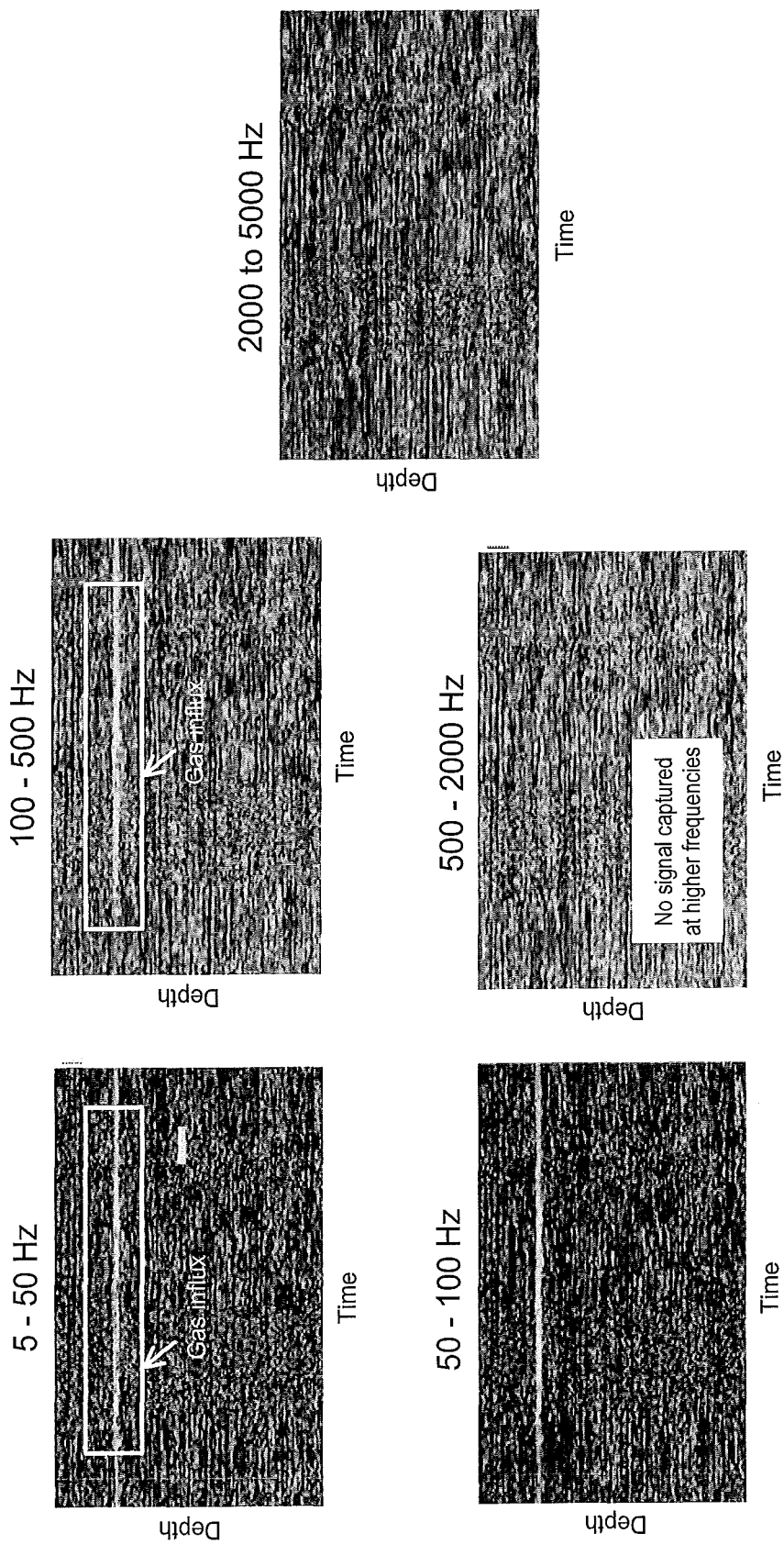
FIG. 5 is another exemplary frequency filtered acoustic intensity graph versus time over five frequency bands.

For the flow of gas into the wellbore, the proximity to the optical fiber 162 can result in a high likelihood that any acoustic signals generated would be detected by the optical fiber 162. The flow of a gas into the wellbore would likely result in a turbulent flow over a broad frequency range. For example, the gas inflow acoustic signals can be between about 0 Hz and about 1000 Hz, or alternatively between about 0 Hz and about 500 Hz. An increased power intensity may occur between about 300 Hz and about 500 Hz from increased turbulence in the gas flow. An example of the acoustic signal resulting from the influx of gas into the wellbore is shown in FIG. 5, which illustrates frequency filtered acoustic intensity in depth versus time graphs for five frequency bins. As illustrated, the five frequency bins represent 5 Hz to 50 Hz, 50 Hz to 100 Hz, 100 Hz to 500 Hz, 500 Hz to 2000 Hz, and 2000 Hz to 5000 Hz. The acoustic intensity can be seen in the first three bins with frequency ranges up to about 500 Hz, with a nearly undetectable acoustic intensity in the frequency range above 500 Hz. This demonstrates that at least a portion of the frequency domain features may not be present above 500 Hz, which can help to define the signature of the influx of gas.

For hydraulic fracturing, the self-induced fracturing of the subterranean formation due to various formation conditions can create an acoustic signal. The intensity of such signal may be detected by the optical fiber 162 depending on the distance between the fracture and the optical fiber 162. The resulting fracture can be expected to produce a wide band response having the acoustic energy present in a frequency band between about 0 Hz to about 400 Hz. Some amount of spectral energy can be expected up to about 1000 Hz. Further, the discrete nature of fracturing events may be seen as a nearly instantaneous broadband high energy event followed by a low-energy, lower frequency fluid flow acoustic signal resulting from fluid flow in response to the fracture.

For the flow of a fluid behind a casing in the wellbore, the proximity of the fluid flow to the optical fiber 162 can result in the acoustic signal being detected. The flow behind the casing can generally be characterized by a flow of fluid through one or more restrictions based on a generally narrow or small leak path being present. The flow through such a restriction may be characterized by an increase in spectral power in a frequency range between about 0 Hz to about 300 Hz with a main energy contribution in the range of about 0 Hz to about 100 Hz, or between about 0 Hz and about 70 Hz.

For acoustic signals generated by mechanical instrumentation and geophysical acoustic noises, the sounds can be detected by the optical fiber 162 in some instances depending on the distance between the sound generation and the portion of the optical fiber 162 being used to detect the sounds. Various mechanical noises would be expected to have low frequency sounds. For example, various motors can operate in the 50 Hz to 60 Hz range, and it is expected that the resulting acoustic signal would have a spectral energy in a narrow band. Various geophysical sounds may have even lower frequencies. As a result, it is expected that the sounds from the mechanical instrumentation and geophysical sources can be filtered out based on a low-pass frequency filter.

For point reflection type noises, these are usually broadband in nature but can occur at spatially confined depths and usually do not span the expected spatial resolution of the interrogator. These may be removed as part of the pre-processing steps by spatial averaging or median filtering the data through the entire depth of the fiber.

Based on the expected sound characteristics from the potential acoustic signal sources, the acoustic signature of each event can be defined relative to background noise contributions. For sand ingress, the acoustic signature can be seen as the presence of a distinct broadband response along with the presence of high frequency components in the resulting response. The uniqueness in the signature of sand enables application of selective signal isolation routines to extract the relevant information pertaining to sand ingress acoustics as described in the following description. The acoustic signatures of the other events can also be determined and used with the processing to enable identification of each event, even when the events occur at the same time in the same depth range. The combination of events can contribute to noise and variability in the signal, which can be addressed using the methods disclosed herein.

Referring again to FIG. 1, the processor 168 within the acquisition device 160 can be configured to perform various data processing to detect the presence of one or more events along the length of the wellbore 114. The acquisition device 160 can comprise a memory 170 configured to store an application or program to perform the data analysis. While shown as being contained within the acquisition device 160, the memory 170 can comprise one or more memories, any of which can be external to the acquisition device 160. In an embodiment, the processor 168 can execute the program, which can configure the processor 168 to filter the acoustic data set spatially, determine one or more frequency domain features of the acoustic signal, determine a variability in the acoustic signal, compare the resulting frequency domain feature values to the acoustic signatures, and determine whether or not an event is occurring at the selected location based on the analysis and comparison. The analysis can be repeated across various locations along the length of the wellbore 114 over a plurality of time periods to determine the occurrence of one or more events and/or event locations along the length of the wellbore 114.

When the acoustic sensor comprises a DAS system, the optical fiber 162 can return raw optical data in real time or near real time to the acquisition unit 160. The intensity of the raw optical data is proportional to the acoustic intensity of the sound being measured. In some embodiment, the raw data can be stored in the memory 170 for various subsequent uses. The sensor 164 can be configured to convert the raw optical data into an acoustic data set. Depending on the type of DAS system employed, the optical data may or may not be phase coherent and may be pre-processed to improve the signal quality (e.g., for opto-electronic noise normalization de-trending single point-reflection noise removal through the use of median filtering techniques or even through the use of spatial moving average computations with averaging windows set to the spatial resolution of the acquisition unit, etc.).

In some cases, instead of producing a signal comprising raw optical data, it is also possible for the DAS system to determine the derivative of the raw optical data to produce a derivative signal.

Figure 6:
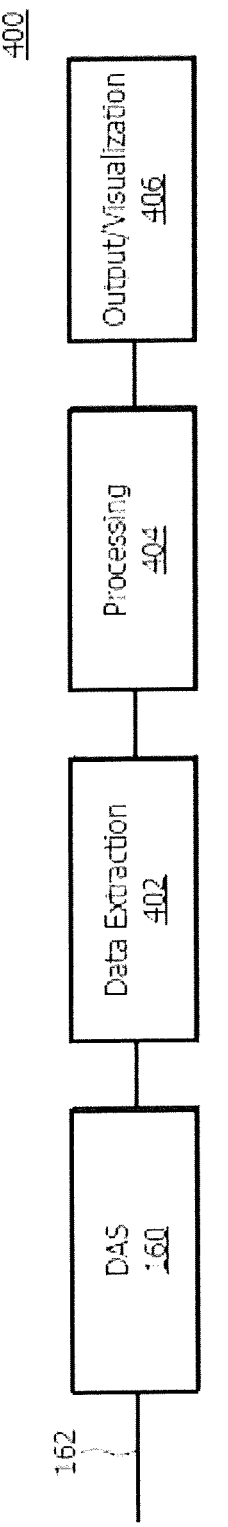
FIG. 6 illustrates an embodiment of a schematic processing flow for an acoustic signal.

As shown schematically in FIG. 6, an embodiment of a system for detecting one or more events in a wellbore can comprise a data extraction unit 402, a processing unit 404, and/or an output or visualization unit 406. The data extraction unit 402 can obtain the optical data and perform the initial pre-processing steps to obtain the initial acoustic information from the signal returned from the wellbore. Various analysis can be performed including frequency band extraction, frequency analysis and/or transformation, intensity and/or energy calculations, and/or determination of one or more properties of the acoustic data. Following the data extraction unit 402, the resulting signals can be sent to a processing unit 404.

Within the processing unit, the acoustic data can be analyzed to determine a variability in the data. The resulting variability determination can be used to correct the data and/or re-determine (e.g., recalibrate) one or more event thresholds. In some embodiments, the variability analysis can be carried out prior to the pre-processing steps such that the raw data can be analyzed and processed prior to extraction of any frequency domain features. Additional steps such as normalization can also be carried out in the initial processing steps to provide for a simplified processing intensity.

The steps such as the redetermination of the one or more event thresholds, the calibration of the raw data or determined frequency domain features and the like can be based on various triggers or events. In some embodiments, the difference between subsequent measurements of the acoustic signal across the depth of interest can be calculated and used to identify when a recalibration should be performed. As used herein, subsequent measurements can refer to consecutive measurements or a later measurement that may be two or more measurements later in time. For example, the difference between subsequent measurements (e.g., between subsequent frequency domain feature calculations) can be determined across the depth interval of interest. A determination of a standard deviation can be made across the entire depth interval using the individual measurements, and when the difference vales (or an average difference value) exceeds a threshold (e.g., 2 standard deviations, etc.), a recalibration can be triggered. Such a difference would indicate that there has been a large scale change in the characteristics of the signal, thereby indicating that a recalibration should be carried out.

Within the processing unit, the acoustic data can be analyzed, for example, by being compared to one or more acoustic signatures to determine if an event of interest is present. In some embodiments, the acoustic signatures can define thresholds or ranges of frequencies and/or frequency domain features. The analysis can then include comparing one or more thresholds or references to determine if a specific signal is present. The processing unit 404 can use the determination to determine the presence of one or more events (e.g., sand inflow, fluid inflow, fluid leaks, fluid etc.) at one or more locations based on the presence of an acoustic signal matching one or more acoustic signatures, and in some embodiments, the presence of the acoustic signal matching the one or more acoustic signatures. The resulting analysis information can then be sent from the processing unit 404 to the output/visualization unit 406 where various information such as a visualization of the location of the one or more events and/or information providing quantification information (e.g., an amount of sand inflow, a type of fluid influx, an amount of fluid leaking, and the like) can be visualized in a number of ways. In some embodiments, the resulting event information can be visualized on a well schematic, on a time log, or any other number of displays to aid in understanding where the event is occurring, and in some embodiments, to display a relative amount of the flow of a fluid and/or sand occurring at one or more locations along the length of the wellbore. While illustrated in FIG. 6 as separate units, any two or more of the units shown in FIG. 6 can be incorporated into a single unit. For example, a single unit can be present at the wellsite to provide analysis, output, and optionally, visualization of the resulting information.

A number of specific processing steps can be performed to determine the presence of an event. In some embodiments, noise detrended "acoustic variant" data can be subjected to an optional spatial filtering step following the pre-processing steps, if present. This is an optional step and helps focus primarily on an interval of interest in the wellbore. In some embodiments, the spatial filtering can narrow the focus of the analysis to a reservoir section and also allow a reduction in data, thereby simplifying the data analysis operations. The resulting data set produced through the conversion of the raw optical data can be referred to as the acoustic sample data.

This type of filtering can provide several advantages. Whether or not the acoustic data set is spatially filtered, the resulting data, for example the acoustic sample data, used for the next step of the analysis can be indicative of an acoustic sample over a defined depth (e.g., the entire length of the optical fiber, some portion thereof, or a point source in the wellbore 114). In some embodiments, the acoustic data set can comprise a plurality of acoustic samples resulting from the spatial filter to provide data over a number of depth ranges. In some embodiments, the acoustic sample may contain acoustic data over a depth range sufficient to capture multiple points of interest. In some embodiments, the acoustic sample data contains information over the entire frequency range at the depth represented by the sample. This is to say that the various filtering steps, including the spatial filtering, do not remove the frequency information from the acoustic sample data.

The processor 168 can be further configured to extract one or more frequency domain features. For example, Discrete Fourier transformations (DFT), a short time Fourier transform (STFT), wavelet analysis, or the like of the acoustic variant time domain data measured can be used at each depth section along the fiber or a section thereof to spectrally check the conformance of the acoustic sample data to one or more acoustic signatures. The spectral conformance check can be used to determine if the expected signature of an event is present in the acoustic sample data. Spectral feature extraction through time and space can be used to determine the spectral conformance and determine if an acoustic signature (e.g., a sand ingress signature, fluid inflow signature(s), hydraulic fracturing signature, etc.) is present in the acoustic sample. Within this process, various frequency domain features can be calculated for the acoustic sample data.

The use of the frequency domain features to identify one or more events has a number of advantages. First, the use of the frequency domain features results in significant data reduction relative to the raw DAS data stream. Thus, a number of frequency domain features can be calculated to allow for event identification while the remaining data can be discarded or otherwise stored, while the remaining analysis can performed using the frequency domain features. Even when the raw DAS data is stored, the remaining processing power is significantly reduced through the use of the frequency domain features rather than the raw acoustic data itself. Further, the use of the frequency domain features provides a concise, quantitative measure of the spectral character or acoustic signature of specific sounds pertinent to downhole fluid surveillance and other applications that may directly be used for real-time, application-specific signal processing.

While a number of frequency domain features can be determined for the acoustic sample data, not every frequency domain feature may be used in the characterization of each acoustic signature. Rather, subsets of the frequency domain features can be used to define the event signatures, and in some embodiments, combinations of two or more frequency domain features can be used to define the event signatures.

As a further consideration in selecting the frequency domain feature(s) for an event, the dimensionality of the frequency domain feature should be compact. A compact representation is desired to decrease the computational complexity of subsequent calculations. The frequency domain feature should also have discriminant power. For example, for different types of audio signals, the selected set of descriptors should provide altogether different values. A measure for the discriminant power of a feature is the variance of the resulting feature vectors for a set of relevant input signals. Given different classes of similar signals, a discriminatory descriptor should have low variance inside each class and high variance over different classes. The frequency domain feature should also be able to completely cover the range of values of the property it describes. As an example, the chosen set of frequency domain features should be able to uniquely identify the signatures of each of the acoustic signals pertaining to a selected downhole surveillance application or event as described herein. Such frequency domain features can include, but are not limited to, the spectral centroid, the spectral spread, the spectral roll-off, the spectral skewness, the root mean square (RMS) band energy (or the normalized sub-band energies/band energy ratios), a loudness or total RMS energy, a spectral flux, and a spectral autocorrelation function.

The spectral centroid denotes the "brightness" of the sound captured by the optical fiber 162 and indicates the center of gravity of the frequency spectrum in the acoustic sample. The spectral centroid can be calculated as the weighted mean of the frequencies present in the signal, where the magnitudes of the frequencies present can be used as their weights in some embodiments. The value of the spectral centroid, $C_i$, of the $i^{th}$ frame of the acoustic signal captured at a spatial location on the fiber, may be written as;

$$C_i = \frac{\sum_{k=1}^{N} f(k) X_i(k)}{\sum_{k=1}^{N} X_i(k)} \quad \text{(Eq. 1)}$$

Where $X_i(k)$, is the magnitude of the short time Fourier transform of the $i^{th}$ frame where 'k' denotes the frequency coefficient or bin index, N denotes the total number of bins and f(k) denotes the centre frequency of the bin. The computed spectral centroid may be scaled to value between 0 and 1. Higher spectral centroids typically indicate the presence of higher frequency acoustics and help provide an immediate indication of the presence of high frequency noise. The calculated spectral centroid can be compared to a spectral centroid threshold or range for a given event, and when the spectral centroid meets or exceeds the threshold, the event of interest may be present.

The discussion below relating to calculating the spectral centroid is based on calculating the spectral centroid of a sample data set comprising optical data produced by the DAS system. In this case, when assessing whether a sample data set comprises a high frequency component, the calculated spectral centroid should be equal to or greater than a spectral centroid threshold. However, if, as discussed above, the sample data set comprises a derivative of the optical data, the calculated spectral centroid should be equal to or less than the spectral centroid threshold.

The absolute magnitudes of the computed spectral centroids can be scaled to read a value between zero and one. The turbulent noise generated by other sources such as fluid flow and inflow may typically be in the lower frequencies (e.g., under about 100 Hz) and the centroid computation can produce lower values, for example, around or under 0.1 post rescaling. The introduction of sand can trigger broader frequencies of sounds (e.g., a broad band response) that can extend in spectral content to higher frequencies (e.g., up to and beyond 5.000 Hz). This can produce centroids of higher values (e.g., between about 0.2 and about 0.7, or between about 0.3 and about 0.5), and the magnitude of change would remain fairly independent of the overall concentration of sanding assuming there is a good signal to noise ratio in the measurement assuming a traditional electronic noise floor (e.g., white noise with imposed flicker noise at lower frequencies). It could however, depend on the size of sand particles impinging on the pipe.

The spectral spread can also be determined for the acoustic sample. The spectral spread is a measure of the shape of the spectrum and helps measure how the spectrum is distributed around the spectral centroid. In order to compute the spectral spread, $S_i$, one has to take the deviation of the spectrum from the computed centroid as per the following equation (all other terms defined above):

$$S_i = \sqrt{\frac{\sum_{k=1}^{N} (f(k) - C_i)^2 X_i(k)}{\sum_{k=1}^{N} X_i(k)}} \quad \text{(Eq. 2)}$$

Lower values of the spectral spread correspond to signals whose spectra are tightly concentrated around the spectral centroid. Higher values represent a wider spread of the spectral magnitudes and provide an indication of the presence of a broad band spectral response. The calculated spectral spread can be compared to a spectral spread threshold or range, and when the spectral spread meets exceeds the threshold or falls within the range, the event of interest may be present. As in the case of the spectral centroid, the magnitude of spectral spread would remain fairly independent of the overall concentration of sanding for a sand ingress event assuming there is a good signal to noise ratio in the measurement. It can however, depend on the size and shape of the sand particles impinging on the pipe.

The spectral roll-off is a measure of the bandwidth of the audio signal. The Spectral roll-off of the $i^{th}$ frame, is defined as the frequency bin 'y' below which the accumulated magnitudes of the short-time Fourier transform reach a certain percentage value (usually between 85%-95%) of the overall sum of magnitudes of the spectrum.

$$\sum_{k=1}^{y} |X_i(k)| = \frac{c}{100} \sum_{k=1}^{N} |X_i(k)| \quad \text{(Eq. 3)}$$

Where c=85 or 95. The result of the spectral roll-off calculation is a bin index and enables distinguishing acoustic events based on dominant energy contributions in the frequency domain. (e.g., between gas influx and fluid flow, etc.)

The spectral skewness measures the symmetry of the distribution of the spectral magnitude values around their arithmetic mean.

The RMS band energy provides a measure of the signal energy within defined frequency bins that may then be used for signal amplitude population. The selection of the bandwidths can be based on the characteristics of the captured acoustic signal. In some embodiments, a sub-band energy ratio representing the ratio of the upper frequency in the selected band to the lower frequency in the selected band can range between about 1.5:1 to about 3:1. In some embodiments, the sub-band energy ratio can range from about 2.5:1 to about 1.8:1, or alternatively be about 2:1. In some embodiment, selected frequency ranges for a signal with a 5,000 Hz Nyquist acquisition bandwidth can include: a first bin with a frequency range between 0 Hz and 20 Hz, a second bin with a frequency range between 20 Hz and 40 Hz, a third bin with a frequency range between 40 Hz and 80 Hz, a fourth bin with a frequency range between 80 Hz and 160 Hz, a fifth bin with a frequency range between 160 Hz and 320 Hz, a sixth bin with a frequency range between 320 Hz and 640 Hz, a seventh bin with a frequency range between 640 Hz and 1280 Hz, an eighth bin with a frequency range between 1280 Hz and 2500 Hz, and a ninth bin with a frequency range between 2500 Hz and 5000 Hz. While certain frequency ranges for each bin are listed herein, they are used as examples only, and other values in the same or a different number of frequency range bins can also be used. In some embodiments, the RMS band energies may also be expressed as a ratiometric measure by computing the ratio of the RMS signal energy within the defined frequency bins relative to the total RMS energy across the acquisition (Nyquist) bandwidth. This may help to reduce or remove the dependencies on the noise and any momentary variations in the broadband sound.

The total RMS energy of the acoustic waveform calculated in the time domain can indicate the loudness of the acoustic signal. In some embodiments, the total RMS energy can also be extracted from the temporal domain after filing the signal for noise.

The spectral flatness is a measure of the noisiness/tonality of an acoustic spectrum. It can be computed by the ratio of the geometric mean to the arithmetic mean of the energy spectrum value and may be used as an alternative approach to detect broadbanded signals (e.g., such as those caused by sand ingress). For tonal signals, the spectral flatness can be close to 0 and for broader band signals it can be closer to 1.

The spectral slope provides a basic approximation of the spectrum shape by a linearly regressed line. The spectral slope represents the decrease of the spectral amplitudes from low to high frequencies (e.g., a spectral tilt). The slope, the y-intersection, and the max and media regression error may be used as features.

The spectral kurtosis provides a measure of the flatness of a distribution around the mean value.

The spectral flux is a measure of instantaneous changes in the magnitude of a spectrum. It provides a measure of the frame-to-frame squared difference of the spectral magnitude vector summed across all frequencies or a selected portion of the spectrum. Signals with slowly varying (or nearly constant) spectral properties (e.g.: noise) have a low spectral flux, while signals with abrupt spectral changes have a high spectral flux. The spectral flux can allow for a direct measure of the local spectral rate of change and consequently serves as an event detection scheme that could be used to pick up the onset of acoustic events that may then be further analyzed using the feature set above to identify and uniquely classify the acoustic signal.

The spectral autocorrelation function provides a method in which the signal is shifted, and for each signal shift (lag) the correlation or the resemblance of the shifted signal with the original one is computed. This enables computation of the fundamental period by choosing the lag, for which the signal best resembles itself, for example, where the autocorrelation is maximized. This can be useful in exploratory signature analysis/even for anomaly detection for well integrity monitoring across specific depths where well barrier elements to be monitored are positioned.

Any of these frequency domain features, or any combination of these frequency domain features, can be used to provide an acoustic signature for a downhole event. In an embodiment, a selected set of characteristics can be used to provide the acoustic signature for each event, and/or all of the frequency domain features that are calculated can be used as a group in characterizing the acoustic signature for an event. The specific values for the frequency domain features that are calculated can vary depending on the specific attributes of the acoustic signal acquisition system, such that the absolute value of each frequency domain feature can change between systems. In some embodiments, the frequency domain features can be calculated for each event based on the system being used to capture the acoustic signal and/or the differences between systems can be taken into account in determining the frequency domain feature values for each signature between the systems used to determine the values and the systems used to capture the acoustic signal being evaluated.

Figure 7:
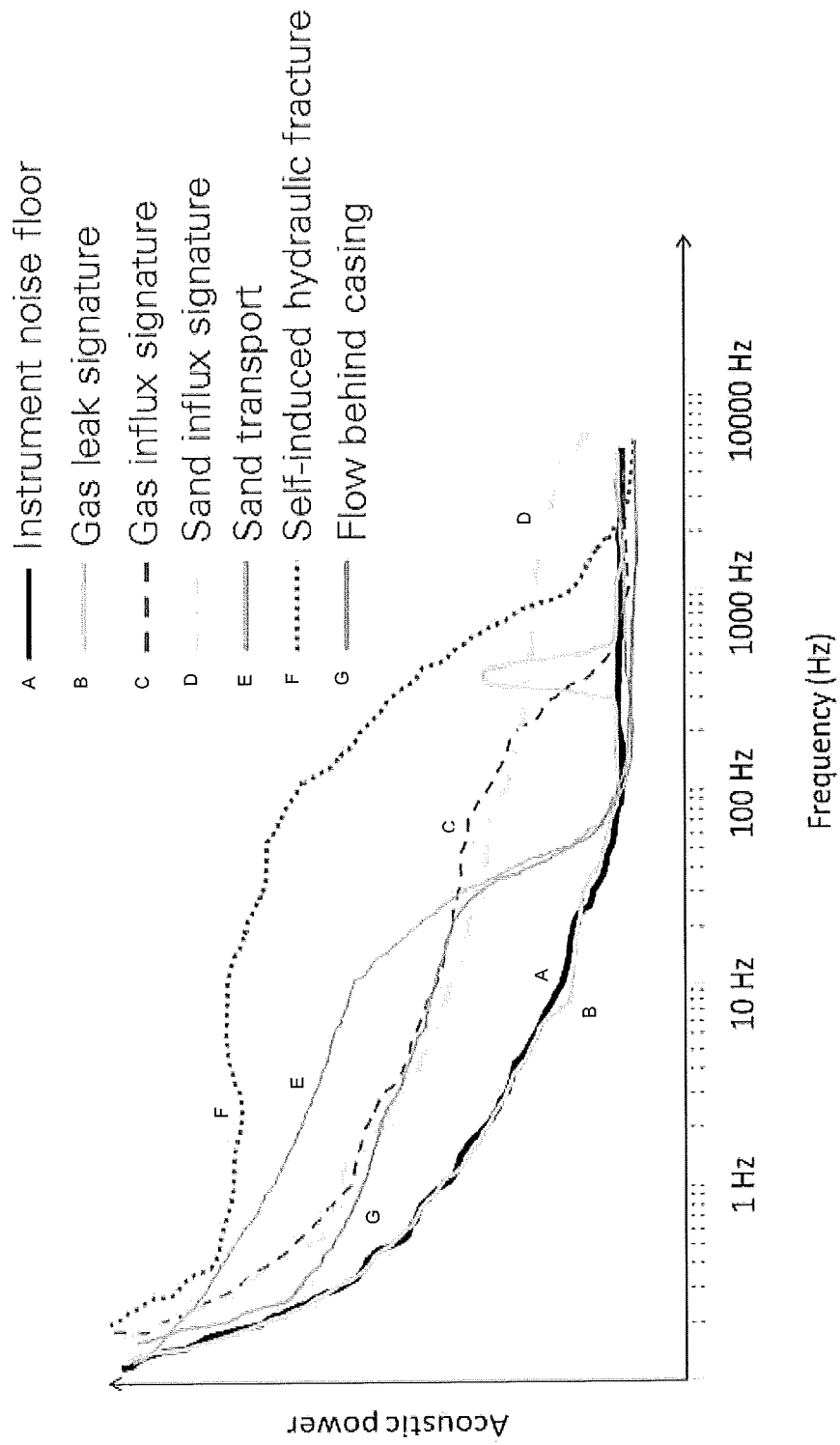
FIG. 7 illustrates an exemplary graph of acoustic power versus frequency for a plurality of downhole events.
Figure 8:
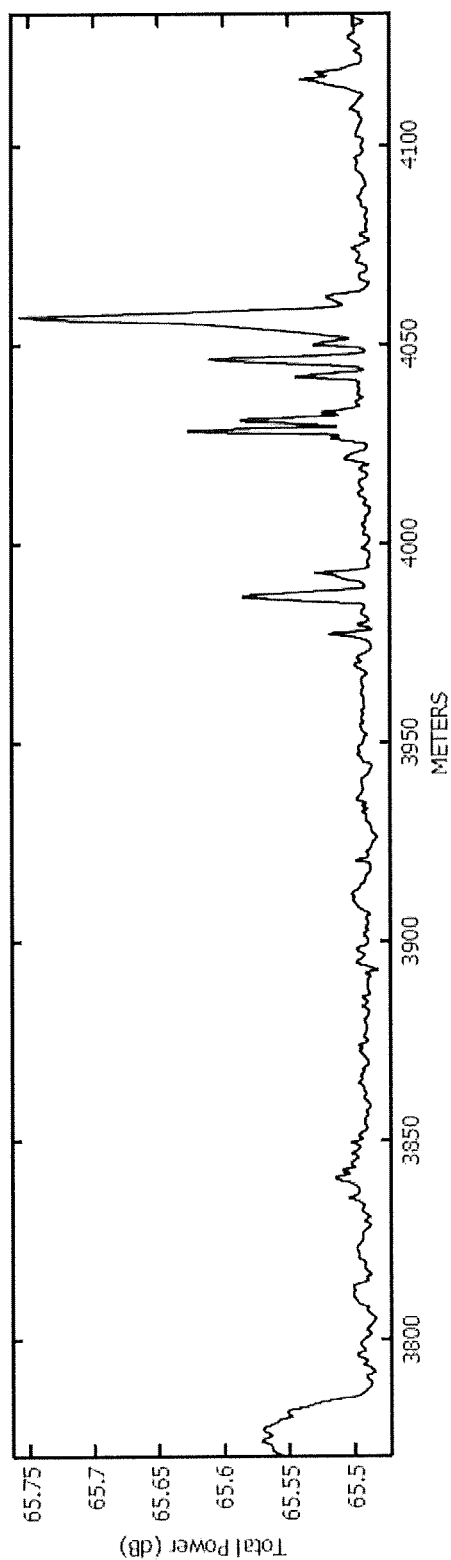
FIG. 8 is a generic representation of a sand log according to an embodiment.

FIG. 7 illustrates a number of different events on a chart of acoustic power versus frequency to demonstrate the differences in signatures. As shown, the event signatures for background instrument noise, gas leaks, fluid inflow into the wellbore, sand ingress or influx, sand transport within a tubular, a self-induced hydraulic fracture, and flow behind a casing are illustrated. A plurality of frequency domain features can be used to characterize each type of event. In an embodiment, at least two, alternatively at least three, alternatively at least four, alternatively at least five, alternatively at least six, alternatively at least seven, or alternatively at least eight different frequency domain features. While FIG. 7 only displays acoustic power, the relative frequencies present are illustrated for exemplary purposes to demonstrate the uniqueness of the acoustic signal result from different events, which can be characterized using a plurality of frequency domain features.

In order to obtain the frequency domain features, the acoustic sample data can be converted to the frequency domain. In an embodiment, the raw optical data may contain or represent acoustic data in the time domain. A frequency domain representation of the data can be obtained using any suitable techniques such as a Fourier Transform, wavelet analysis, or the like. Various algorithms can be used as known in the art. In some embodiments, a Short Time Fourier Transform technique or a Discrete Time Fourier transform can be used. The resulting data sample may then be represented by a range of frequencies relative to their power levels at which they are present. The raw optical data can be transformed into the frequency domain prior to or after the application of the spatial filter and/or the variability analysis/correction. In some embodiments, the processor 168 can be configured to perform the conversion of the raw acoustic data and/or the acoustic sample data from the time domain into the frequency domain. In the process of converting the signal to the frequency domain, the power across all frequencies within the acoustic sample can be analyzed. The use of the processor 168 to perform the transformation may provide the frequency domain data in real time or near real time.

The processor 168 can then be used to analyze the acoustic sample data in the frequency domain to obtain one or more of the frequency domain features and provide an output with the determined frequency domain features for further processing. In some embodiments, the output of the frequency domain features can include features that are not used to determine the presence of every event.

The output of the processor with the frequency domain features for the acoustic sample data can then be used to determine the presence of one or more events at one or more locations in the wellbore corresponding to depth intervals over which the acoustic data is acquired or filtered. In some embodiments, the determination of the presence of one or more events can include comparing the frequency domain features with the frequency domain feature thresholds or ranges in each event signature. The frequency domain thresholds or ranges in each event signature can, in some embodiments, be modified based on the variability of the data as described in more detail herein. When the frequency domain features in the acoustic sample data match one or more of the event signatures, the event can be identified as having occurred during the sample data measurement period, which can be in real time. Various outputs can be generated to display or indicate the presence of the one or more events.

The matching of the frequency domain features to the event signatures can be accomplished in a number of ways. In some embodiments, a direct matching of the frequency domain features to the event signature thresholds or ranges can be performed across a plurality of frequency domain features. In some embodiments, machine learning or even deterministic techniques may be incorporated to allow new signals to be patterned automatically based on the descriptors. As an example, k-means clustering and k-nearest neighbor classification techniques may be used to cluster the events and classify them to their nearest neighbor to offer exploratory diagnostics/surveillance capability for various events, and in some instances, to identify new downhole events that do not have established event signatures. The use of learning algorithms may also be useful when multiple events occur simultaneously such that the acoustic signals stack to form the resulting acoustic sample data.

In some embodiments in which the spectral spread and the spectral centroid are used, the spectral spread can be computed using the spectral centroid, and so typically the spectral centroid is calculated first, followed by the spectral spread. This process can be used when a plurality of frequency domain features are calculated. The comparison of the frequency domain features with the corresponding threshold can occur in any order. In some embodiments, all of the frequency domain feature values can be calculated and compared to the corresponding threshold values or ranges to determine if an event such as sand ingress is present at the depth represented by the acoustic sample data. In other embodiments, less than all of the plurality of the frequency domain features (e.g., only one of the plurality of features, two of the plurality of features, etc.) may be determined first. If the value of the frequency domain features, whichever is determined first, is not within the corresponding threshold, the energy value for the depth or depth range represented by the acoustic sample data can be set to zero, and another sample can be processed. If the value is within than the corresponding threshold, then the next frequency domain feature can be determined and compared to the corresponding threshold. If the second comparison does not result in the property exceeding the threshold, the energy value for the depth range represented by the acoustic sample data can be set to zero. This process can then be repeated for each of the remaining plurality of frequency domain features until all of the values are compared to the threshold(s). This may result in a data point comprising a value of zero such that a resulting log may comprise a zero value at the corresponding depth. Only when all of frequency domain features meet or exceed (e.g., are within) the corresponding threshold is another value such as the energy or intensity value recorded on a data log for the well. The calculated values for the frequency domain features can be stored in the memory 170 for those acoustic sample data sets in depth and time meeting or exceeding the corresponding thresholds, and a value of zero can be stored in the memory 170 for those acoustic sample data sets not meeting or exceeding one or both of the corresponding thresholds.

The other events can also be identified in a similar manner. In some embodiments, a sand ingress event can be characterized by a threshold defining a spectral centroid and a spectral spread levels, a gas leak event can be characterized by a gas leak signature that comprises a threshold range for each of a plurality of spectral descriptors (e.g., the spectral spread, the spectral roll-off, the spectral skewness, the root mean square (RMS) band energy (or the normalized sub-band energies/band energy ratios), a loudness or total RMS energy, a spectral flux, and a spectral autocorrelation function). The gas leak signature can be indicative of a gas leak from a formation in the wellbore through a leak path. The processor, using the analysis application, can be configured to compare the spectral descriptor values to the thresholds and/or ranges and determine if a gas leak from the formation to the annulus in the wellbore has occurred. The determination of the spectral descriptor values can be performed in any order, and the determination can be made sequentially (e.g., verifying a first frequency domain feature is within a threshold and/or range, followed by a second frequency domain feature, etc.), or in parallel using the frequency domain features in the event signature.

In an embodiment, gas influx into the wellbore can be characterized by a gas influx signature comprising a threshold range for each of a plurality of spectral descriptors (e.g., the spectral spread, the spectral roll-off, the spectral skewness, the root mean square (RMS) band energy (or the normalized sub-band energies/band energy ratios), a loudness or total RMS energy, a spectral flux, and/or a spectral autocorrelation function). The gas influx signature can be indicative of a gas inflow from a formation into the wellbore. The processor, using the analysis application, can be configured to compare the plurality of spectral descriptor values to the thresholds and/or ranges and determine if gas influx from the formation to the annulus in the wellbore has occurred. The determination of the spectral descriptor values can be performed in any order, and the determination can be made sequentially (e.g., verifying a first frequency domain feature is within a threshold and/or range, followed by a second frequency domain feature, etc.), or in parallel using the frequency domain features in the event signature.

In an embodiment, liquid inflow into the wellbore can be characterized by a liquid inflow signature that comprises a spectral centroid threshold range and an RMS band energy range, and the frequency domain features can include a spectral centroid and RMS band energies in a plurality of bins. The liquid inflow signature can be indicative of a liquid inflow from a formation into the wellbore. The processor, using the analysis application, can be configured to compare the plurality of spectral descriptor values to the thresholds and/or ranges and determine if liquid inflow from the formation has occurred. The determination of the spectral descriptor values can be performed in any order, and the determination can be made sequentially (e.g., verifying a first frequency domain feature is within a threshold and/or range, followed by a second frequency domain feature, etc.), or in parallel using the frequency domain features in the event signature.

In an embodiment, sand transport within the wellbore can be characterized by a sand transport signature that comprises a spectral centroid threshold range and a spectral rolloff threshold, and the frequency domain features can include a spectral centroid and a spectral rolloff. The sand transport signature can be indicative of sand flowing within a carrier fluid within the wellbore. The processor, using the analysis application, can be configured to compare the plurality of spectral descriptor values to the thresholds and/or ranges and determine if sand transport within the wellbore has occurred. The determination of the spectral descriptor values can be performed in any order, and the determination can be made sequentially (e.g., verifying a first frequency domain feature is within a threshold and/or range, followed by a second frequency domain feature, etc.), or in parallel using the frequency domain features in the event signature.

In an embodiment, fluid flow past a sand restriction can be characterized by a sand restriction signature that comprises a spectral power threshold range, and the frequency domain features can comprise a spectral power. The sand restriction signature can be indicative of a liquid flow past a sand restriction in a tubular within the wellbore. The processor, using the analysis application, can be configured to compare the plurality of spectral descriptor values to the thresholds and/or ranges and determine if fluid flow past a sand restriction has occurred. The determination of the spectral descriptor values can be performed in any order, and the determination can be made sequentially (e.g., verifying a first frequency domain feature is within a threshold and/or range, followed by a second frequency domain feature, etc.), or in parallel using the frequency domain features in the event signature.

In an embodiment, fluid flow behind a casing (e.g., fluid flow through a leak path, etc.) can be characterized by a casing fluid flow signature that comprises a spectral power threshold range and one or more an RMS band energy ranges, and the frequency domain features can comprise a spectral centroid and RMS band energies in a plurality of bins. The casing fluid flow signature can be indicative of a fluid flow between a casing and a formation. The processor, using the analysis application, can be configured to compare the plurality of spectral descriptor values to the thresholds and/or ranges and determine if fluid flow behind a casing has occurred. The determination of the spectral descriptor values can be performed in any order, and the determination can be made sequentially (e.g., verifying a first frequency domain feature is within a threshold and/or range, followed by a second frequency domain feature, etc.), or in parallel using the frequency domain features in the event signature.

In an embodiment, the occurrence of a self-induced hydraulic fracture can be characterized by a self-induced hydraulic fracturing signature that comprises a spectral centroid threshold range and an RMS band energy range, and the frequency domain features can comprise a spectral centroid and RMS band energies in a plurality of bins. The self-induced hydraulic fracturing signature can be indicative of a formation of a self-induced fracture within a formation. The processor, using the analysis application, can be configured to compare the plurality of spectral descriptor values to the thresholds and/or ranges and determine if a self-induced hydraulic fracture has occurred. The determination of the spectral descriptor values can be performed in any order, and the determination can be made sequentially (e.g., verifying a first frequency domain feature is within a thresh-old and/or range, followed by a second frequency domain feature, etc.), or in parallel using the frequency domain features in the event signature.

In an embodiment, the presence of a fluid leak can be characterized by a fluid leak signature that comprises a spectral centroid threshold range and an RMS band energy range, and the frequency domain features can comprise a spectral centroid and RMS band energies in a plurality of bins. The fluid leak signature can be indicative of a liquid flow past a downhole plug within the wellbore. The processor, using the analysis application, can be configured to compare the plurality of spectral descriptor values to the thresholds and/or ranges and determine if fluid flow past a restriction such as a downhole plug has occurred. The determination of the spectral descriptor values can be performed in any order, and the determination can be made sequentially (e.g., verifying a first frequency domain feature is within a threshold and/or range, followed by a second frequency domain feature, etc.), or in parallel using the frequency domain features in the event signature.

In an embodiment, the occurrence of a fracture within the formation can be characterized by a fracturing signature that comprises a spectral centroid threshold range and an RMS band energy range, and the frequency domain features can comprise a spectral centroid and RMS band energies in a plurality of bins. The fracturing signature is indicative of a formation of a fracturing within a formation. The processor, using the analysis application, can be configured to compare the plurality of spectral descriptor values to the thresholds and/or ranges and determine if a fracture in the formation has occurred. The determination of the spectral descriptor values can be performed in any order, and the determination can be made sequentially (e.g., verifying a first frequency domain feature is within a threshold and/or range, followed by a second frequency domain feature, etc.), or in parallel using the frequency domain features in the event signature.

In addition to detecting the presence of one or more events at a depth or location in the wellbore 114, the analysis software executing on the processor 168 can be used to visualize the event locations or transfer the calculated energy values over a computer network for visualization on a remote location. In order to visualize one or more of the events, the energy or intensity of the acoustic signal can be determined at the depth interval of interest (e.g., reservoir section where the sand ingress locations are to be determined)

The intensity of the acoustic signal in the filtered data set can then be calculated, where the intensity can represent the energy or power in the acoustic data. A number of power or intensity values can be calculated. In an embodiment, the root mean square (RMS) spectral energy or sub-band energy ratios across the filtered data set frequency bandwidth can be calculated at each of the identified event depth sections over a set integration time to compute an integrated data trace of the acoustic energies over all or a portion of the length of the fiber as a function of time. This computation of an event log may be done repeatedly, such as every second, and later integrated/averaged for discrete time periods—for instance, at times of higher well drawdowns, to display a time-lapsed event log at various stages of the production process (e.g., from baseline shut-in, from during well ramp-up, from steady production, from high drawdown/production rates etc.). The time intervals may be long enough to provide suitable data, though longer times may result in larger data sets. In an embodiment, the time integration may occur over a time period between about 0.1 seconds to about 10 seconds, or between about 0.5 seconds and about a few minutes or even hours.

The resulting event log(s) computed every second can be stored in the memory 170 or transferred across a computer network, to populate an event database. The data stored/transferred in the memory 170 can include any of the frequency domain features, the filtered energy data set, and/or the RMS spectral energy through time, for one or more of the data set depths and may be stored every second. This data can be used to generate an integrated event log at each event depth sample point along the length of the optical fiber 162 along with a synchronized timestamp that indicates the times of measurement. In producing a visualization event log, the RMS spectral energy for depth sections that do not exhibit or match one or more event signatures can be set to zero. This allows those depth points or zones exhibiting or matching one or more of the event signatures to be easily identified.

As an example, the analysis software executing on the processor 168 can be used to visualize sand ingress locations or transfer the calculated energy values over a computer network for visualization on a remote location. In order to visualize the sand ingress, the energy or intensity of the acoustic signal, or at least the high frequency portion of the acoustic signal, can be determined at the depth interval of interest (e.g., reservoir section where the sand ingress locations are to be determined)

When the spectral descriptors have values above the corresponding thresholds in the event signature, the acoustic sample data can be filtered to obtain the acoustic data for the event of interest. In some embodiments, only the acoustic sample data meeting or exceeding the corresponding thresholds may be further analyzed, and the remaining acoustic sample data can have the value set to zero. The acoustic sample data sets meeting or exceeding the corresponding thresholds can be filtered with a high frequency filter.

The same analysis procedure can be used with any of the event signatures described herein. For example, the presence of one or more events can be determined. In some embodiments, the location and or discrimination between events may not be clear. One or more characteristics of the wellbore can then be changed to allow a second measurement of the acoustic signal to occur. For example, the production rate can be changed, the pressures can be changed, one or more zones can be shut-in, or any other suitable production change. For example, the production rate can be temporarily increased. The resulting data analysis can be performed on the data during the increased production period. In general, an increased fluid flow rate into the wellbore may be expected to increase the acoustic signal intensity at certain event locations such as a gas influx location, a sand ingress location, a fluid inflow location, or the like. Similarly, such a change may not change the intensity in other types of events such as fluid leaks, hydraulic fractures, and similar events. This may allow a signal to noise ratio to be improved in order to more clearly identify one event relative to another at one or more locations by, for example, providing for an increased signal strength to allow the event signatures to be compared to the resulting acoustic signal. The event energies can also be more clearly calculated based on the increased signal outputs. Once the zones of interest are identified, the production levels can be adjusted based on the event locations and amounts. Any changes in the presence of the events over time can be monitored using the techniques described herein and the operating conditions can be adjusted accordingly (e.g., dynamically adjusted, automatically adjusted, manually adjusted, etc.). While the data analysis has been described above with respect to the system 100, methods of identifying events within the wellbore (e.g., sand ingress locations along the length of a wellbore, hydraulic fractures, gas influx, etc.) can also be carried out using any suitable system. For example, the system of FIG. 1 can be used to carry out the identification method, a separate system at a different time and/or location can be used with acoustic data to perform the event identification method, and/or the method can be performed using acoustic data obtained from a different type of acoustic sensor where the data is obtained in an electronic form useable with a device capable of performing the method.

Additional data processing techniques can also be used to detect events in the wellbore. In some embodiments, the processor 168 can execute a program, which can configure the processor 168 to filter the acoustic data set spatially and spectrally to provide frequency band extracted (FBE) acoustic data over multiple frequency bands. This can be similar to the frequency bands described with respect to the RMS energies. The acoustic data set can be pre-processed and then frequency filtered in to multiple frequency bands at given intervals such as every second of data acquisition. The multiple frequency bands can include various ranges. As an example, the multiple frequency bands can include a first band from about 5 Hz to about 50 Hz; a second band from about 50 Hz to about 100 Hz; a third band from about 100 Hz to about 500 Hz; a fourth band from about 500 Hz to about 2000 Hz; a fifth band from about 2000 Hz to about 5000 Hz, and so on along the length of the fiber or a selected portion thereof, though other ranges for the frequency bands can also be used.).

The resulting FBE data can then be cross compared to identify zones with event signature corresponding to the FBE data. For example, the acoustic amplitudes in each of the multiple frequency bands can be compared to determine depths with response relative to a baseline acoustic signal. The baseline acoustic signal can be taken as the measured acoustics captured when the well is shut-in (e.g., without producing a fluid). In some embodiments, the baseline acoustic signal can comprise a time averaged acoustic signal over one or more portions of the wellbore. The time period for considering the average may be taken as long enough to avoid the potential of an event over the entire average. Any comparison of an acoustic signal comprising an event to the time average should then indicate an increased signal in at least one frequency ranges corresponding to the event frequency ranges of interest.

Using sand ingress detection as an example, additional data processing techniques can also be used to detect sand ingress locations. The resulting FBE data can then be cross compared to identify zones with the sand ingress signature to compute a representative sand log. For example, the acoustic amplitudes in each of the multiple frequency bands can be compared to determine depths with broadband response (e.g., zones where a response in all of the bands is observed) relative to a baseline acoustic signal. The baseline acoustic signal can be taken as the measured acoustics captured when the well is shut-in (e.g., without producing a fluid). In some embodiments, the baseline acoustic signal can comprise a time averaged acoustic signal over one or more portions of the wellbore. Any comparison of an acoustic signal comprising sand inflow to the time average should then indicate an increased signal in at least one broadband frequency range (e.g., in a frequency range having a frequency greater than 0.5 kHz such as 0.5 kHz to about 5 kHz). The zones having a broadband response can then be identified, and the acoustic RMS energies in the higher frequencies in the identified zones can be populated as the sand noise intensity as done in the previous described processing workflow. In addition to the systems described herein, various methods of determining the presence of one or more events can also be carried out. The methods can be performed using any of the systems described herein, or any other suitable systems. In an embodiment, a method of detecting an event within a wellbore can include obtaining a sample data set. The sample data set can be a sample of an acoustic signal originating within a wellbore comprising a fluid, and be representative of the acoustic signal across a frequency spectrum. A plurality of frequency domain features of the sample data set can be determined, and the plurality of spectral characteristics can be compared with corresponding threshold and/or ranges an event signature. When the plurality of frequency domain features match the event signature, the presence of the event within the wellbore can be determined based on the determination that that at least one spectral characteristic matches the event signature.

The event signature can include any of those described herein such as a gas leak from a subterranean formation into an annulus in the wellbore, a gas inflow from the subterranean formation into the wellbore, sand ingress into the wellbore, a liquid inflow into the wellbore, sand transport within a tubular in the wellbore, fluid flow past a sand plug in a tubular in the wellbore, fluid flow behind a casing, a self-induced hydraulic fracture within the subterranean formation, a fluid leak past a downhole seal, or a rock fracture propagation event.

The acoustic signal can include data for all of the wellbore or only a portion of the wellbore. An acoustic sample data set can be obtained from the acoustic signal. In an embodiment, the sample data set may represent a portion of the acoustic signal for a defined depth range or point. In some embodiments, the acoustic signal can be obtained in the time domain. For example, the acoustic signal may be in the form of an acoustic amplitude relative to a collection time. The sample data set may also be in the time domain and be converted into the frequency domain using a suitable transform such as a Fourier transform. In some embodiments, the sample data set can be obtained in the frequency domain such that the acoustic signal can be converted prior to obtaining the sample data set. While the sample data set can be obtained using any of the methods described herein, the sample data set can also be obtained by receiving it from another device. For example, a separate extraction or processing step can be used to prepare one or more sample data sets and transmit them for separate processing using any of the processing methods or systems disclosed herein.

Figure 9:
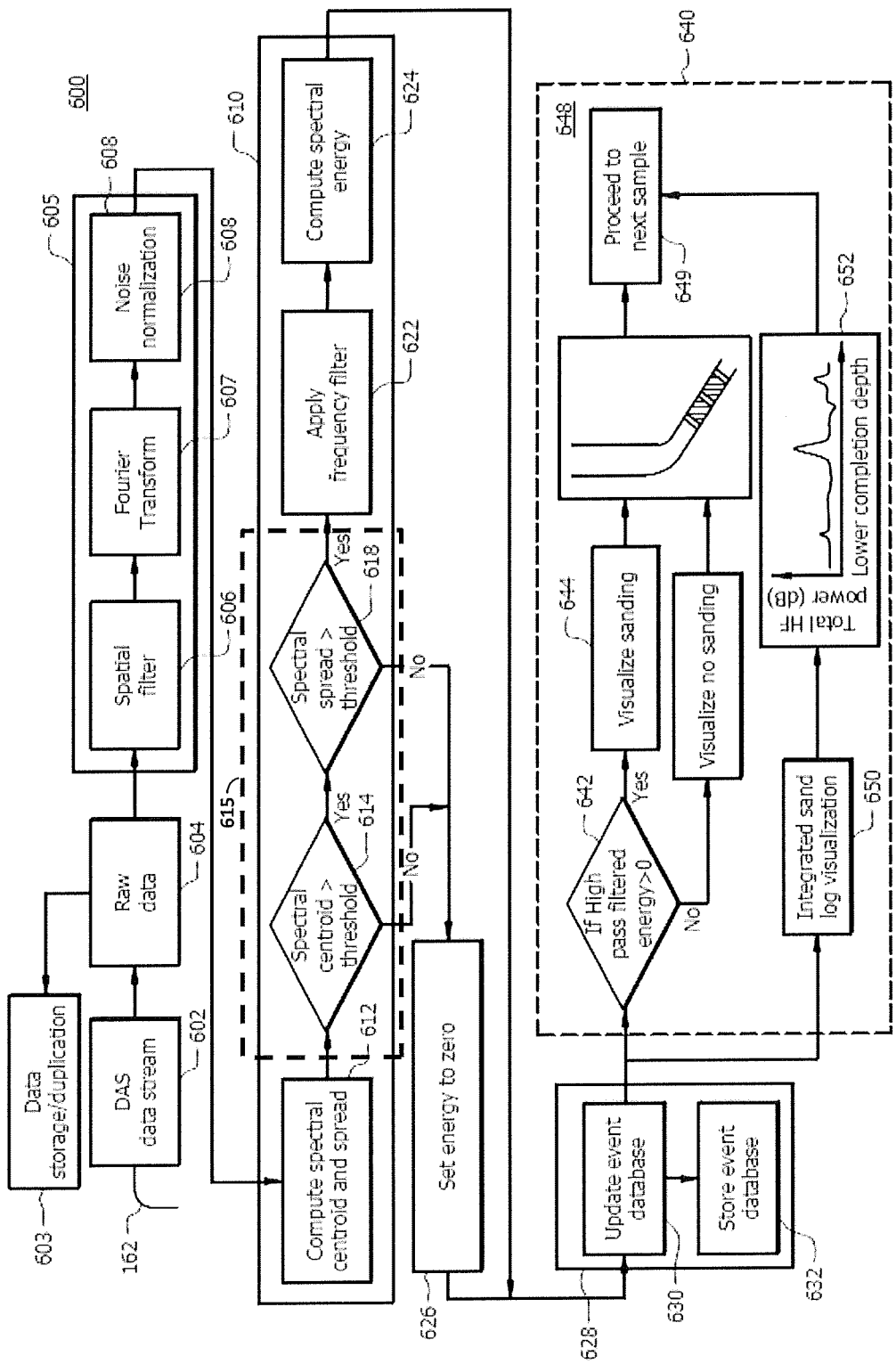
FIG. 9 schematically illustrates a flowchart of a method for detecting sand ingress in a wellbore according to an embodiment.

The overall method and corresponding steps are schematically illustrated as a flowchart show in FIG. 9. As shown in FIG. 9, an embodiment of a method 600 for detecting an event in a wellbore can begin with an acoustic sensor such as a DAS system obtaining, detecting, or receiving an acoustic signal, for example, from an optical fiber 162, as shown in step 602. The acoustic signal can be generated within the wellbore as described herein. The raw optical data from the acoustic sensor can be received and generated by the sensor to produce the acoustic signal, as shown in step 604. The data rate generated by various acoustic sensors such as the DAS system can be large. For example, the DAS system may generate data on the order of 0.5 to about 2 terabytes per hour. This raw data can optionally be stored in a memory in step 603.

The raw data can then be optionally pre-processed in step 605. As shown in FIG. 9, the pre-processing can be performed using a number of optional steps. For example, a spatial sample point filter can be applied in step 606. This filter uses a filter to obtain a portion of the acoustic signal corresponding to a desired depth in the wellbore. Since the time the light pulse sent into the optical fiber returns as backscattered light can correspond to the travel distance, and therefore depth in the wellbore, the acoustic data can be processed to obtain a sample indicative of the desired depth or depth range. This may allow a specific location within the wellbore to be isolated for further analysis. The pre-processing step may also include removal of spurious back reflection type noises at specific depths through spatial median filtering or spatial averaging techniques.

In step 607, the filtered data can be transformed from the time domain into the frequency domain using a transform such as a Fourier transform (e.g., a Short time Fourier Transform or through Discrete Fourier transformation). By transforming the data after applying the spatial filter, the amount of data processed in the transform can be reduced.

In step 608, a noise normalization routine can be performed on the data to improve the signal quality. This step can vary depending on the type of acquisition device used as well as the configuration of the light source, the sensor, and the other processing routines. While shown in a specific order in FIG. 9, the order of the steps within the pre-processing routines can be varied, and any order of the steps 606, 607, 608 can be used. The resulting sample data set may have a reduced data size compared to the raw data set. In an embodiment, a ratio of the sample data file size after the pre-processing to the raw data file size before the pre-processing can be between about 0.05 and about 0.5, or around 0.1, or less if the data is spatially/temporally averaged. Such normalization of the raw data in pre-processing step 605 (or of the thresholds in step 610, described hereinbelow) can be utilized to reduce the computational load.

After the acoustic signal is pre-processed, the sample data set can be used in a spectral conformance check process or routine in step 610. The spectral conformance process can include first determining at least one of the frequency domain features. As shown in the example of FIG. 9, the first step in the spectral conformance check can include determining the spectral centroid of the sample data set. The spectral centroid can then be compared against a spectral centroid threshold in the comparison step 614. When the spectral centroid meets or is greater than the spectral centroid threshold, the process can proceed to the next comparison step 618. In step 618, a spectral spread for the sample data set can be determined. The spectral spread can then be compared to a spectral spread threshold in step 618. While described in terms of the spectral spread and spectral centroid, any plurality of frequency domain features can be used. When the spectral spread meets or is greater than the spectral spread threshold, the process can proceed to the next step 622. As indicated by dashed box 615, autocalibration or recalibration, as described hereinbelow, can be employed in step 610, for example as part of steps 614 and/or 618. When the sample data set has both a spectral spread and a spectral centroid above the corresponding threshold, it can be determined that the acoustic data at the depth represented by the sample data set represents the presence of the event in the wellbore. Thus, the spectral conformance process can be used by itself to identify the presence of an event in the wellbore.

Before turning to step 622, it can be noted that if either the comparison in step 614 or 618 between any of the determined frequency domain features (e.g., the spectral centroid, the spectral centroid, etc.) and the corresponding threshold results in either property being below the corresponding threshold, the process may set an energy value for the sample data set to zero in step 626 before allowing the process to proceed to the data integration routine in step 628. The spectral conformance checks can occur in any order, and the serial comparisons may allow those sample data sets that fail the first comparison of either the spectral centroid or the spectral spread to proceed to the post-processing routine without the need to pass through the remaining elements of the spectral conformance process or routine.

Returning to the spectral conformance process or routine 610, the sample data set can optionally be further processed to allow for the determination of a relative amount of sand entering the wellbore at the depth or depth range represented by the sample data set. In step 622, the sample data set can be filtered to isolate the high frequency, broadband components of the acoustic data. The sample data set can be filtered within a predefined frequency range to produce a second data set. In an embodiment, the sample data set can be filtered in a bandwidth as described herein. For example, the sample data set can be filtered in a frequency bandwidth between about 0.5 kHz to about 10 kHz or between about 2 kHz and about 5 kHz. The resulting second data set can then be processed in step 624 to compute the spectral energy of the second data set. In an embodiment, the spectral energy can be calculated as the root mean square spectral energy of the second data set. The spectral energy can represent the power or energy of the acoustic signal over the time period at the depth represented by the second data set. The value of the determined spectral energy can then be stored in a memory as being associated with the depth at the time of collection of the acoustic signal.

In some embodiments, the processing in the spectral conformance process or routine 610 can include determining magnitude and a quality factor of the sand ingress peaks in the second data set. The quality factors can then be used to determine or approximate an amount or rate of sand ingress at the location of the peaks. This information can be passed to and stored as part of the event data log.

The resulting determination can then be passed to the data integration processing in step 628. In general, the processing steps determine the presence of one or more events at a depth represented by the sample data set. In order to obtain an analysis along the length of the wellbore, the processing steps between the data pre-processing steps and the spectral conformance check can be repeated for a plurality of sample data sets representing various depths along the wellbore. As the data is analyzed, the resulting information can pass to the data integration process 628 to be integrated into an event log representing the results along the length of the wellbore for a given time period. When the data is analyzed along the length of the wellbore, the process can begin again in order to analyze the data along the length of the wellbore for a subsequent time period. This process can then be repeated as needed to track the events in the wellbore over time.

In the data integration process, the data from each analysis can be received and used to update an event database in step 630. The data can also be sent to another database and/or the event database can be located remotely from the processing location. The data can then be further analyzed for data integration and visualization in near real time or at any later time. The data can include the spectral centroid, the spectral spread, the spectral energy (assuming both the spectral centroid and the spectral spread meet or exceed the corresponding thresholds), or a zero value for the spectral energy when the spectral centroid, the spectral spread, or both are below the corresponding threshold, the depth associated with the sample data set, a time associated with the acoustic signal acquisition, or any combination thereof. The data from a plurality of analysis can then be stored in an event database or log in step 632.

The data stored in the data integration process can be passed to the data visualization process 640. In this process, a number of logs can be created to allow for the visualization and/or representation of the event locations and/or amounts through different times/stages of production. In an embodiment, the data, which can optionally be integrated in the data integration process 628 but does not have to be integrated, can be passed to the data visualization process 640. In step 642, the spectral energy calculated for a sample data set can be analyzed to determine if the spectral energy value is greater than zero. In this instance, a zero or null value can be used to indicate that sand ingress is not occurring (or at least not occurring at detectable levels) at the depth. When a zero value is detected, the process can proceed to step 646, where a zero is entered along a well schematic or representation to indicate that event is not detected at the depth represented by the sample data set. When the spectral energy value is not zero, the process can proceed to step 644. In step 644, a visual representation of the spectral energy can be associated with a corresponding depth on a well schematic or representation. The visual representation can be displayed in step 648. From either steps 644 or step 646, the process can be repeated in step 649 in order to process a subsequent data set or another entry in an integrated log. Once all of the data sets and/or entries in the integrated log have been processed, a complete visual representation of sand ingress locations and relative sand ingress rates or amounts along the length of the wellbore can be presented for a given time. This process can be repeated over a plurality of times to provide and display a real time or near real time representation of sand ingress along the length of the wellbore.

The visualization process 640 can also include the generation and display of an event log corresponding to a detected event. The event log generally represents the total acoustic power or spectral energy caused by event on one axis and a depth represented by the sample data set on another axis. This log can be obtained using the integrated log data from the data integration process 628 and/or individual data sets can be iteratively analyzed in step 650 to create the integrated event log. In this embodiment, the locations at which no event is detected can have a spectral energy set to zero. In step 622, the integrated event log can be displayed on a display to provide a representation of the locations or depths having the event. A plurality of event logs can be created for different acoustic data collection times and/or different events detected over time in order to provide and display multiple event logs in real time or near real time for varying production settings.

As described above, various actions can be taken based on the identification of the event locations or locations where the event is not occurring. In some embodiments, the event identification methods can be performed, and no event locations may be located or an amount of sand or a fluid associated with an event identified may be below that observed as a fluid or in the fluid being produced from the wellbore. For example, if sand is identified within the produced fluid, but no sand ingress locations have been identified, it can be determined that the acoustic signal is not detecting the sand acoustics at a sufficient level to allow for the detection and location identification. In this instance, the production rate of the fluid from the wellbore can be temporarily increased. The resulting data analysis can be performed on the data during the increased production period while the fluid is being produced. In general, an increased fluid flow rate into the wellbore may be expected to increase the acoustic signal intensity at the sand ingress locations. This may allow a signal to noise ratio to be improved in order to more clearly identify sand ingress at one or more locations by, for example, providing for a greater signal strength to allow the spectral conformance to be determined. The sand energies can also be more clearly calculated based on the increased signal outputs. This process can also be used to identify various fluid inflows or flows along the length of the wellbore. Once the zones of interest are identified, the production levels can be adjusted based on the sand ingress locations and amounts.

Figure 10:
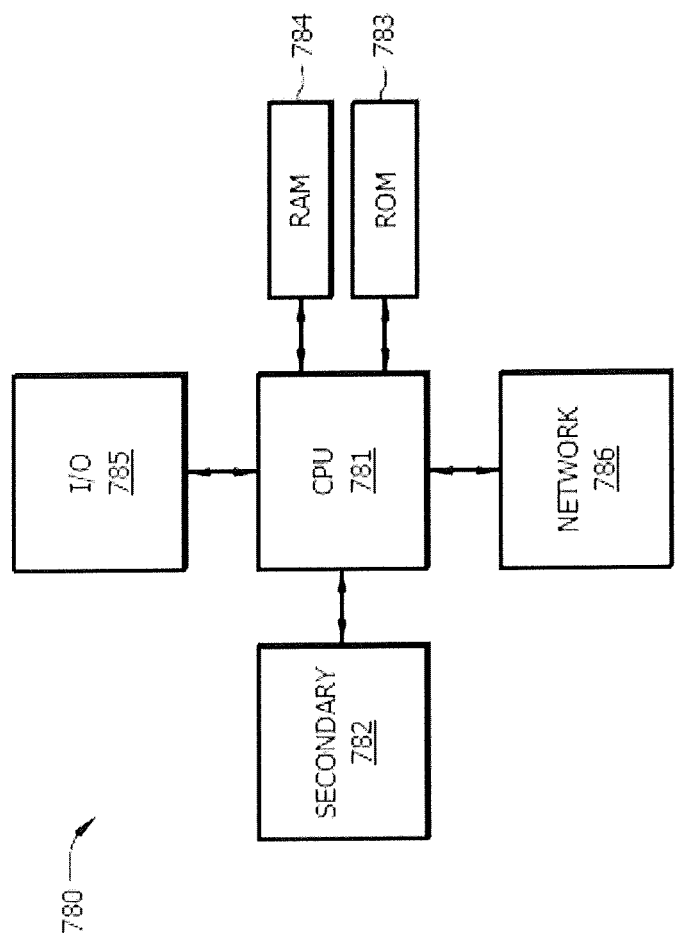
FIG. 10 schematically illustrates a computer that carp be used to carry out various steps according to an embodiment.

Any of the systems and methods disclosed herein can be carried out on a computer or other device comprising a processor, such as the acquisition device 160 of FIG. 1. FIG. 10 illustrates a computer system 780 suitable for implementing one or more embodiments disclosed herein such as the acquisition device or any portion thereof. The computer system 780 includes a processor 781 (which may be referred to as a central processor unit or CPU) that is in communication with memory devices including secondary storage 782, read only memory (ROM) 783, random access memory (RAM) 784, input/output (I/O) devices 785, and network connectivity devices 786. The processor 781 may be implemented as one or more CPU chips.

It is understood that by programming and/or loading executable instructions onto the computer system 780, at least one of the CPU 781, the RAM 784, and the ROM 783 are changed, transforming the computer system 780 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 780 is turned on or booted, the CPU 781 may execute a computer program or application. For example, the CPU 781 may execute software or firmware stored in the ROM 783 or stored in the RAM 784. In some cases, on boot and/or when the application is initiated, the CPU 781 may copy the application or portions of the application from the secondary storage 782 to the RAM 784 or to memory space within the CPU 781 itself, and the CPU 781 may then execute instructions of which the application is comprised. In some cases, the CPU 781 may copy the application or portions of the application from memory accessed via the network connectivity devices 786 or via the I/O devices 785 to the RAM 784 or to memory space within the CPU 781, and the CPU 781 may then execute instructions of which the application is comprised. During execution, an application may load instructions into the CPU 781, for example load some of the instructions of the application into a cache of the CPU 781. In some contexts, an application that is executed may be said to configure the CPU 781 to do something, e.g., to configure the CPU 781 to perform the function or functions promoted by the subject application. When the CPU 781 is configured in this way by the application, the CPU 781 becomes a specific purpose computer or a specific purpose machine.

The secondary storage 782 is typically comprised of one or more disk drives or tape drives and is used for non-volatile storage of data and as an over-flow data storage device if RAM 784 is not large enough to hold all working data. Secondary storage 782 may be used to store programs which are loaded into RAM 784 when such programs are selected for execution. The ROM 783 is used to store instructions and perhaps data which are read during program execution. ROM 783 is a non-volatile memory device which typically has a small memory capacity relative to the larger memory capacity of secondary storage 782. The RAM 784 is used to store volatile data and perhaps to store instructions. Access to both ROM 783 and RAM 784 is typically faster than to secondary storage 782. The secondary storage 782, the RAM 784, and/or the ROM 783 may be referred to in some contexts as computer readable storage media and/or non-transitory computer readable media.

I/O devices 785 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 786 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 786 may enable the processor 781 to communicate with the Internet or one or more intranets. With such a network connection, it is contemplated that the processor 781 might receive information from the network, or might output information to the network (e.g., to an event database) in the course of performing the above-described method steps. Such information, which is often represented as a sequence of instructions to be executed using processor 781, may be received from and outputted to the network, for example, in the form of a computer data signal embodied in a carrier wave.

Such information, which may include data or instructions to be executed using processor 781 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 781 executes instructions, codes, computer programs, scripts which it accesses from hard disk, floppy disk, optical disk (these various disk based systems may all be considered secondary storage 782), flash drive, ROM 783, RAM 784, or the network connectivity devices 786. While only one processor 781 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 782, for example, hard drives, floppy disks, optical disks, and/or other device, the ROM 783, and/or the RAM 784 may be referred to in some contexts as non-transitory instructions and/or non-transitory information.

In an embodiment, the computer system 780 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 780 to provide the functionality of a number of servers that is not directly bound to the number of computers in the computer system 780. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 780, at least portions of the contents of the computer program product to the secondary storage 782, to the ROM 783, to the RAM 784, and/or to other non-volatile memory and volatile memory of the computer system 780. The processor 781 may process the executable instructions and/or data structures in part by directly accessing the computer program product, for example by reading from a CD-ROM disk inserted into a disk drive peripheral of the computer system 780. Alternatively, the processor 781 may process the executable instructions and/or data structures by remotely accessing the computer program product, for example by downloading the executable instructions and/or data structures from a remote server through the network connectivity devices 786. The computer program product may comprise instructions that promote the loading and/or copying of data, data structures, files, and/or executable instructions to the secondary storage 782, to the ROM 783, to the RAM 784, and/or to other non-volatile memory and volatile memory of the computer system 780.

In some contexts, the secondary storage 782, the ROM 783, and the RAM 784 may be referred to as a non-transitory computer readable medium or a computer readable storage media. A dynamic RAM embodiment of the RAM 784, likewise, may be referred to as a non-transitory computer readable medium in that while the dynamic RAM receives electrical power and is operated in accordance with its design, for example during a period of time during which the computer system 780 is turned on and operational, the dynamic RAM stores information that is written to it. Similarly, the processor 781 may comprise an internal RAM, an internal ROM, a cache memory, and/or other internal non-transitory storage blocks, sections, or components that may be referred to in some contexts as non-transitory computer readable media or computer readable storage media.

The event signatures associated with one or more events may be based on a variability in the data obtained from the sensor system. Since the variability and absolute measurement values can depend on factors such as the physical arrangement of the system (e.g., a connection between the light source and the optical fiber), the event signatures may need to be updated when there is a change in the physical configuration of the system. This type of update may be referred to as a recalibration of the event signatures or thresholds.

In some embodiments, recalibration can be performed in response to a physical change in the DAS sensor system. For example, in response to repositioning the fiber optic cable(s), performing maintenance on the system, on a routine basis, and the like, a recalibration or auto-calibration may be performed. In such embodiments, a method of detecting an event using different data sets can include obtaining a first sample data set (e.g., as described hereinabove), where the first sample data set is a sample of an acoustic signal originating within the wellbore that is representative of the acoustic signal across a frequency spectrum. The first sample data set can be obtained using at least one sampling system having a first physical configuration. For example, the first sample data set can be obtained using a DAS system having the fiber optic cable physically connected to the light source in a first configuration. At least one frequency domain feature (e.g., as described hereinabove) of the first sample data set over a first time period can then be determined. A first threshold value for the at least one frequency domain feature can be determined using the first sample data set. A comparison can be made between the first threshold value and the at least one frequency domain feature. When it is determined that the at least one frequency domain feature matches the first threshold, it can be determined (e.g., as described hereinabove) that the presence of an event within the wellbore has occurred during the first time period.

A second sample data set (e.g., as described hereinabove) can be obtained, where the second sample data set can be a sample of an acoustic signal originating within the wellbore that is representative of the acoustic signal across the frequency spectrum. The second sample data set can be obtained using the at least one sampling system having a second physical configuration that is different than the first physical configuration. For example, the system could be withdrawn from the wellbore and replaced in the wellbore, and/or the optical fiber could be disconnected from and reconnected to the light source. Any physical changes that result in a change in the raw measurements obtained from the acoustic sensor could trigger a recalibration. At least one frequency domain feature of the second sample data set can be determined over a second time period, and a second threshold value for the at least one frequency domain feature can be determined using the second sample data set. A comparison can be made between the second threshold value and the at least one frequency domain feature. When it is determined that the at least one frequency domain feature matches the second threshold, it can be determined (e.g., as described hereinabove) that the presence of the event within the wellbore has occurred during the second time period.

In some embodiments, the first threshold and the second threshold are different. By way of example, in embodiments, the first physical configuration can comprise a fiber disposed within the wellbore, wherein the fiber is coupled to a receiver, and the second physical configuration can comprise the fiber disposed within the wellbore in a different position. For example, the second physical configuration can comprise the fiber repositioned and/or recoupled to the receiver. In additional or alternative embodiments, the second physical configuration comprises a second fiber disposed within the wellbore, where the second fiber is coupled to the receiver. In additional or alternative embodiments, the second physical configuration comprises the fiber disposed within the wellbore, where the fiber is coupled to a second receiver.

In order to recalibration the threshold values, the second data set can be analyzed to determine its variability. For example, a median value of the at least one frequency domain feature of the second sample data set over a first portion of the second sample data set can be determined. The second threshold can then be determined using the median value. In some embodiments, the second threshold value can be normalized using the median value to obtain a normalized second threshold value. One or more of the at least one frequency domain feature obtained from the second sample data set can be normalized using the median value. When the values are normalized, the comparison and determination that the at least one frequency domain feature matches the second threshold can be carried out by comparing the normalized frequency domain feature(s) with the normalized second threshold. Alternatively, the determination of the second threshold can include determining a median absolute deviation of the at least one frequency domain feature of the second sample data set over at least a first portion of the second time period, and determining the second threshold for the at least one frequency domain feature based on the median absolute deviation.

The at least one frequency domain feature can comprise any of the frequency domain features noted hereinabove. For example, in some embodiments, the at least one frequency domain feature includes one or more of a spectral roll-off, a spectral skewness, an RMS band energy, a total RMS energy, a spectral flatness, a spectral slope, a spectral kurtosis, a spectral flux, or a spectral autocorrelation function. In specific embodiments, the at least one frequency domain feature comprises a spectral centroid and/or a spectral spread.

In order to correct for variability in the measured data, one or more corrections can be made during the signal processes procedure. Corrections can be made to the data, for example in raw or standardized (e.g., normalized, etc.) form, and/or corrections can be made to the threshold against which the data is being compared. In some embodiments, the threshold(s) forming the event signatures can be recalibrated based on the variability in the data. For example, one or more frequency domain feature threshold that are used to define the event signatures can be recalibrated as part of the signal processing procedure. While this can occur based on a physical change in the system, the threshold(s) can also be recalibrated based on a change in the variability in the acoustic data.

In some embodiments, the frequency domain threshold (e.g., such as a spectral centroid threshold determined at step 614 and/or a spectral spread threshold determined at step 618) can be recalibrated. The recalibration can occur in response to a physical change in the sensor configuration and/or in response to a change in the data. In some embodiments, the recalibration can be carried out periodically to allow for changes in the data to be taken into account automatically. In some embodiments, the difference between subsequent measurements of the acoustic signal across the depth of interest can be calculated and used to identify when a recalibration should be performed. As used herein, subsequent measurements can refer to consecutive measurements or a later measurement that may be two or more measurements later in time. For example, the difference between subsequent measurements (e.g., between subsequent frequency domain feature calculations) can be determined across the depth interval of interest. A determination of a standard deviation can be made across the entire depth interval using the individual measurements, and when the difference values (or an average difference value) exceeds a threshold (e.g., 2 standard deviations, etc.), a recalibration can be triggered. Such a difference would indicate that there has been a large scale change in the characteristics of the signal, thereby indicating that a recalibration should be carried out.

The recalibration can be carried out as part of the signal processing routines described herein. Once a sample data set is obtained and at least one frequency domain feature is obtained from the sample data set, the recalibration process can include determining a median absolute deviation of the at least one frequency domain feature over the first time period. An event threshold value for the at least one frequency domain feature can then be determined based on the median absolute deviation. The at least one frequency domain feature of the sample data set can be determined over a second time period, and the at least one frequency domain feature in the second time period can be compared with the event threshold. When the comparison indicates that; that the at least one frequency domain feature matches the event threshold, a determination of the presence of an event within the wellbore can be made based on determining that the at least one frequency domain feature matches the event threshold. The at least one frequency domain feature can comprise any of the frequency domain features noted hereinabove. For example, in embodiments, the at least one frequency domain feature includes one or more of a spectral roll-off, a spectral skewness, an RMS band energy, a total RMS energy, a spectral flatness, a spectral slope, a spectral kurtosis, a spectral flux, or a spectral autocorrelation function. In specific embodiments, the at least one frequency domain feature comprises a spectral centroid and/or a spectral spread.

When the recalibration is based on the median absolute deviation, determining the median absolute deviation of the at least one frequency domain feature over the first time period can include selecting a depth range from the sample data set and computing median values of the at least one frequency domain feature from the sample data set over the depth range within the first time period. The median absolute deviation can then be determined from the median values for the first time period. The threshold value for the at least one frequency domain feature can then be determined by applying a calibration factor to the median absolute deviation. The calibration factor can be applied to the median absolute deviation to determine the threshold value.

The calibration factor can be selected based on a number of factors, and the calibration factor can represent a relative level of the threshold relative to the median absolute deviation of the detected values. In some embodiments, the calibration factor can be selected based on a predetermined sensitivity of the at least one frequency domain feature (e.g., a variability resulting from various events, etc.), a status of the wellbore, the type of acoustic sensor, the manner in which the fiber optic cable is installed, or the like. For example, for frequency domain features that are less sensitive to various events in the wellbore, the calibration factor can be lower than for those frequency domain features having a high sensitivity to the events in the wellbore. Similarly, the calibration factor for a producing wellbore can be lower than the calibration factor for a wellbore that is shut in since the variability in the acoustic readings for a wellbore that is producing can be expected to be higher. It is also expected that when the acoustic sensor system is placed in a less sensitive location (e.g., a temporary installation), the calibration factor can be lower in order to identify events of interest where the signal strength may not be as high as with more permanent installations.

In some embodiments, the median absolute deviation of the at least one frequency domain feature over the first time period can be determined by determining a plurality of values of the at least one frequency domain feature of the sample data set over the first time period, and determining a median value of the plurality of values. The median absolute deviation can then be determined based on the median value, a deviation from the median value for each value of the plurality of values, and a correction factor.

In some embodiments, determining the threshold value for the at least one frequency domain feature can include determining a plurality of initial threshold values using the median absolute deviation and a calibration factor defined for the at least one frequency domain feature, and determining the threshold using the median of the plurality of the initial threshold values.

A system for determining the presence of one or more events in a wellbore that employs such an autocalibration method can comprise a processor; a memory; and a receiver unit in signal communication with the processor and the memory. The receiver unit can be configured to receive a first signal from a sensor disposed in a wellbore, and a processing application can be stored in the memory that, when executed on the processor, can configure the processor to perform a series of process steps. The process steps can include obtaining a sample data set from the first signal, where the sample data set is a sample of an acoustic signal originating within the wellbore comprising a fluid that is representative of the acoustic signal across a frequency spectrum. The process can also determine at least one frequency domain feature of the sample data set over a first time period. A median absolute deviation of the at least one frequency domain feature over the first time period can then be determined, and a variability threshold for the at least one frequency domain feature based on the median absolute deviation can be determined. The at least one frequency domain feature of the sample data set over a second time period can be determined and compared with the variability threshold. A determination that the at least one frequency domain feature exceeds the variability threshold can be made. Based on the determination that the at least one frequency domain feature exceeds the variability threshold, the processor can then compare the at least one frequency domain feature to an event threshold. When the at least one frequency domain feature matches the event threshold, the processor can make a determination of the presence of an event associated with the event threshold.

The first signal can be obtained from an acoustic sensor including any of those described herein. In some embodiments, the system can also include the sensor, which can include a fiber optic cable disposed within the wellbore. An optical generator can be coupled to the fiber optic cable, where the optical generator can be configured to generate a light beam and pass the light beam into the fiber optic cable.

The processing application can be further configured to select a depth range from the sample data set, and compute median values of the at least one frequency domain feature from the sample data set over the depth range within the first time period. The median absolute deviation can be determined from the median values for the first time period. In some embodiments, the processing application, can be configured to apply a calibration factor to the median absolute deviation and determine the variability threshold based on applying the calibration factor to the median absolute deviation. The processing application can also determine a plurality of values of the at least one frequency domain feature of the sample data set over the first time period, determine a median value of the plurality of values, and determine the median absolute deviation based on the median value, a deviation from the median value for each value of the plurality of values, and a correction factor. In some embodiments, the processing application, can also determine a plurality of an initial variability threshold values using the median absolute deviation and a calibration factor defined for the at least one frequency domain feature, and determine the signal threshold using the median of the plurality of the initial variability threshold values.

In place of or in addition to recalibrating the threshold values for the event signatures, the detected sensor data and/or the frequency domain features determined from the frequency domain features can be corrected to account for variability in the measurements. In some embodiments, recalibration of raw values (e.g., raw data obtained at step 604) and/or frequency domain features (e.g., computed at step 612) can be performed based on a variability in the system. The correction based on the variability can be performed prior to event signature or threshold comparison (e.g., prior to step 614 and/or step 618). In some embodiments, the raw values (e.g., obtained at step 604) can be corrected prior to determining the frequency domain feature(s) (e.g., prior to step 612), or, in alternative embodiments, the frequency domain feature(s) can be corrected (e.g., at step 612) without correcting the raw values (e.g., obtained at step 604).

In some embodiments, the frequency domain feature(s) values can be corrected, rather than the raw output values. In such embodiments, the method of detecting an event within a wellbore can include determining a plurality of values of at least one frequency domain feature (e.g., as described hereinabove) of the sample data set across a sample period within a first time period. A value of a variability in the plurality of values of the at least one frequency domain feature across the first time period can be determined; and the plurality of values of the at least one frequency domain feature can be corrected based on the value of the variability to obtain a corrected plurality of values of the at least one frequency domain feature. A presence of an event in a wellbore can then be determined using the corrected plurality of values. The at least one frequency domain feature can comprise any of the frequency domain features noted hereinabove. For example, in embodiments, the at least one frequency domain feature includes one or more of a spectral roll-off, a spectral skewness, an RMS band energy, a total RMS energy, a spectral flatness, a spectral slope, a spectral kurtosis, a spectral flux, or a spectral autocorrelation function. In specific embodiments, the at least one frequency domain feature comprises a spectral centroid and/or a spectral spread.

The frequency domain features can be processed based on the values as determined from the sample data set, or the frequency domain features can be normalized based on one or more values. Normalization can be used to align the determined values around a given value, which in some embodiments, can be one. The normalization of the values can allow for improved computational efficiency in some embodiments. For example, the frequency domain feature values can be normalized using the a median value, a deviation value (e.g., a median absolute deviation), a threshold value, or the like. The normalization of the values can comprise an optional additional step during processing, and the remaining steps in the process can be the same or similar, only using normalized values of the frequency domain features.

In some embodiments, the raw output values can be corrected to allow the pre-determined or pre-established values of the event signature thresholds to be used for comparison purposes. In such embodiments, a method of detecting an event within a wellbore can include determining a value of a variability in the sample data set the first time period. The sample data set can be corrected based on the value of the variability to obtain a corrected sample data set. The plurality of values of at least one frequency domain feature can then be determined using the corrected sample data set across a sample period within a first time period. The presence of an event in a wellbore can be determined using the plurality of values of the at least one frequency domain feature.

As noted hereinabove, determining the presence of the event can include comparing the plurality of values of the at least one frequency domain feature with an event threshold, determining that one or more of the plurality of values of the at least one frequency domain feature matches the event threshold, and determining the presence of the event associated with the event threshold based on determining that the one or more of the plurality of values of the at least one frequency domain feature matches the event threshold.

In embodiments, recalibration can be utilized to filter for anomalies, and non-anomaly readings can be discarded, for example, by setting the values of the readings in those intervals to zero. In such an auto-calibration method, a signal threshold can be utilized to distinguish an anomaly from a background noise, whereafter an event threshold can be used to segregate the events from each other. The signal threshold can represent a variability threshold such that the data can be determined to contain an acoustic signature of an event (though an undetermined event at this point in the process) that exceeds the background noise present within the acoustic signal within the wellbore. In such embodiments, a method of identifying an anomaly within a wellbore can include obtaining a sample data set (e.g., as described hereinabove), and determining at least one frequency domain feature (e.g., as described hereinabove) of the sample data set over a first time period. A median absolute deviation of the at least one frequency domain feature over the first time period can be determined, and a variability threshold for the at least one frequency domain feature can be determined based on the median absolute deviation. The at least one frequency domain feature (e.g., as described hereinabove) of the sample data set over a second time period can be determined, and the at least one frequency domain feature in the second time period can be compared with the variability threshold. When the at least one frequency domain feature exceeds the variability threshold, an anomaly can be determined. When the at least one frequency domain feature does not exceed the variability threshold, the acoustic signal can be considered to include only noise, or include an acoustic signature that is not discernable above the noise. For these signals, the values can be discarded and not further analyzed in order to reduce processing resources. For the acoustic signals containing an anomaly, the at least one frequency domain feature can be compared to an event threshold when the at least one frequency domain feature exceeds the variability threshold, and the presence of an event associated with the event threshold can be determined based on determining that the at least one frequency domain feature matches the event threshold.

In some embodiments, determining the mean absolute deviation of the at least one frequency domain feature over the first time period can include selecting a depth range from the sample data set, computing median values of the at least one frequency domain feature from the sample data set over the depth range within the first time period, and determining the median absolute deviation from the median values for the first time period.

In some embodiments, determining the variability threshold for the at least one frequency domain feature can include applying a calibration factor to the median absolute deviation, and determining the variability threshold based on applying the calibration factor to the median absolute deviation. The median absolute deviation of the at least one frequency domain feature over the first time period can be determined by determining a plurality of values of the at least one frequency domain feature of the sample data set over the first time period, determining a median value of the plurality of values, and determining the median absolute deviation based on the median value, a deviation from the median value for each value of the plurality of values, and a correction factor.

In some embodiments, determining the variability threshold for the at least one frequency domain feature can include determining a plurality of an initial variability threshold values using the median absolute deviation and a calibration factor defined for the at least one frequency domain feature, and determining the variability threshold using the median of the plurality of the initial signal threshold values.

In some embodiments, a method of this disclosure comprises calibration using a time average with normalization. In such embodiments, a method of detecting an event within a wellbore as per this disclosure can comprise: obtaining a sample data set (e.g., as described hereinabove), wherein the sample data set is a sample of an acoustic signal originating within a wellbore comprising a fluid, and wherein the sample data set is representative of the acoustic signal across a frequency spectrum; determining a plurality of values of at least one frequency domain feature of the sample data set across a sample period within a first time period (e.g., as described hereinabove); determining a median value of the plurality of values of the at least one frequency domain feature across the first time period; determining a variability threshold for the at least one frequency domain feature based on the median value; determining the at least one frequency domain feature (e.g., as described hereinabove) of the sample data set over a second time period; comparing the at least one frequency domain feature in the second time period with the variability threshold; determining that the at least one frequency domain feature matches the threshold; determining the presence of an anomaly from a background signal based on determining that the at least one frequency domain feature matches the variability threshold.

As described further hereinbelow, the data can be normalized. For example, the method can further comprise normalizing the threshold value to obtain a normalized threshold, and normalizing the at least one frequency domain feature of the sample data set, where comparing the at least one frequency domain feature in the second time period with the threshold comprises comparing the normalized at least one frequency domain feature with the normalized threshold. In some embodiments, the second time period is a subset of the first time period. The method can further comprise repeating the determining of the plurality of values, the determining of the median value, and the determining of the threshold value each time the at least on frequency domain feature is calculated. In embodiments, determining the mean absolute deviation of the at least one frequency domain feature over the first time period comprises: selecting a depth range from the sample data set; computing the median value of the at least one frequency domain feature from the sample data set over the depth range within the first time period; and determining the threshold value for the first time period over the depth range. As noted hereinabove, the calibration factor can be selected based on a predetermined sensitivity of the at least one frequency domain feature, based on a status of the wellbore, or both.

The at least one frequency domain feature can comprise any of the frequency domain features noted hereinabove. For example, in embodiments, the at least one frequency domain feature includes one or more of a spectral roll-off, a spectral skewness, an RMS band energy, a total RMS energy, a spectral flatness, a spectral slope, a spectral kurtosis, a spectral flux, or a spectral autocorrelation function. In specific embodiments, the at least one frequency domain feature comprises a spectral centroid and/or a spectral spread.

Normalization can be utilized in any of the auto-calibration/recalibration embodiments described hereinabove. As noted previously, normalization of the raw data in preprocessing step 605 or of the at least one frequency domain feature in step 610 can be utilized to reduce the computational load.

The various types of calibration as described herein can result in different analysis over time. For example, when the event signatures or thresholds are recalibrated, the acoustic signal analysis can depend on the time frame correlated to specific event signature values, since they could change over time with each recalibration. Thus, the specific event thresholds may be retained in a memory with the acoustic samples. Further, comparison between wellbores or production fields an depend on the specific calibrated values, and thus the values may be taken into account when comparing such data. When the data is recalibrated prior to a comparison with an event threshold, the data may be applied more universally across times within a wellbore and/or across different wellbores (e.g., across a field and/or across different fields). The selection of which type of calibration or recalibration to perform can then be based, at least in part, on what type of data comparison may be needed as well as the ease of comparing data over time and across wellbores.

EXAMPLES

The embodiments having been generally described, the following examples are given as particular embodiments of the disclosure and to demonstrate the practice and advantages thereof. It is understood that the examples are given by way of illustration and are not intended to limit the specification or the claims in any manner.

Example 1. A method of this disclosure can comprise as Step 1: obtaining a one second sample file (e.g., computed every second), for example by gathering 600 or more data files.

Step 2: establishing a reservoir depth using a depth calibration factor and reservoir depth specification inputted from a user via the Equation (4):

$$\text{Calibrated Depth} = \text{Measured Depth} * \text{Depth Calibration Factor} \qquad \text{(Eq. 4),}$$

Step 3: Compute median values of the selected depth points from measured centroid (c) and measured spread (s) values.

Then compute the median absolute deviation of the centroid and spread as a difference between each data point and the median value of the range.

Step 4: Compute the thresholds for centroid ($C_{Threshold}$) and spread ($S_{Threshold}$) for each second as a difference between the median value and a calibration factor times the median absolute deviation for each frequency domain feature (e.g., for the centroid and for the spread). The median value is the median of the series having the measured value minus the median of the series.

Step 5: Compute final values: for the thresholds for the centroid ($C_{Final\_Threshold}$) and the spread ($S_{Final\_Threshold}$) as the median of the thresholds calculated in step 4 for each frequency domain feature.

Having described various systems and methods herein, specific embodiments can include, but are not limited to:

In a first embodiment, a method of detecting an event using different data sets, the method comprising: obtaining a first sample data set, wherein the first sample data set is representative of an acoustic signal across a frequency spectrum, and wherein the first sample data set is obtained using at least one sampling system having a first physical configuration; determining at least one frequency domain feature of the first sample data set over a first time period; determining a first threshold for the at least one frequency domain feature using the first sample data set; determining that the at least one frequency domain feature matches the first threshold; determining the presence of an event during the first time period based on determining that the at least one frequency domain feature matches the first threshold; obtaining a second sample data set, wherein the second sample data set is representative of the acoustic signal across the frequency spectrum, and wherein the second sample data set is obtained using the at least one sampling system having a second physical configuration, wherein the first physical configuration is different than the second physical configuration; determining at least one frequency domain feature of the second sample data set over a second time period; determining a second threshold for the at least one frequency domain feature using the second sample data set; determining that the at least one frequency domain feature matches the second threshold; and determining the presence of the event during the second time period based on determining that the at least one frequency domain feature matches the second threshold.

A second embodiment can include the method of the first embodiment, wherein the first sample data set is a sample of the acoustic signal originating within a wellbore, wherein the second sample data set is a sample of an acoustic signal originating within the wellbore, and wherein the event is an event within the wellbore.

A third embodiment can include the method of the first embodiment, wherein the first threshold and the second threshold are different.

A fourth embodiment can include the method of any one of the first through the third embodiments, wherein the first physical configuration comprises a fiber disposed within the wellbore, wherein the fiber is coupled to a receiver.

A fifth embodiment can include the method of the fourth embodiment, wherein the second physical configuration comprises the fiber disposed within the wellbore in a different position.

A sixth embodiment can include the method of the fourth embodiment, wherein the second physical configuration comprises the fiber repositioned or recoupled to the receiver.

A seventh embodiment can include the method of the fourth embodiment, wherein the second physical configuration comprises a second fiber disposed within the wellbore, wherein the second fiber is coupled to the receiver.

A eighth embodiment can include the method of the fourth embodiment, wherein the second physical configuration comprises the fiber disposed within the wellbore, wherein the fiber is coupled to a second receiver.

An ninth embodiment can include the method of any one of the first through the eighth embodiments, wherein determining the second threshold comprises: determining a median value of the at least one frequency domain feature of the second sample data set over a first portion of the second sample data set; and determining the second threshold using the median value.

A tenth embodiment can include the method of the ninth embodiment further comprising: normalizing the second threshold value using the median value to obtain a normalized second threshold value; and normalizing the at least one frequency domain feature obtained from the second sample data set using the median value, wherein determining that the at least one frequency domain feature matches the second threshold comprises comparing the normalized at least one frequency domain feature with the normalized second threshold.

An eleventh embodiment can include the method of any one of the first through the eighth embodiments, wherein determining the second threshold comprises: determining a median absolute deviation of the at least one frequency domain feature of the second sample data set over at least a first portion of the second time period; and determining a second threshold for the at least one frequency domain feature based on the median absolute deviation.

A twelfth embodiment can include the method of any one of the first through the eleventh embodiments, further comprising: determining a difference between the at least one frequency domain feature across the first sample data set and the at least one frequency domain feature across the second sample data set to obtain a difference data set; determining a variability in the difference data set; comparing the variability in the difference data set to a change threshold, wherein determining the second threshold is based on the variability in the difference data set exceeding the change threshold.

A thirteenth embodiment can include the method of the first embodiment, wherein the first sample data set is obtained during at least one of: security system monitoring, rail monitoring, roadway monitoring, pipeline monitoring, utility system monitoring, or point source monitoring.

A fourteenth embodiment comprises a method of separating background noise from an acoustic signal from an event, the method comprising: obtaining a sample data set, wherein the sample data set is representative of an acoustic signal across a frequency spectrum; determining at least one frequency domain feature of the sample data set over a first time period; determining a median absolute deviation of the at least one frequency domain feature over the first time period; determining a variability threshold for the at least one frequency domain feature based on the median absolute deviation; determining the at least one frequency domain feature of the sample data set over a second time period; comparing the at least one frequency domain feature in the second time period with the variability threshold; determining that the at least one frequency domain feature exceeds the variability threshold; comparing the at least one frequency domain feature to an event threshold when the at least one frequency domain feature exceeds the variability threshold; and determining the presence of an event associated with the event threshold based on determining that the at least one frequency domain feature matches the event threshold.

A fifteenth embodiment can include the method of the fourteenth embodiment, wherein the sample data set is a sample of the acoustic signal originating within a wellbore comprising a fluid.

A sixteenth embodiment can include the method of the fourteenth embodiment or the fifteenth embodiment, wherein determining the mean absolute deviation of the at least one frequency domain feature over the first time period comprises: selecting a depth range from the sample data set; computing median values of the at least one frequency domain feature from the sample data set over the depth range within the first time period; and determining the median absolute deviation from the median values for the first time period.

A seventeenth embodiment can include the method of any one of the fourteenth through the sixteenth embodiments, wherein determining the variability threshold for the at least one frequency domain feature comprises: applying a calibration factor to the median absolute deviation; and determining the variability threshold based on applying the calibration factor to the median absolute deviation.

An eighteenth embodiment can include the method of any one of the fourteenth through the seventeenth embodiments, wherein determining the median absolute deviation of the at least one frequency domain feature over the first time period comprises: determining a plurality of values of the at least one frequency domain feature of the sample data set over the first time period; determining a median value of the plurality of values; and determining the median absolute deviation based on the median value, a deviation from the median value for each value of the plurality of values, and a correction factor.

A nineteenth embodiment can include the method of the eighteenth embodiment, wherein determining the variability threshold for the at least one frequency domain feature comprises: determining a plurality of an initial variability threshold values using the median absolute deviation and a calibration factor defined for the at least one frequency domain feature; and determining the variability threshold using the median of the plurality of the initial signal threshold values.

A twentieth embodiment can include the method of the nineteenth embodiment, wherein the calibration factor is selected based on a predetermined sensitivity of the at least one frequency domain feature.

A twenty-first embodiment can include the method of the nineteenth embodiment or twentieth embodiments, wherein the calibration factor is selected based on a status of the wellbore.

A twenty-second embodiment can include the method of any one of the fourteenth through the twenty-first embodiments, wherein the at least one frequency domain feature comprises a spectral centroid or a spectral spread.

A twenty-third embodiment can include the method of any one of the fourteenth through the twenty-first embodiments, wherein the at least one frequency domain feature comprises at least one of a spectral roll-off, a spectral skewness, an RMS band energy, a total RMS energy, sub-band energy, sub-band energy ratios, a spectral flatness, a spectral slope, a spectral kurtosis, a spectral flux, or a spectral autocorrelation function.

A twenty-fourth embodiment comprises a method of detecting an event, the method comprising: obtaining a sample data set, wherein the sample data set is representative of the acoustic signal across a frequency spectrum; determining at least one frequency domain feature of the sample data set over a first time period; determining a median absolute deviation of the at least one frequency domain feature over the first time period; determining an event threshold value for the at least one frequency domain feature based on the median absolute deviation; determining the at least one frequency domain feature of the sample data set over a second time period; comparing the at least one frequency domain feature in the second time period with the event threshold; determining that the at least one frequency domain feature matches the event threshold; and determining the presence of an event corresponding to the event threshold based on determining that the at least one frequency domain feature matches the event threshold.

A twenty-fifth embodiment can include the method the twenty-fourth embodiment, wherein the sample data set is a sample of the acoustic signal originating within a wellbore comprising a fluid, and wherein the event is an event within the wellbore.

A twenty-sixth embodiment can include the method of the twenty-fourth embodiment or the twenty-fifth embodiment wherein determining the mean absolute deviation of the at least one frequency domain feature over the first time period comprises: selecting a depth range from the sample data set; computing median values of the at least one frequency domain feature from the sample data set over the depth range within the first time period; and determining the median absolute deviation from the median values for the first time period.

A twenty-seventh embodiment can include the method of any one of the twenty-fourth through the twenty-sixth embodiments, wherein determining the threshold value for the at least one frequency domain feature comprises: applying a calibration factor to the median absolute deviation; and determining the threshold value based on applying the calibration factor to the median absolute deviation.

A twenty-eighth embodiment can include the method of any one of the twenty-fourth through the twenty-seventh embodiments, wherein determining the median absolute deviation of the at least one frequency domain feature over the first time period comprises: determining a plurality of values of the at least one frequency domain feature of the sample data set over the first time period; determining a median value of the plurality of values; and determining the median absolute deviation based on the median value, a deviation from the median value for each value of the plurality of values, and a correction factor.

A twenty-ninth embodiment can include the method of the twenty-eighth embodiment, wherein determining the threshold value for the at least one frequency domain feature comprises: determining a plurality of an initial threshold values using the median absolute deviation and a calibration factor defined for the at least one frequency domain feature; and determining the threshold using the median of the plurality of the initial threshold values.

A thirtieth embodiment can include the method of the twenty-ninth embodiment, wherein the calibration factor is selected based on a predetermined sensitivity of the at least one frequency domain feature.

A thirty-first embodiment can include the method of the twenty-ninth embodiment or the thirtieth embodiment, wherein the calibration factor is selected based on a status of the wellbore.

A thirty-second embodiment can include the method of any one of the twenty-fourth through the thirty-first embodiments, wherein the at least one frequency domain feature comprises a spectral centroid or a spectral spread.

A thirty-third embodiment can include the method of any one of the twenty-fourth through the thirty-first embodiments, wherein the at least one frequency domain feature comprises at least one of a spectral roll-off, a spectral skewness, an RMS band energy, a total RMS energy, sub-band energy, sub-band energy ratios, a spectral flatness, a spectral slope, a spectral kurtosis, a spectral flux, or a spectral autocorrelation function.

A thirty-fourth embodiment comprises a system for determining an event, the system comprising: a processor; a memory; and a receiver unit in signal communication with the processor and the memory, wherein the receiver unit is configured to receive a first signal from a sensor, wherein a processing application is stored in the memory, and wherein the processing application, when executed on the processor, configures the processor to: obtain a sample data set from the first signal, wherein the sample data set is representative of an acoustic signal across a frequency spectrum; determine at least one frequency domain feature of the sample data set over a first time period; determine a median absolute deviation of the at least one frequency domain feature over the first time period; determine a variability threshold for the at least one frequency domain feature based on the median absolute deviation: determine the at least one frequency domain feature of the sample data set over a second time period; compare the at least one frequency domain feature in the second time period with the variability threshold; determine that the at least one frequency domain feature exceeds the variability threshold; compare the at least one frequency domain feature to an event threshold; and determine the presence of an event associated with the event threshold based on determining that the at least one frequency domain feature matches the event threshold.

A thirty-fifth embodiment can include the system of the thirty-fourth embodiment, wherein the sensor is disposed in a wellbore, and wherein the sample data set is a sample of the acoustic signal originating within a wellbore comprising a fluid.

A thirty-sixth embodiment can include the system of the thirty-fifth embodiment, further comprising: the sensor, wherein the sensor comprises a fiber optic cable disposed within the wellbore; and an optical generator coupled to the fiber optic cable, wherein the optical generator is configured to generate a light beam and pass the light beam into the fiber optic cable.

A thirty-seventh embodiment can include the system of the thirty-fifth embodiment or the thirty-sixth embodiments, wherein the processing application, when executed on the processor, further configures the processor to: select a depth range from the sample data set; compute median values of the at least one frequency domain feature from the sample data set over the depth range within the first time period; and determine the median absolute deviation from the median values for the first time period.

A thirty-eighth embodiment can include the system of any one of the thirty-fourth through the thirty-seventh embodiments, wherein the processing application, when executed on the processor, further configures the processor to: apply a calibration factor to the median absolute deviation; and determine the variability threshold based on applying the calibration factor to the median absolute deviation.

A thirty-ninth embodiment can include the system of any one of the thirty-fourth through the thirty-eighth embodiments, wherein the processing application, when executed on the processor, further configures the processor to: determine a plurality of values of the at least one frequency domain feature of the sample data set over the first time period; determine a median value of the plurality of values; and determine the median absolute deviation based on the median value, a deviation from the median value for each value of the plurality of values, and a correction factor.

A fortieth embodiment can include the system of the thirty ninth embodiment, wherein the processing application, when executed on the processor, further configures the processor to: determine a plurality of an initial variability threshold values using the median absolute deviation and a calibration factor defined for the at least one frequency domain feature; and determine the signal threshold using the median of the plurality of the initial variability threshold values.

A forty-first embodiment can include the system of any one of the thirty-fourth through the fortieth embodiments, wherein the at least one frequency domain feature comprises a spectral centroid or a spectral spread.

A forty-second embodiment can include the system of any one of the thirty-fourth through the fortieth embodiments, wherein the at least one frequency domain feature comprises at least one of a spectral roll-off, a spectral skewness, an RMS band energy, a total RMS energy, sub-band energy, sub-band energy ratios, a spectral flatness, a spectral slope, a spectral kurtosis, a spectral flux, or a spectral autocorrelation function.

A forty-third embodiment comprises a method of detecting an event, the method comprising: obtaining a sample data set, wherein the sample data set is representative of an acoustic signal across a frequency spectrum; determining a plurality of values of at least one frequency domain feature of the sample data set across a sample period within a first time period; determining a median value of the plurality of values of the at least one frequency domain feature across the first time period; determining a variability threshold for the at least one frequency domain feature based on the median value; determining the at least one frequency domain feature of the sample data set over a second time period; comparing the at least one frequency domain feature in the second time period with the variability threshold; determining that the at least one frequency domain feature matches the threshold; and determining the presence of an anomaly from a background signal based on determining that the at least one frequency domain feature matches the variability threshold.

A forty-fourth embodiment can include the method of the forty-third embodiment, wherein the sample data set is a sample of the acoustic signal originating within a wellbore comprising a fluid.

A forty-fifth embodiment can include the method of the forty-third embodiment or the forty-fourth embodiment, further comprising: normalizing the threshold value to obtain a normalized threshold; and normalizing the at least one frequency domain feature of the sample data set, wherein comparing the at least one frequency domain feature in the second time period with the threshold comprises comparing the normalized at least one frequency domain feature with the normalized threshold.

A forty-sixth embodiment can include the method of any one of the forty-third through the forty-fifth embodiments, wherein the second time period is a subset of the first time period.

A forty-seventh embodiment can include the method of any of the forty-third through the forty-sixth embodiments, further comprising: repeating the determining of the plurality of values, the determining of the median value, and the determining of the threshold value each time the at least on frequency domain feature is calculated.

A forty-eighth embodiment can include the method of any of the forty-third through the forty-seventh embodiments, wherein determining the mean absolute deviation of the at least one frequency domain feature over the first time period comprises: selecting a depth range from the sample data set; computing the median value of the at least one frequency domain feature from the sample data set over the depth range within the first time period; and determining the threshold value for the first time period over the depth range.

A forty-ninth embodiment can include the method of the forty-eighth embodiment, wherein the calibration factor is selected based on a predetermined sensitivity of the at least one frequency domain feature.

A fiftieth embodiment can include the method of the forty-eighth embodiment or the forty-ninth embodiment, wherein the calibration factor is selected based on a status of the wellbore.

A fifty-first embodiment can include the method of any one of the forty-third through the fiftieth embodiments, wherein the at least one frequency domain feature comprises a spectral centroid or a spectral spread.

A fifty-second embodiment can include the method of any one of the forty-third through the fiftieth embodiments, wherein the at least one frequency domain feature comprises at least one of a spectral roll-off, a spectral skewness, an RMS band energy, a total RMS energy, sub-band energy, sub-band energy ratios, a spectral flatness, a spectral slope, a spectral kurtosis, a spectral flux, or a spectral autocorrelation function.

A fifty-third embodiment comprises a method of detecting an event, the method comprising: obtaining a sample data set, wherein the sample data set is representative of an acoustic signal across a frequency spectrum; determining a plurality of values of at least one frequency domain feature of the sample data set across a sample period within a first time period; determining a value of a variability in the plurality of values of the at least one frequency domain feature across the first time period; and correcting the plurality of values of the at least one frequency domain feature based on the value of the variability to obtain a corrected plurality of values of the at least one frequency domain feature; and determining a presence of an event using the corrected plurality of values.

A fifty-fourth embodiment can include the method of the fifty-third embodiment, wherein the sample data set is a sample of the acoustic signal originating within a wellbore comprising a fluid, and wherein the event is an event occurring within the wellbore.

A fifty-fifth embodiment can include the method of the fifty-third embodiment or the fifty-fourth embodiments, wherein determining the presence of the event comprises: comparing the corrected plurality of values of the at least one frequency domain feature with an event threshold; determining that one or more of the corrected plurality of values of the at least one frequency domain feature matches the event threshold; and determining the presence of the event associated with the event threshold based on determining that the one or more of the corrected plurality of values of the at least one frequency domain feature matches the event threshold.

A fifty-sixth embodiment comprises a method of detecting an event, the method comprising: obtaining a sample data set, wherein the sample data set is representative of an acoustic signal across a frequency spectrum; determining a value of a variability in the sample data set the first time period; correcting the sample data set based on the value of the variability to obtain a corrected sample data set; determining a plurality of values of at least one frequency domain feature of the corrected sample data set across a sample period within a first time period; and determining a presence of an event using the plurality of values of the at least one frequency domain feature.

A fifty-seventh embodiment can include the method of the fifty-sixth embodiment, wherein the sample data set is a sample of the acoustic signal originating within a wellbore comprising a fluid, and wherein the event is an event occurring within the wellbore.

A fifty-eighth embodiment can include the method of the fifty-sixth embodiment or the fifty-seventh embodiment, wherein determining the presence of the event comprises: comparing the plurality of values of the at least one frequency domain feature with an event threshold; determining that one or more of the plurality of values of the at least one frequency domain feature matches the event threshold; and determining the presence of the event associated with the event threshold based on determining that the one or more of the plurality of values of the at least one frequency domain feature matches the event threshold.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. For example, features described as method steps may have corresponding elements in the system embodiments described above, and vice versa. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present invention(s). Furthermore, any advantages and features described above may relate to specific embodiments, but shall not limit the application of such issued claims to processes and structures accomplishing any or all of the above advantages or having any or all of the above features.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure. Specifically and by way of example, although the headings might refer to a "Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure, but should not be constrained by the headings set forth herein.

Use of broader terms such as comprises, includes, and having should be understood to provide support for narrower terms such as consisting of, consisting essentially of, and comprised substantially of. Use of the term "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

While preferred embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

I claim:

1. A method of detecting an event using different physical sensor configurations, the method comprising:
   obtaining, from at least one acoustic sensor, a first sample data set, wherein the first sample data set is representative of an acoustic signal across a frequency spectrum, and wherein the first sample data set is obtained using at least one sampling system having a first physical configuration, wherein the at least one sampling system comprises the acoustic sensor;
   determining, using a processor, at least one frequency domain feature of the first sample data set over a first time period;
   determining, using the processor, a first threshold for the at least one frequency domain feature using the first sample data set;
   determining, using the processor, that the at least one frequency domain feature matches the first threshold;
   determining, using the processor, the presence of an event during the first time period based on determining that the at least one frequency domain feature matches the first threshold;
   obtaining, from the at least one acoustic sensor, a second sample data set, wherein the second sample data set is representative of the acoustic signal across the frequency spectrum, and wherein the second sample data set is obtained using the at least one sampling system having a second physical configuration, wherein the first physical configuration is different than the second physical configuration;
   determining, using the processor, at least one frequency domain feature of the second sample data set over a second time period;
   determining a difference between the at least one frequency domain feature across the first sample data set and the at least one frequency domain feature across the second sample data set to obtain a difference data set;
   comparing the difference in the difference data set to a change threshold;
   determining, using the processor, a second threshold for the at least one frequency domain feature using the second sample data set, wherein determining the second threshold is based on the difference in the difference data set exceeding the change threshold, and wherein the first threshold is different than the second threshold;
   determining, using the processor, that the at least one frequency domain feature matches the second threshold;
   determining, using the processor, an identification and presence of the event during the second time period based on determining that the at least one frequency domain feature matches the second threshold; and
   generating, using the processor, an output that comprises the identification and presence of the event, wherein the output is displayed on a user interface.

2. The method of claim 1, wherein the first sample data set is a sample of the acoustic signal originating within a wellbore, wherein the second sample data set is a sample of an acoustic signal originating within the wellbore, and wherein the event is an event within the wellbore.

3. The method of claim 1, wherein the first threshold and the second threshold are different.

4. The method of claim 1, further comprising:
   determining a variability in the difference data set;
   comparing the variability in the difference data set to the change threshold,
   wherein determining the second threshold is based on the variability in the difference data set exceeding the change threshold.

5. The method of claim 1, wherein the first sample data set is obtained during at least one of: security system monitoring, rail monitoring, roadway monitoring, pipeline monitoring, utility system monitoring, or point source monitoring.

6. The method of claim 2, wherein the first physical configuration comprises a fiber disposed within the wellbore, wherein the fiber is coupled to a receiver.

7. The method of claim 6, wherein the second physical configuration comprises the fiber disposed within the wellbore in a different position.

8. The method of claim 6, wherein the second physical configuration comprises the fiber repositioned or recoupled to the receiver.

9. The method of claim 6, wherein the second physical configuration comprises a second fiber disposed within the wellbore, wherein the second fiber is coupled to the receiver.

10. The method of claim 6, wherein the second physical configuration comprises the fiber disposed within the wellbore, wherein the fiber is coupled to a second receiver.

11. A method of detecting an event using different physical sensor configurations, the method comprising:
    obtaining, from at least one acoustic sensor, a first sample data set, wherein the first sample data set is representative of an acoustic signal across a frequency spectrum, and wherein the first sample data set is obtained using at least one sampling system having a first physical configuration, wherein the at least one sampling system comprises the acoustic sensor;
    determining, using a processor, at least one frequency domain feature of the first sample data set over a first time period;
    determining, using the processor, a first threshold for the at least one frequency domain feature using the first sample data set;
    determining, using the processor, that the at least one frequency domain feature matches the first threshold;
    determining, using the processor, the presence of an event during the first time period based on determining that the at least one frequency domain feature matches the first threshold;
    obtaining, from the at least one acoustic sensor, a second sample data set, wherein the second sample data set is representative of the acoustic signal across the frequency spectrum, and wherein the second sample data set is obtained using the at least one sampling system having a second physical configuration, wherein the first physical configuration is different than the second physical configuration;

determining, using the processor, at least one frequency domain feature of the second sample data set over a second time period;

determining, using the processor, a second threshold for the at least one frequency domain feature using the second sample data set, wherein determining the second threshold comprises: determining a median value of the at least one frequency domain feature of the second sample data set over a first portion of the second sample data set; and determining the second threshold using the median value;

determining, using the processor, that the at least one frequency domain feature matches the second threshold;

normalizing the second threshold value using the median value to obtain a normalized second threshold value;

normalizing the at least one frequency domain feature obtained from the second sample data set using the median value;

determining, using the processor, an identification and presence of the event during the second time period based on determining that the at least one frequency domain feature matches the second threshold, wherein determining that the at least one frequency domain feature matches the second threshold comprises comparing the normalized at least one frequency domain feature with the normalized second threshold; and generating, using the processor, an output that comprises the identification and presence of the event, wherein the output is displayed on a user interface.

12. A method of detecting an event using different physical sensor configurations, the method comprising:

obtaining, from at least one acoustic sensor, a first sample data set, wherein the first sample data set is representative of an acoustic signal across a frequency spectrum, and wherein the first sample data set is obtained using at least one sampling system having a first physical configuration, wherein the at least one sampling system comprises the acoustic sensor;

determining, using a processor, at least one frequency domain feature of the first sample data set over a first time period;

determining, using the processor, a first threshold for the at least one frequency domain feature using the first sample data set;

determining, using the processor, that the at least one frequency domain feature matches the first threshold;

determining, using the processor, the presence of an event during the first time period based on determining that the at least one frequency domain feature matches the first threshold;

obtaining, from the at least one acoustic sensor, a second sample data set, wherein the second sample data set is representative of the acoustic signal across the frequency spectrum, and wherein the second sample data set is obtained using the at least one sampling system having a second physical configuration, wherein the first physical configuration is different than the second physical configuration;

determining, using the processor, at least one frequency domain feature of the second sample data set over a second time period;

determining, using the processor, a second threshold for the at least one frequency domain feature using the second sample data set, wherein determining the second threshold comprises: determining a median absolute deviation of the at least one frequency domain feature of the second sample data set over at least a first portion of the second time period; and determining the second threshold for the at least one frequency domain feature based on the median absolute deviation;

determining, using the processor, that the at least one frequency domain feature matches the second threshold;

determining, using the processor, an identification and presence of the event during the second time period based on determining that the at least one frequency domain feature matches the second threshold; and generating, using the processor, an output that comprises the identification and presence of the event, wherein the output is displayed on a user interface.

13. The method of claim 12, wherein the at least one frequency domain feature comprises at least one of a spectral spread, a spectral centroid, a spectral roll-off, a spectral skewness, an RMS band energy, a total RMS energy, sub-band energy, sub-band energy ratios, a spectral flatness, a spectral slope, a spectral kurtosis, a spectral flux, or a spectral autocorrelation function.

14. A method of separating background noise from an acoustic signal from an event, the method comprising:

obtaining, from at least one acoustic sensor, a sample data set, wherein the sample data set is representative of an acoustic signal across a frequency spectrum;

determining, using a processor, at least one frequency domain feature of the sample data set over a first time period;

determining, using the processor, a median absolute deviation of the at least one frequency domain feature over the first time period;

determining, using the processor, a variability threshold for the at least one frequency domain feature based on the median absolute deviation;

determining, using the processor, the at least one frequency domain feature of the sample data set over a second time period;

comparing, using the processor, the at least one frequency domain feature in the second time period with the variability threshold;

determining, using the processor, that the at least one frequency domain feature exceeds the variability threshold;

comparing, using the processor, the at least one frequency domain feature to an event threshold when the at least one frequency domain feature exceeds the variability threshold;

determining, using the processor, an identification and presence of an event associated with the event threshold based on determining that the at least one frequency domain feature matches the event threshold; and generating, using the processor, an output that comprises the identification and presence of the event, wherein the output is displayed on a user interface.

15. The method of claim 14, wherein the sample data set is a sample of the acoustic signal originating within a wellbore comprising a fluid.

16. The method of claim 14, wherein the at least one frequency domain feature comprises a spectral centroid or a spectral spread.

17. The method of claim 14, wherein the at least one frequency domain feature comprises at least one of a spectral roll-off, a spectral skewness, an RMS band energy, a total RMS energy, sub-band energy, sub-band energy ratios, a spectral flatness, a spectral slope, a spectral kurtosis, a spectral flux, or a spectral autocorrelation function.

18. A method of separating background noise from an acoustic signal from an event, the method comprising:
- obtaining, from at least one acoustic sensor, a sample data set, wherein the sample data set is representative of an acoustic signal across a frequency spectrum;
- determining, using a processor, at least one frequency domain feature of the sample data set over a first time period;
- determining, using the processor, a median absolute deviation of the at least one frequency domain feature over the first time period, wherein determining the median absolute deviation of the at least one frequency domain feature over the first time period comprises:
  - selecting a depth range from the sample data set;
  - computing median values of the at least one frequency domain feature from the sample data set over the depth range within the first time period; and
  - determining the median absolute deviation from the median values for the first time period,
- determining, using the processor, a variability threshold for the at least one frequency domain feature based on the median absolute deviation;
- determining, using the processor, the at least one frequency domain feature of the sample data set over a second time period;
- comparing, using the processor, the at least one frequency domain feature in the second time period with the variability threshold;
- determining, using the processor, that the at least one frequency domain feature exceeds the variability threshold;
- comparing, using the processor, the at least one frequency domain feature to an event threshold when the at least one frequency domain feature exceeds the variability threshold;
- determining, using the processor, an identification and presence of an event associated with the event threshold based on determining that the at least one frequency domain feature matches the event threshold; and
- generating, using the processor, an output that comprises the identification and presence of the event, wherein the output is displayed on a user interface.

19. A method of separating background noise from an acoustic signal from an event, the method comprising:
- obtaining, from at least one acoustic sensor, a sample data set, wherein the sample data set is representative of an acoustic signal across a frequency spectrum;
- determining, using a processor, at least one frequency domain feature of the sample data set over a first time period;
- determining, using the processor, a median absolute deviation of the at least one frequency domain feature over the first time period;
- determining, using the processor, a variability threshold for the at least one frequency domain feature based on the median absolute deviation, wherein determining the variability threshold for the at least one frequency domain feature comprises:
  - applying a calibration factor to the median absolute deviation; and
  - determining the variability threshold based on applying the calibration factor to the median absolute deviation,
- determining, using the processor, the at least one frequency domain feature of the sample data set over a second time period;
- comparing, using the processor, the at least one frequency domain feature in the second time period with the variability threshold;
- determining, using the processor, that the at least one frequency domain feature exceeds the variability threshold;
- comparing, using the processor, the at least one frequency domain feature to an event threshold when the at least one frequency domain feature exceeds the variability threshold;
- determining, using the processor, an identification and presence of an event associated with the event threshold based on determining that the at least one frequency domain feature matches the event threshold; and
- generating, using the processor, an output that comprises the identification and presence of the event, wherein the output is displayed on a user interface.

20. A method of separating background noise from an acoustic signal from an event, the method comprising:
- obtaining, from at least one acoustic sensor, a sample data set, wherein the sample data set is representative of an acoustic signal across a frequency spectrum;
- determining, using a processor, at least one frequency domain feature of the sample data set over a first time period;
- determining, using the processor, a median absolute deviation of the at least one frequency domain feature over the first time period, wherein determining the median absolute deviation of the at least one frequency domain feature over the first time period comprises:
  - determining a plurality of values of the at least one frequency domain feature of the sample data set over the first time period;
  - determining a median value of the plurality of values; and
  - determining the median absolute deviation based on the median value, a deviation from the median value for each value of the plurality of values, and a correction factor,
- determining, using the processor, a variability threshold for the at least one frequency domain feature based on the median absolute deviation;
- determining, using the processor, the at least one frequency domain feature of the sample data set over a second time period;
- comparing, using the processor, the at least one frequency domain feature in the second time period with the variability threshold;
- determining, using the processor, that the at least one frequency domain feature exceeds the variability threshold;
- comparing, using the processor, the at least one frequency domain feature to an event threshold when the at least one frequency domain feature exceeds the variability threshold;
- determining, using the processor, an identification and presence of an event associated with the event threshold based on determining that the at least one frequency domain feature matches the event threshold; and
- generating, using the processor, an output that comprises the identification and presence of the event, wherein the output is displayed on a user interface.

21. The method of claim 20, wherein determining the variability threshold for the at least one frequency domain feature comprises:
    determining a plurality of an initial variability threshold values using the median absolute deviation and a calibration factor defined for the at least one frequency domain feature; and
    determining the variability threshold using the median of the plurality of the initial signal threshold values.

22. The method of claim 21, wherein the calibration factor is selected based on a predetermined sensitivity of the at least one frequency domain feature.

23. The method of claim 21, wherein the calibration factor is selected based on a status of a wellbore.

24. A method of detecting an event, the method comprising:
    obtaining, from at least one acoustic sensor, a sample data set, wherein the sample data set is representative of an acoustic signal across a frequency spectrum;
    calculating, using a processor, at least one frequency domain feature of the sample data set over a first time period;
    determining, using the processor, a median absolute deviation of the at least one frequency domain feature over the first time period;
    determining, using the processor, an event threshold value for the at least one frequency domain feature based on the median absolute deviation;
    determining, using the processor, the at least one frequency domain feature of the sample data set over a second time period;
    determining a difference between the at least one frequency domain feature over the first time period and the at least one frequency domain feature over the second time period to obtain a difference data set;
    comparing the difference in the difference data set to a change threshold;
    comparing, using the processor, the at least one frequency domain feature in the second time period with the event threshold, wherein comparing the at least one frequency domain feature in the second time period with the event threshold is based on the difference in the difference data set exceeding the change threshold;
    determining, using the processor, that the at least one frequency domain feature matches the event threshold;
    determining, using the processor, an identification and presence of an event corresponding to the event threshold based on determining that the at least one frequency domain feature matches the event threshold; and
    generating, using the processor, an output that comprises the identification and presence of the event, wherein the output is displayed on a user interface.

25. The method of claim 24, wherein the sample data set is a sample of the acoustic signal originating within a wellbore comprising a fluid, and wherein the event is an event within the wellbore.

26. A method of detecting an event, the method comprising:
    obtaining, from at least one acoustic sensor, a sample data set, wherein the sample data set is representative of an acoustic signal across a frequency spectrum;
    determining, using a processor, at least one frequency domain feature of the sample data set over a first time period;
    determining, using the processor, a median absolute deviation of the at least one frequency domain feature over the first time period, wherein determining the median absolute deviation of the at least one frequency domain feature over the first time period comprises:
        selecting a depth range from the sample data set;
        computing median values of the at least one frequency domain feature from the sample data set over the depth range within the first time period; and
        determining the median absolute deviation from the median values for the first time period,
    determining, using the processor, an event threshold value for the at least one frequency domain feature based on the median absolute deviation;
    determining, using the processor, the at least one frequency domain feature of the sample data set over a second time period;
    comparing, using the processor, the at least one frequency domain feature in the second time period with the event threshold;
    determining, using the processor, that the at least one frequency domain feature matches the event threshold;
    determining, using the processor, an identification and presence of an event corresponding to the event threshold based on determining that the at least one frequency domain feature matches the event threshold; and
    generating, using the processor, an output that comprises the identification and presence of the event, wherein the output is displayed on a user interface.

27. A method of detecting an event, the method comprising:
    obtaining, from at least one acoustic sensor, a sample data set, wherein the sample data set is representative of an acoustic signal across a frequency spectrum;
    determining, using a processor, at least one frequency domain feature of the sample data set over a first time period;
    determining, using the processor, a median absolute deviation of the at least one frequency domain feature over the first time period;
    determining, using the processor, an event threshold value for the at least one frequency domain feature based on the median absolute deviation, wherein determining the event threshold value for the at least one frequency domain feature comprises:
        applying a calibration factor to the median absolute deviation; and determining the threshold value based on applying the calibration factor to the median absolute deviation,
    determining, using the processor, the at least one frequency domain feature of the sample data set over a second time period;
    comparing, using the processor, the at least one frequency domain feature in the second time period with the event threshold;
    determining, using the processor, that the at least one frequency domain feature matches the event threshold;
    determining, using the processor, an identification and presence of an event corresponding to the event threshold based on determining that the at least one frequency domain feature matches the event threshold; and
    generating, using the processor, an output that comprises the identification and presence of the event, wherein the output is displayed on a user interface.

28. A method of detecting an event, the method comprising:
    obtaining, from at least one acoustic sensor, a sample data set, wherein the sample data set is representative of an acoustic signal across a frequency spectrum;

determining, using a processor, at least one frequency domain feature of the sample data set over a first time period;

determining, using the processor, a median absolute deviation of the at least one frequency domain feature over the first time period, wherein determining the median absolute deviation of the at least one frequency domain feature over the first time period comprises:

determining a plurality of values of the at least one frequency domain feature of the sample data set over the first time period;

determining a median value of the plurality of values; and determining the median absolute deviation based on the median value, a deviation from the median value for each value of the plurality of values, and a correction factor, determining, using the processor, an event threshold value for the at least one frequency domain feature based on the median absolute deviation;

determining, using the processor, the at least one frequency domain feature of the sample data set over a second time period;

comparing, using the processor, the at least one frequency domain feature in the second time period with the event threshold;

determining, using the processor, that the at least one frequency domain feature matches the event threshold;

determining, using the processor, an identification and presence of an event corresponding to the event threshold based on determining that the at least one frequency domain feature matches the event threshold; and generating, using the processor, an output that comprises the identification and presence of the event, wherein the output is displayed on a user interface.

29. The method of claim 28, wherein determining the threshold value for the at least one frequency domain feature comprises:

determining a plurality of an initial threshold values using the median absolute deviation and a calibration factor defined for the at least one frequency domain feature; and determining the threshold using the median of the plurality of the initial threshold values.

30. The method of claim 29, wherein the calibration factor is selected based on at least one of: a predetermined sensitivity of the at least one frequency domain feature, or a status of a wellbore.

* * * * *